US008830316B2

(12) United States Patent
Jin et al.

(10) Patent No.: US 8,830,316 B2
(45) Date of Patent: Sep. 9, 2014

(54) UNATTENDED SPATIAL SENSING

(75) Inventors: Feng Jin, Baltimore, MD (US);
Yingqing Jia, Timonium, MD (US);
Sergey Vishnyakov, Owings Mills, MD (US); Vladimir Stanislavsky, Ellicott City, MD (US); Sudhir B. Trivedi, Nottingham, MD (US); Ronald G. Rosemeier, Monkton, MD (US); Richard A. Winkelman, New Freedom, PA (US); Robert Gephart, York, PA (US)

(73) Assignee: Brimrose Technology Corporation, Sparks, MD (US)

( * ) Notice: Subject to any disclaimer, the term of this patent is extended or adjusted under 35 U.S.C. 154(b) by 596 days.

(21) Appl. No.: 12/896,767

(22) Filed: Oct. 1, 2010

(65) Prior Publication Data
US 2012/0081545 A1 Apr. 5, 2012

(51) Int. Cl.
*H04N 7/18* (2006.01)
*G01B 11/02* (2006.01)
*H04N 5/33* (2006.01)
*G01B 11/00* (2006.01)

(52) U.S. Cl.
CPC ............... *H04N 7/18* (2013.01); *G01B 11/022* (2013.01); *H01N 7/181* (2013.01); *H04N 5/33* (2013.01); *G01B 11/005* (2013.01)
USPC ............ 348/141; 348/135; 348/143; 348/164

(58) Field of Classification Search
CPC .... G01B 11/022; G01B 11/005; H04N 7/181; H04N 5/33
USPC .................................. 348/141, 135, 143, 164
See application file for complete search history.

(56) References Cited

U.S. PATENT DOCUMENTS

| | | | |
|---|---|---|---|
| 4,639,774 A | 1/1987 | Fried | |
| 4,797,751 A | 1/1989 | Yamaguchi | |
| 4,935,629 A | 6/1990 | Livermore et al. | |
| 5,103,433 A | 4/1992 | Imhof | |
| 5,283,551 A | 2/1994 | Guscott | |
| 5,448,320 A | 9/1995 | Sakai et al. | |
| 5,493,331 A | 2/1996 | Takahashi et al. | |
| 5,517,201 A | 5/1996 | Thompson | |
| 5,657,077 A | 8/1997 | DeAngelis et al. | |
| 5,847,753 A | 12/1998 | Gabello et al. | |
| 6,069,653 A | 5/2000 | Hudson | |
| 6,531,965 B1 | 3/2003 | Kaiser et al. | |
| 6,545,705 B1 | 4/2003 | Sigel et al. | |
| 7,526,105 B2 | 4/2009 | Dronge | |
| 7,561,037 B1 | 7/2009 | Monroe | |
| 2002/0163577 A1 | 11/2002 | Myers | |

(Continued)

*Primary Examiner* — Shawn An
(74) *Attorney, Agent, or Firm* — Edell, Shapiro & Finnan LLC

(57) ABSTRACT

An unattended ground sensor system includes a sensor to produce pixel data from a radiating target within its field of view. The detection of such a target is implemented detectors in the sensor other than those used for imaging. Once a target has been detected, the sensor collects a linear array of pixels data at each sampling period throughout the time interval during which the target is within the field of view of the sensor. The linear arrays of pixels are transmitted to a location remote from the sensor, where they are analyzed to classify and identify the target and an alert is issued to applicable personnel when the classification and identification of the target warrants such.

56 Claims, 32 Drawing Sheets

(56) References Cited

U.S. PATENT DOCUMENTS

| | | |
|---|---|---|
| 2007/0002141 A1 | 1/2007 | Lipton et al. |
| 2007/0076095 A1 | 4/2007 | Tomaszewski |
| 2007/0205888 A1 | 9/2007 | Lee et al. |
| 2007/0236343 A1 | 10/2007 | Becksted et al. |
| 2008/0111885 A1 | 5/2008 | Voglewede et al. |
| 2008/0114914 A1 | 5/2008 | Cloutier et al. |
| 2009/0002492 A1 | 1/2009 | Velipasalar et al. |
| 2010/0046577 A1* | 2/2010 | Sheard et al. ............ 374/130 |
| 2010/0213377 A1* | 8/2010 | Yakir et al. ............ 250/341.8 |

* cited by examiner

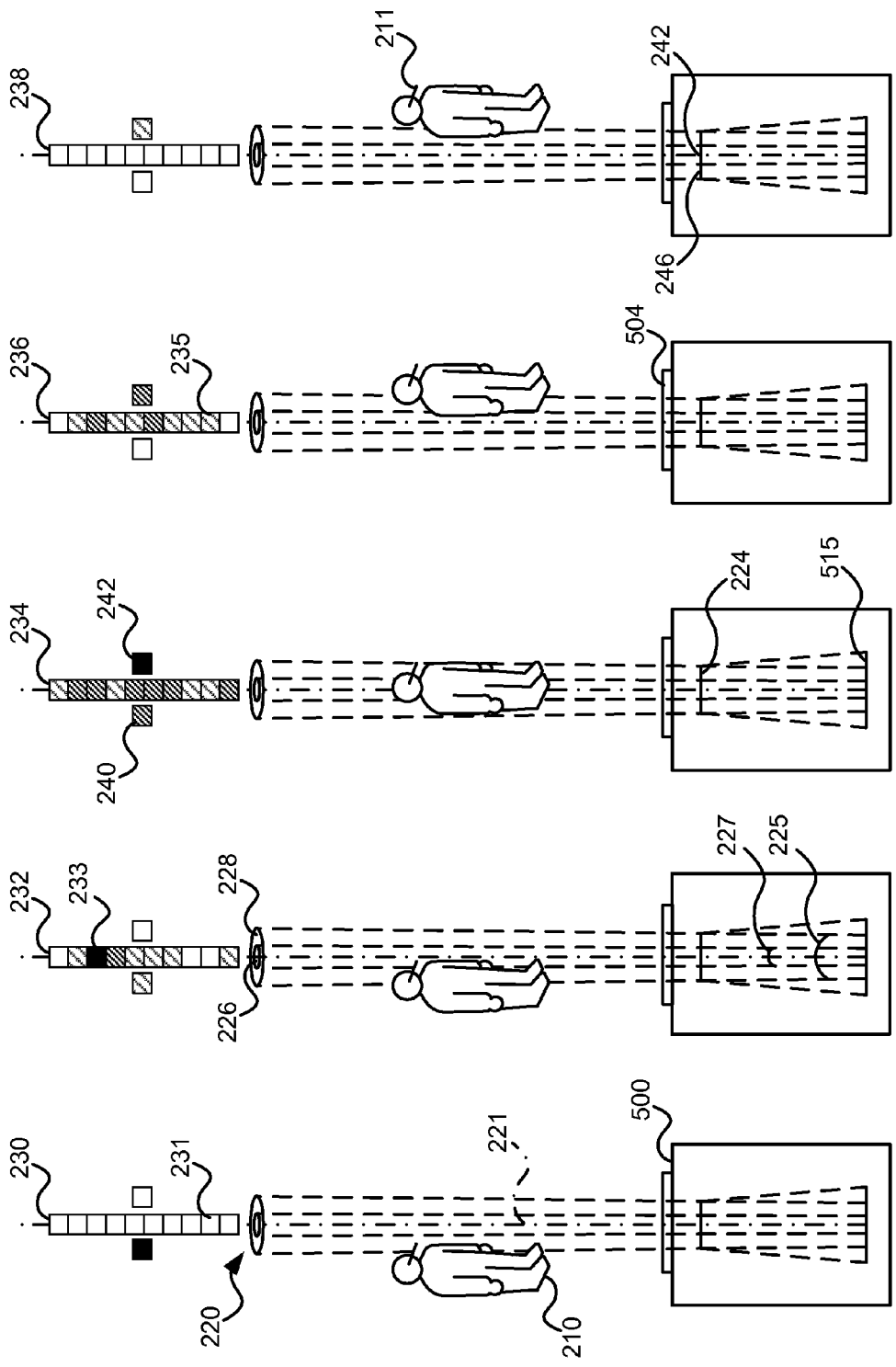

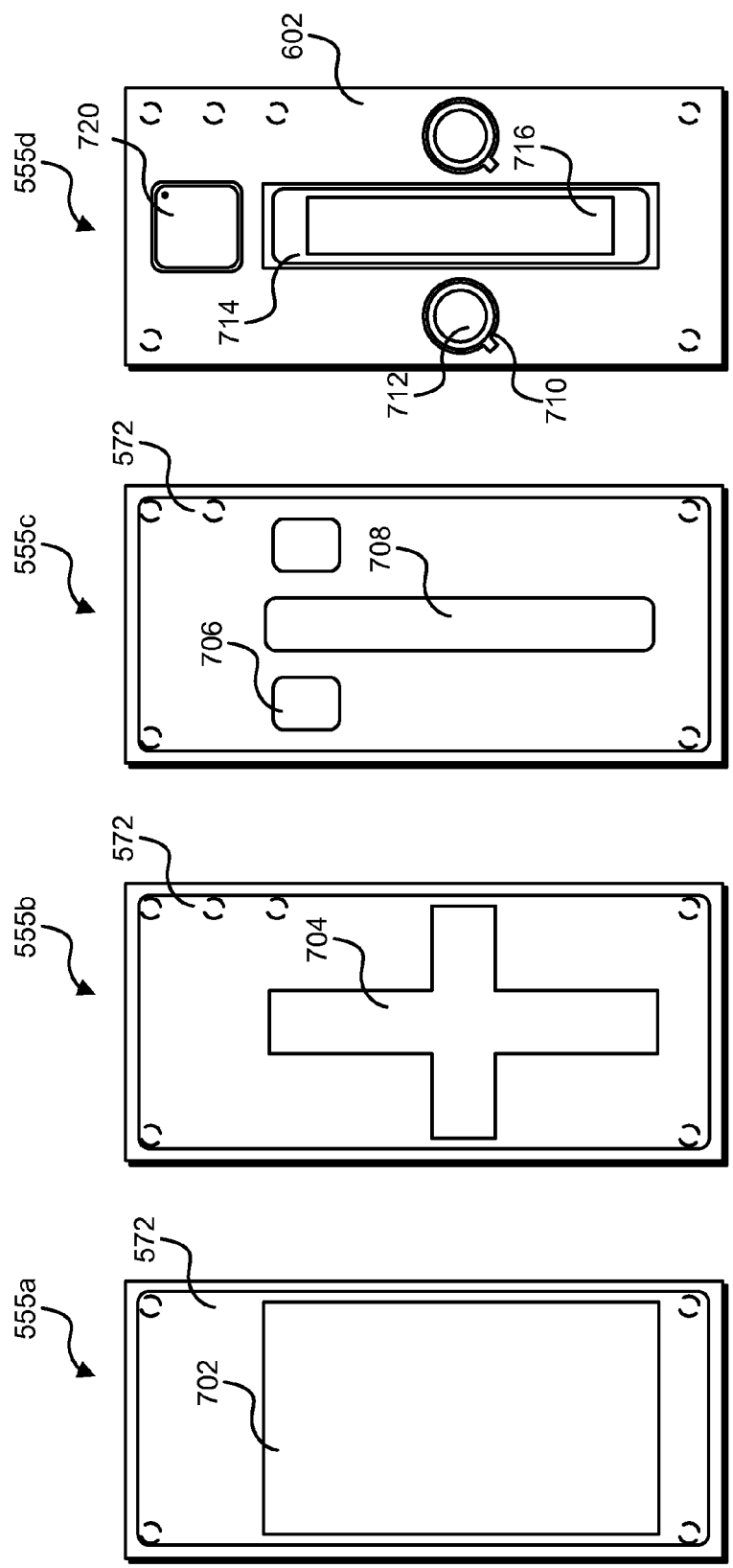

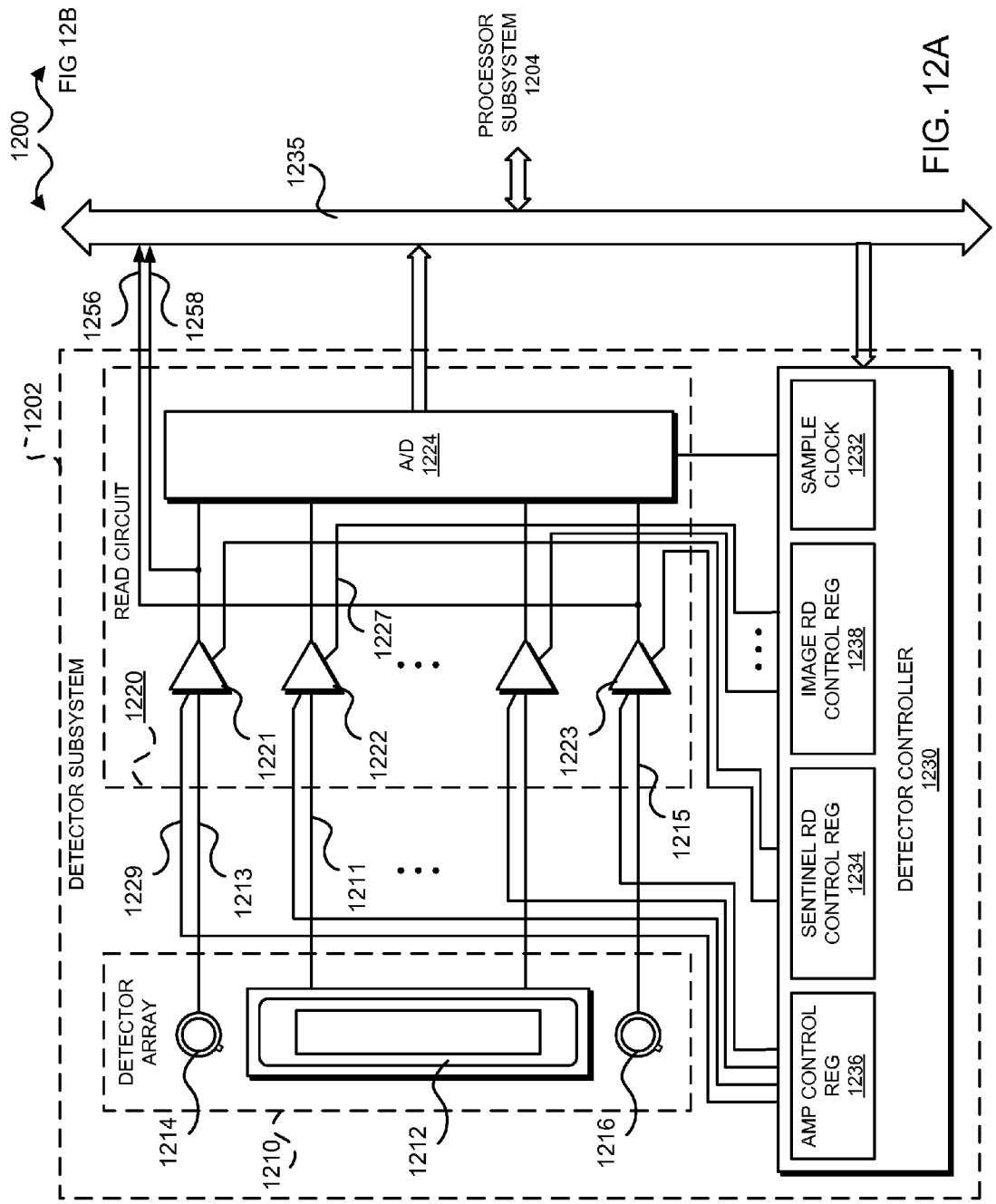

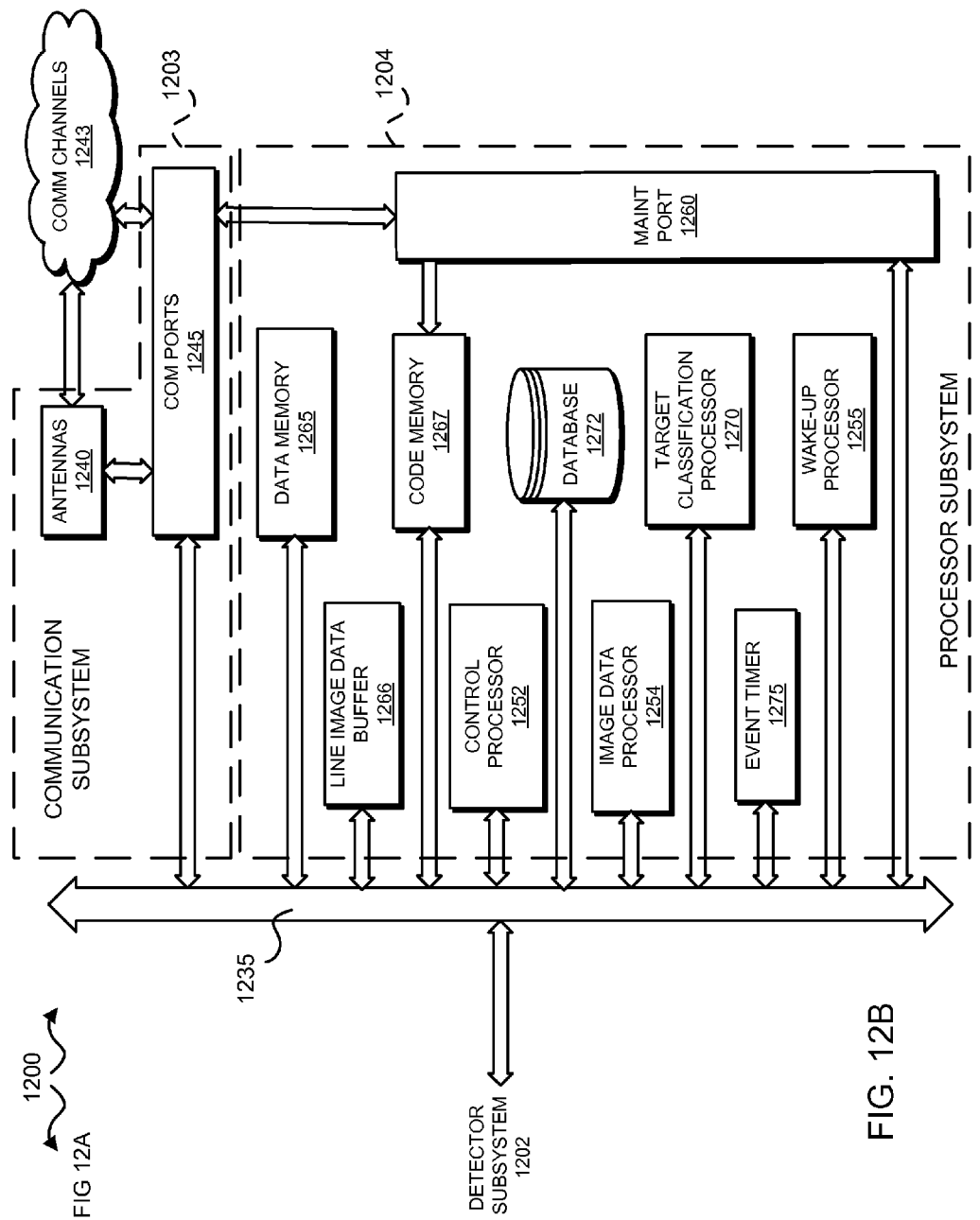

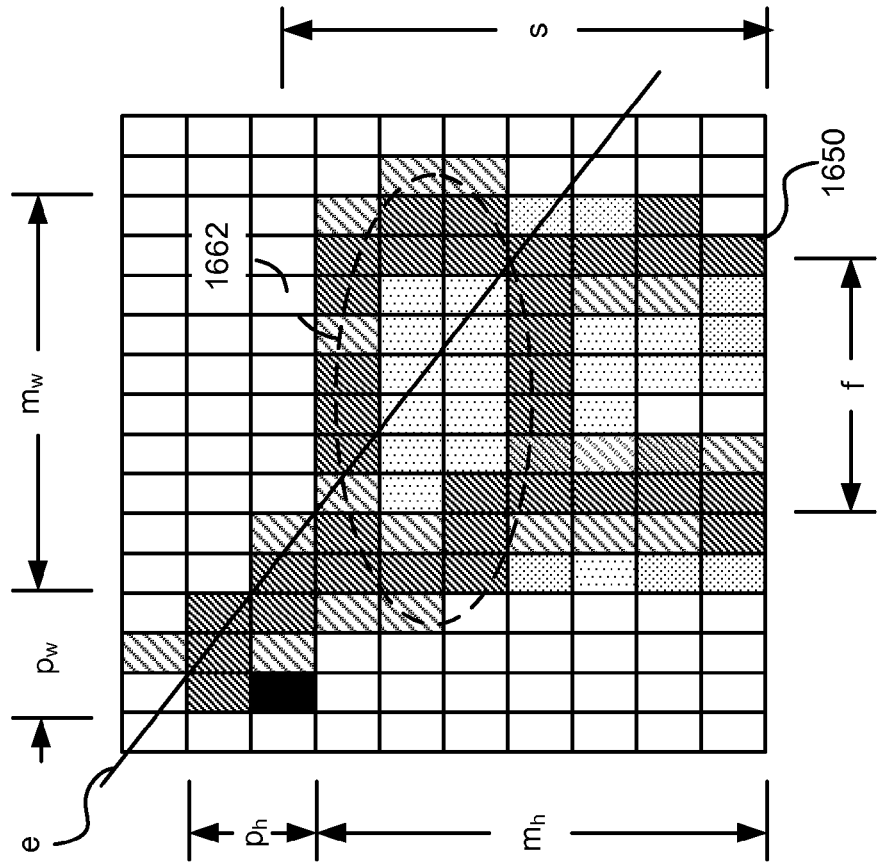
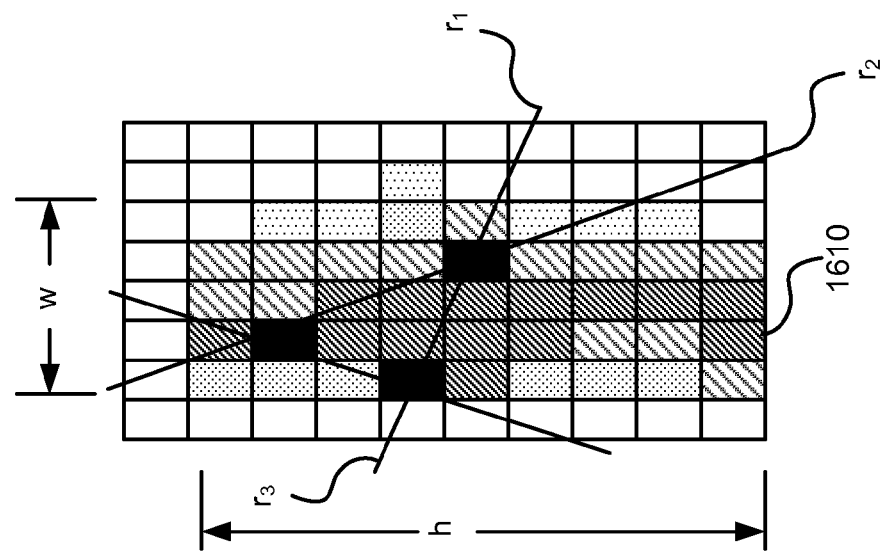
FIG. 16B

UNATTENDED SPATIAL SENSING

BACKGROUND

Spatial sensor networks have for decades found applicability over a broad range of scientific, security and military contexts. Generally, such networks include one or more sensors to detect one or more events within a known proximity of the sensor, a processing center to receive and process data from the sensors, and one or more terminal devices to receive the processed data so that a user having an interest in the occurrence of the events may be informed of such. Depending on the event that is to be captured, the sensors can be simple transducers, such as to detect seismic activity, or can be compound sensors that not only detect an event, but also classify the event into different categories.

A subclass of these spatial sensor networks deploys unattended ground sensors (UGSs) at the sensor locations. UGSs are typically small, autonomous ground-based sensors that collect event data and transmit the data to the processing center. Accordingly, a UGS should have at least a transmitter by which the data are transmitted over a suitable data network, a processor to perform control and processing functions onboard the UGS, and a power supply to provide power to the sensing, communication and processing equipment on the UGS. Additionally, a UGS should be manufactured at the lowest possible cost since such sensors, depending on where and in what context they are deployed, may be destroyed or abandoned once its mission has been completed.

Target imaging may be implemented in certain UGS systems, either as an adjunct to the primary sensors on a UGS or as the principal sensor thereof. Typically, the imaging is performed through an array of detectors that convert electromagnetic radiation into electrical signals, numerical values of which can be assigned to individual pixels in an image. Transmitting the resulting image, even after data reduction or compression techniques, may place a substantial burden on the communication channel in which it is carried. This burden is compounded when each UGS in a network of such must transmit a series of such images in a short period of time.

Many UGS systems implement long-range communications between the UGS and a control center via a satellite. Satellite communications can be costly in terms of not only usage charges, but also in terms of power consumption by the UGS. A particular satellite is capable of a limited number of communication sessions over a given time period. Accordingly, as with other communication service providers, satellite communication operators typically charge per a customer's bandwidth requirements; the higher the bandwidth needed to convey its data, the more costly such transmission is to the customer. And, where cost is it is not prohibitive, a customer is still limited by the data throughput of the satellite. Thus, in tactical situations, for example, a quantity of data may be sacrificed in preference to rapid conveyance.

In view of the shortcomings of the prevailing art, the need has been felt for a low-cost imaging unattended ground sensor that, among other things, ameliorates bandwidth burdens on bandwidth-limited communication channels over which image data are transmitted.

SUMMARY

The present general inventive concept provides a low-cost ground-based imaging sensor and associated apparatuses and functionality to construct a system of such sensors. Upon an indication that a target in the field of view of the sensor is not a member of a predetermined class of excluded targets, the sensor acquires data corresponding to electromagnetic radiation from the target and assigns values proportional to the electromagnetic radiation to an array of image pixels. The image pixels may be analyzed to determine, among other things, the class of the target and, where desired, the image data are quantized to minimize transmission bandwidth requirements. Upon a determination that the classification of the target warrants such, an alert may be issued to applicable personnel.

The foregoing and other utility and advantages of the present general inventive concept may be achieved by a spatial sensing apparatus having optics that distribute intercepted electromagnetic radiation intercepted over an image plane. A detector array may produce electrical signals proportional to the distribution of the electromagnetic radiation over the image plane and a processor may produce an image from the electrical signals when the distribution of the electromagnetic radiation over the image plane is other than a predetermined excluded spatial distribution thereof. The image data may be stored in a data storage unit and/or transmitted to a remote recipient.

The foregoing and other utility and advantages of the present general inventive concept may also be achieved by a spatial sensing system that includes a sensor to produce an image indicative of a distribution of electromagnetic energy emitted from a target. The image may be produced upon a positive determination that a spatiotemporal distribution of the electromagnetic radiation over an image plane of the sensor is other than a predetermined excluded spatial distribution. A communication system may transmit an alert to a receiving device upon a positive determination that the target in the field of view of the sensor is a member of a predetermined class of targets. The foregoing and other utility and advantages of the present general inventive concept may also be achieved by a method of monitoring a region of interest in a field of view of an optical sensor for target activity. At least one class of targets may be established for which an alert is to be issued when a member of the class is within the field of view of the optical sensor. The optical sensor may be provided with a detector array to produce an image proportional to the electromagnetic radiation over an image plane when the distribution of the electromagnetic radiation is not that corresponding to an excluded class of targets. The optical sensor may be positioned in space to intercept the electromagnetic radiation such that production of the image corresponding to the excluded class of targets is inhibited. A determination of whether the image produced by the positioned optical sensor corresponds to the member of the class of targets may be conducted and, when the image corresponds to a member of the class, the alert may be transmitted to a terminal device.

The foregoing and other utility and advantages of the present general inventive concept may also be achieved by a method of monitoring a region in the field of view of an optical sensor for target activity. At least one class of targets is established for which an image is to be transmitted upon determining that such a target is within the field of view of the optical sensor. The optical sensor may be provided with a detector array to produce the image from a plurality of line images corresponding to a spatiotemporal distribution of the electromagnetic radiation over an image plane thereof. A number of the line images of the image may be assembled in accordance with available bandwidth of a communication channel over which the image is to be conveyed, and the number of line images may be transmitted to a terminal device such that the available bandwidth is not exceeded thereby.

BRIEF DESCRIPTION OF THE DRAWINGS

These and/or other aspects and utilities of the present general inventive concept will become apparent and more readily appreciated from the following description of exemplary embodiments, taken in conjunction with the accompanying drawings, of which:

FIGS. 2A-2F are conceptual block diagrams illustrating certain underlying principles of operation that may be embodied in unattended spatial sensors functioning in accordance with the present general inventive concept;

FIGS. 7A-7D are illustrations of exemplary detector packages of an unattended spatial sensor constructed in accordance with the present general inventive concept;

FIGS. 12A-12B comprise a schematic block diagram of an exemplary circuit subsystem of an unattended spatial sensor constructed in accordance with the present general inventive concept;

FIGS. 16A-16B are illustrations of exemplary images of various targets, and exemplary attributes of the targets, collected by an unattended spatial sensor constructed in accordance with the present general inventive concept;

DETAILED DESCRIPTION

Figure 1A:
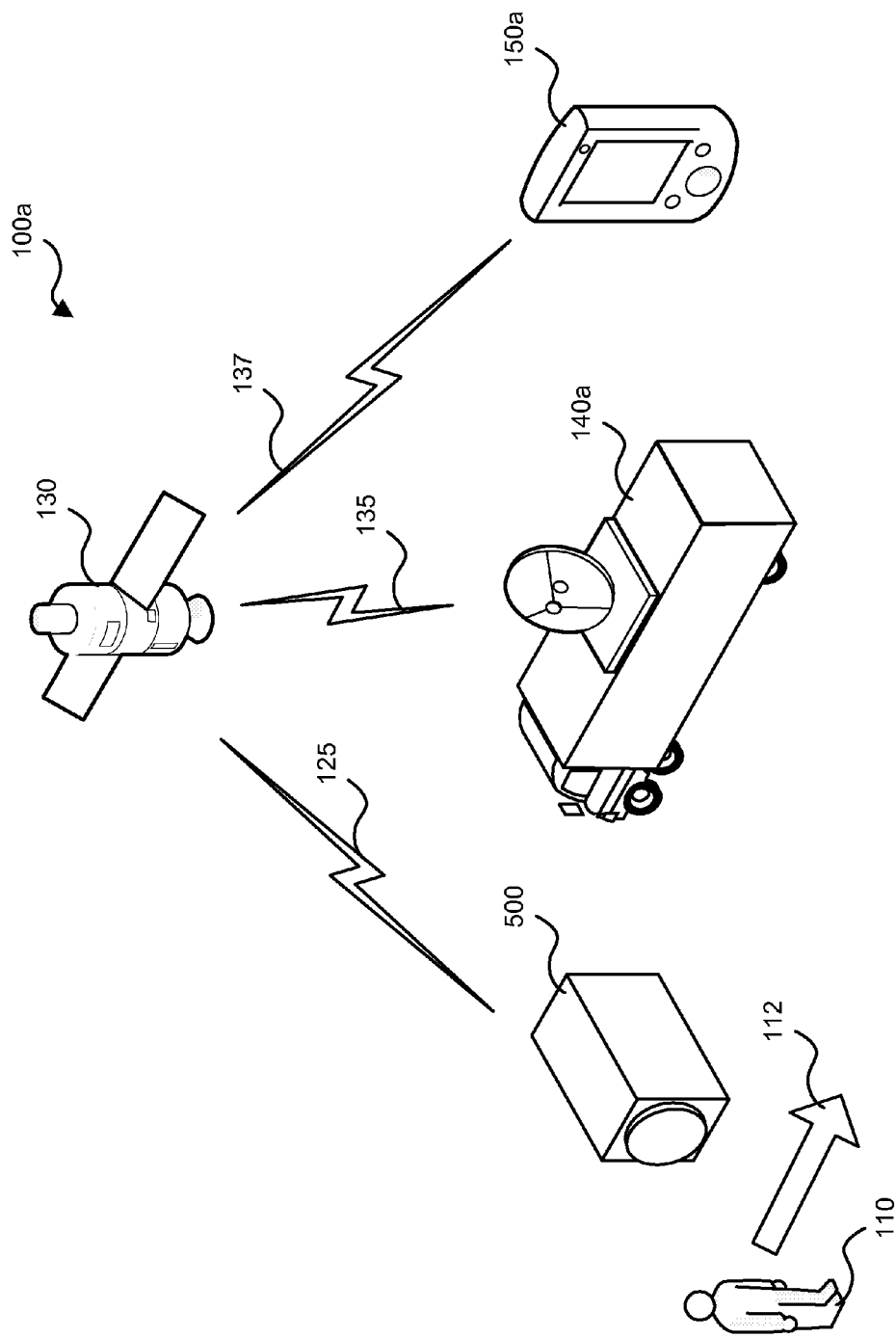
FIGS. 1A-1B illustrate exemplary unattended ground sensor networks constructed in accordance with the present general inventive concept.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Referring to FIG. 1A, there is illustrated an exemplary system, referred to herein as an unattended sensor system (USS) 100a, operable in accordance with the present invention. The exemplary USS 100a transmits a suitable alert to a remote recipient, such as a user of communication device 150a, upon identification of a certain class of target 110 travelling along a trajectory 112 and passing into the field of view of sensor 500. In that such operational behavior, as described more fully below, mimics that of a traditional tripwire, sensor 500 shall be referred to herein as optical tripwire sensor (OTS) 500, although it is to be understood that this name assignment is not intended to limit the scope of the present invention to any particular embodiment. OTS 500 may be a rugged, autonomous remote sensor apparatus, such as that of embodiments described below.

Certain embodiments of the present invention are implemented for use in tactical settings, such as those during military operations. Accordingly, USS 100 may include a vehicle-mounted operation control center (OCC) 140a to provide mobility for rapid deployment. However, it is to be understood that such mobility is not essential to the present invention, as is depicted at OCC 140b in FIG. 1B. Thus, the operation control center may be referred to generically as OCC 140. OCC 140 implements suitable equipment to, among other things, receive sensor data from one or more OTS 500, to analyze the data as to, among other things, the identification of the target 110, and to transmit the alert to communication device 150a if the target 110 belongs to a class of targets warranting an alert.

In the exemplary embodiment of FIG. 1A, data are conveyed between OTS 500, OCC 140a and communication device 150a via suitable data links 125, 135, 137 in communication channels compliant with data transmission and control protocols of satellite 130. For example, data from OTS 500 are received at satellite 130 that include sensor data and a destination address of the OCC 140. The satellite 130 relays the data to OCC 140 via the data link 135. The data are analyzed and, if such analysis reveals that the target 110 warrants an alert, a suitably formatted alert message is transmitted to satellite 130 via data link 135 and conveyed to communication device 150a over data link 137. Accordingly, communication device 150a may be a satellite phone operable with the satellite operator's communication equipment.

Figure 1B:
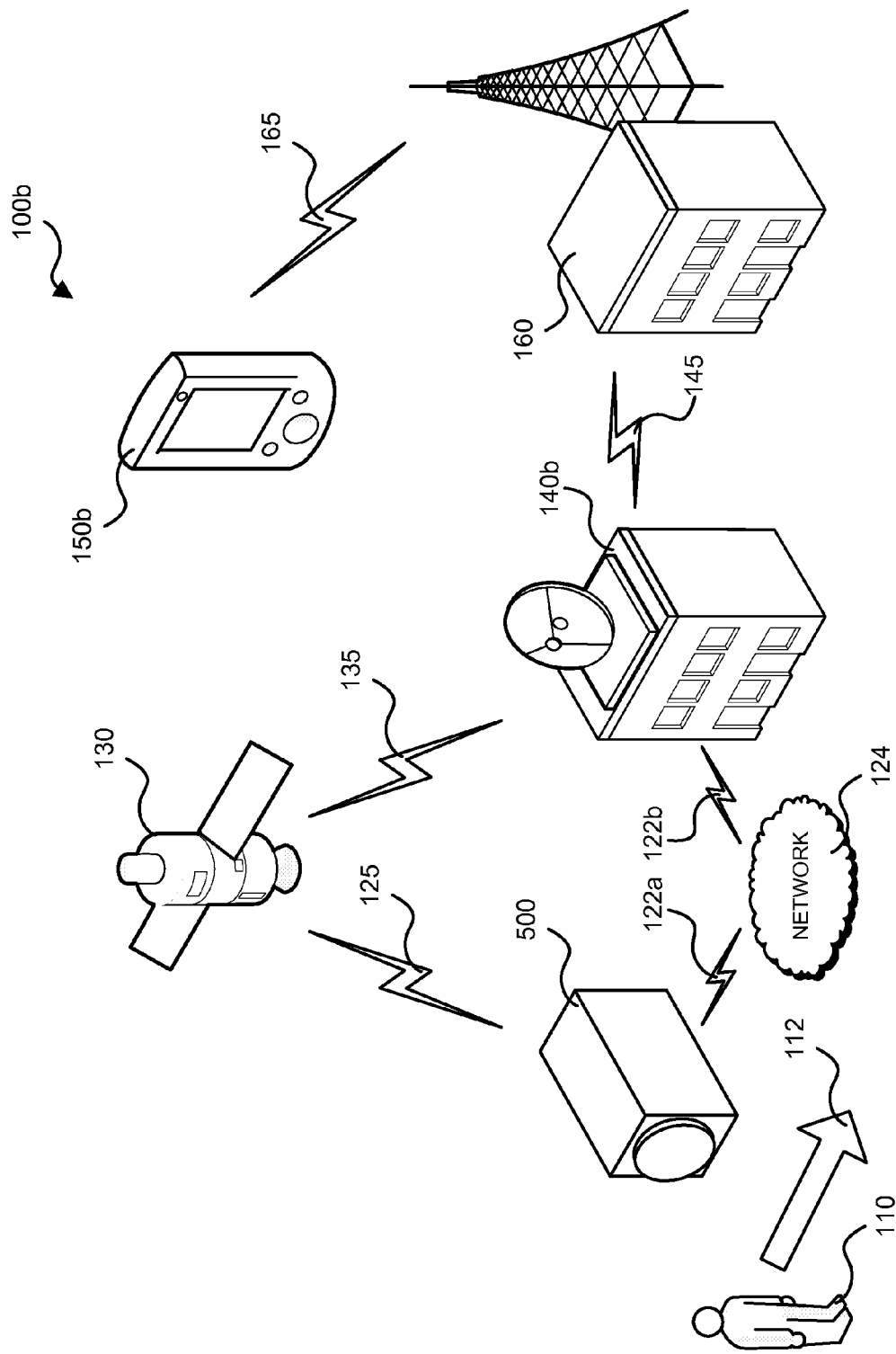

FIG. 1B illustrates another exemplary embodiment of the present invention, illustrated generally as USS 100b. USS 100b includes components similar to those described with reference to FIG. 1A and, as such, description of those components will not be repeated. As is illustrated in the figure, exemplary OCC 140b is fixed in location, but may receive the same information as the mobile OCC 140a depicted in FIG. 1A. OCC 140b, upon determining that an alert should be issued, transmits a suitably formatted alert message over data link 145 to an auxiliary communication system, generally depicted at facility 160. Data link 145 may be carried over any suitable communications medium including, but not limited to a wireless transmission medium, optical cable and/or metallic conductor cable. Communication facility 160 may transmit the alert message via data link 165, which also may be carried over any suitable communications medium. For example, data link 145 may be compliant with transmission control protocol/Internet protocol (TCP/IP) and carried via a metallic conductor data trunk to a cellular telephone system 160 that, in turn, transmits the alert message to a cellular telephone 150b via data link 165. Accordingly, exemplary data link 165 is carried over air per the transmission and signaling protocols of the cellular service provider. It is to be understood that OCC 140b and communication system 160 may be operated by a single entity and may, in fact, be co-located at a single facility. In the following descriptions, communication devices 150b and 150b, and other devices serving as a terminal receiving an alert, will be generically referred to as a terminal device 150.

It is to be understood that although a single OTS 500 is illustrated in FIGS. 1A-1B, certain embodiments of the present invention will deploy several OTSs 500 in selected locations about a region of interest. Accordingly, each OTS 500 may have assigned thereto a unique address by which it alone can be accessed via, for example, the satellite data link 125. Additionally, each OTS 500 may transmit a unique identifier with its corresponding data to the OCC 140 to distinguish data sets from individual OTSs.

Further, it is to be understood that while the embodiments described with reference to FIGS. 1A-1B utilize satellite communications between the OTS 500 and the OCC 140, other communication facilities may be utilized with the present invention without deviating from the spirit and intended scope thereof. For example, in certain embodiments of the present invention, data from the OTS 500 are transmitted over a network 124 via data links 122a and 122b. In such embodiments, data links 122a and 122b may be compliant with TCP/IP and carried via a metallic conductor data trunk or wirelessly per deployment preferences. Alternative networks and protocols, such as Bluetooth, RS-232, USB, etc. may also be used with the present invention either alone or in combination with other communication facilities and protocols.

In certain embodiments of the present invention, an alert may be issued directly from OTS 500 through the appropriate data links, such as those described above, without further analysis by equipment and/or personnel in OCC 140. For example, OTS 500 may have on board a target classification and analysis system by which it can be determined whether alert criteria are met. Such implementations will be readily recognized through the descriptions of the exemplary embodiments of the present invention provided below.

OTS 500 may be configured to form an image of a target through an electrical signal that is proportional to the electromagnetic radiation received thereat. In certain embodiments of the present invention, OTS 500 passively intercepts radiation, such as thermal radiation emitted by the target, and produces one or more values proportional to the received radiation. For example, the OTS 500 may include an infrared detector to produce a signal proportional to the thermal radiation emitted by the target. The present invention will be described in the following embodiments as converting thermal radiation into an electrical signal, such as through one or more infrared detectors, but it is to be understood that the present general inventive concept is not so limited, as the ordinarily skilled artisan will readily recognize upon reading this disclosure.

Figure 2A:
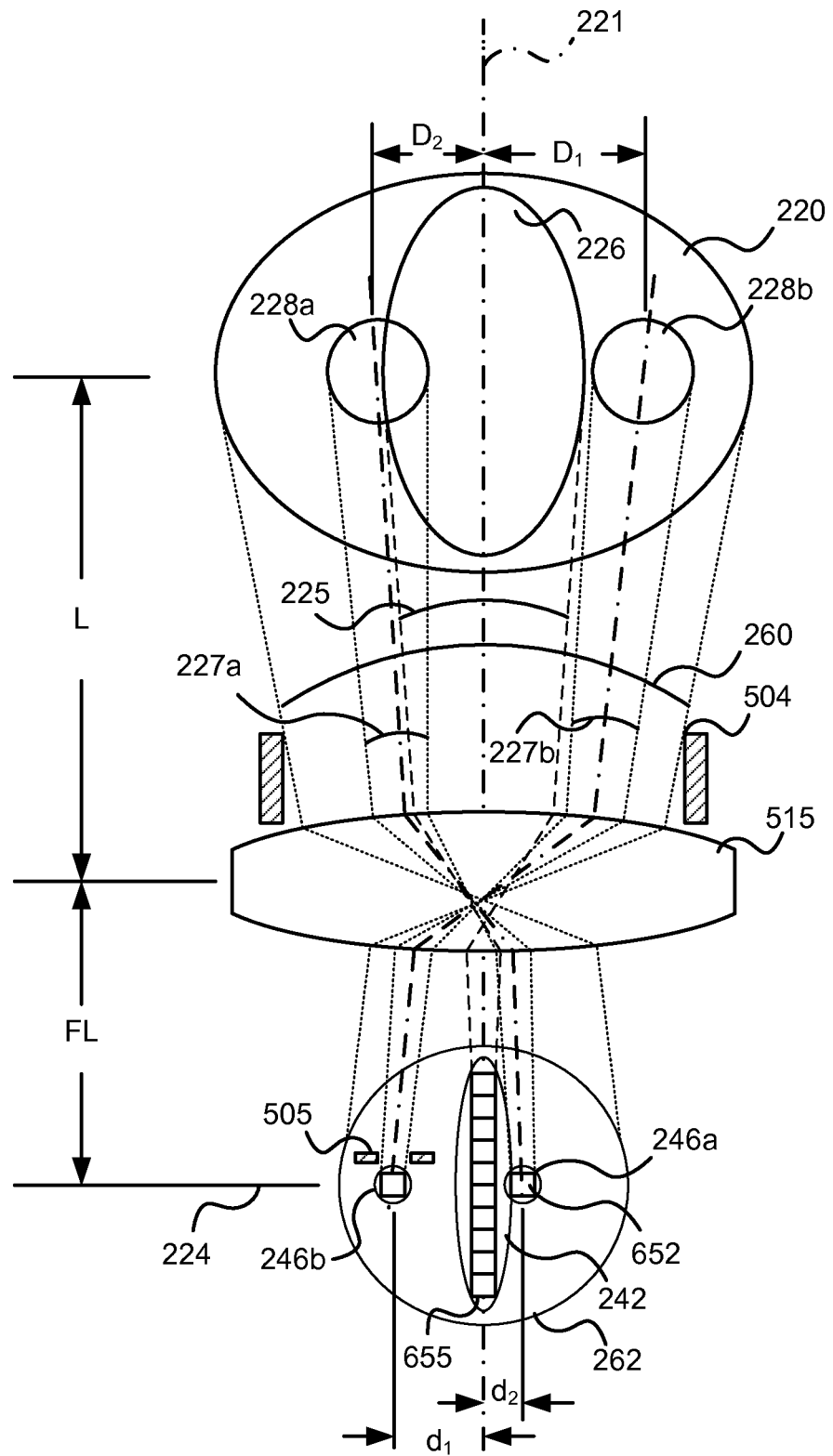

FIGS. 2A-2F depict certain basic principles underlying various embodiments of the present invention. FIG. 2A is a conceptual diagram illustrating exemplary elements underlying embodiments of the present invention and FIGS. 2B-2F depict exemplary functionality of embodiments of the present invention using the exemplary elements illustrated in FIG. 2A. It is to be understood that the illustrations of FIG. 2B-2F are all of the same system of objects, as described in the paragraphs that follow, over the passage of time from left to right, i.e., from FIG. 2B to FIG. 2F. Accordingly, except where otherwise apparent, reference numerals illustrated in one of the figures is intended to represent the same element in all of the figures, and the reference to FIG. 2 is intended to encompass the principle of operation, as a whole, of the exemplary embodiment depicted in FIGS. 2A-2F. Further, it is to be understood that for purposes of description and not limitation, the illustrations in FIGS. 2B-2F represent the exemplary system of objects in successive sampling periods; however, a particular sampling rate is not implied by, and should not be inferred from the figures and the descriptions thereof.

In FIG. 2, it is to be assumed that an optical axis 221 of an OTS 500 is aligned to a region of interest so that such region of interest is encompassed by the field of view 220 of OTS 500. As used herein, field of view refers to the angular extent 260 of the region of interest through which the thermal radiation therefrom is accepted into OTS 500. The OTS 500 includes one or more optical elements, represented in total at element 515 and referred to herein as optical subsystem 515, to focus the incoming thermal radiation onto an image plane 224. The thermal radiation accepted into OTS 500 is thus distributed over the image plane 224, as representatively illustrated at 262.

In accordance with the present invention, OTS 500 may comprise multiple optical apertures, where an optical aperture of the OTS 500, as used herein, is the aperture stop in the optical path of the system, as imaged through the optical subsystem 515, that defines the cone angle of light rays that impinge a detector on the imaging plane of the system. In FIG. 2, the opening 504 formed in an exterior housing, the edge of the optical elements in optical subsystem 515 and/or certain mounting structures thereof and appropriately positioned stops and irises, representatively illustrated at aperture stop 505 are all aperture stops, but it is the intersection of the focal spot in the image plane 224 and the active area of an imaging detector thereon that defines the optical apertures of the exemplary configuration of FIG. 2. The optical aperture of the OTS 500 that defines the cone angle 225 of the electromagnetic radiation admitted and focused onto the image plane 224 is referred to as herein as the imaging aperture of the system. In the exemplary configuration illustrated in FIG. 2A, the imaging aperture, representatively illustrated at 226, is defined by the edges of detector array 655 disposed on the image plane 224. It is to be understood that, while in a strict sense, distinct imaging apertures would be defined by the active areas of respective detectors in detector array 655, for purposes of description and not limitation, the imaging aperture 226 of the exemplary embodiments of the present invention shall be described herein as if defined by a single aperture stop, such as the edges of the active areas of the detector array 655 as a whole. It is to be further understood that, solely for the purpose of simplification, a description herein of an object being, "in the imaging aperture," or any other optical aperture unless otherwise indicated, is intended to mean that the object is, "in the field of view of the OTS 500 and within the cone angle defined by the imaging aperture."

In certain embodiments of the invention, an optical aperture of OTS 500 admits radiation for purposes other than for imaging, such as for control and signaling. For example, the radiation admitted through cone angles 227a and 227b may be limited by additional physical aperture stops in a manner that separates the radiation distributed on the image plane 224 into an imaging area 242 and signaling areas 246a and 246b, respectively. Such partitioning may be achieved by, for example, a particular arrangement of optical elements and/or by separating by a predetermined distance, such as illustrated by distances $d_1$ and $d_2$, one or more detectors in the image plane 224 that are used for imaging from one or more detectors in the image plane 224 that are used for signaling. Of the total amount of radiation then focused onto the image plane 224, the radiation admitted through the imaging aperture 226 is available for imaging, while the radiation admitted through the cone angles 227a and 227b, but not available for imaging, is accepted through what is referred to herein as signaling apertures 228a and 228b, respectively. It is to be understood, however, that the imaging aperture 226 and one or more of the signaling apertures 228a and 228b may intersect, but at least a portion of the signaling aperture 228 may be removed from the imaging aperture 226. Additionally, for purposes of explanation and not limitation, the signaling apertures in embodiments described herein, such as signaling apertures 228a and 228b, may be collectively referred to and illustrated as a single signaling aperture 228.

It is to be understood that while the imaging detector array 655 and the sentinel detectors 653 are illustrated as residing in a single image plane 224, the present invention is not so limited. For example, one or more sentinel detectors 653 may be housed separately from other detectors in OTS 500, and may include a separate optical system. Such embodiments may be utilized to establish distances $d_1$ and $d_2$, and ultimately distances $D_1$ and $D_2$, by which information pertaining to activity in the region of interest may be derived. Exemplary embodiments of such are described in more detail below.

As an emissive target passes through the field of view of OTS 500, the thermal radiation emitted thereby is focused on the image plane 224 in a spatiotemporal distribution thereof. In certain embodiments of the present invention, at any instance of time, the distribution of thermal radiation impinging the signaling area 246 of the image plane 224 may be analyzed separately from the distribution of thermal radiation impinging the imaging area 242 of the image plane 224. Accordingly, the thermal radiation distributed over the signaling area 246 may be used, at any instant of time, to establish certain characteristics of the target that must be present lest image capture of the target be inhibited.

In accordance with certain embodiments of the present invention, an array of imaging detectors is situated in the imaging area 242, the electrical output of which is used to form a corresponding number of pixel values in an image. In certain embodiments of the invention, the array of imaging detectors is a linear array, such as is illustrated by linear array 655, from which a corresponding linear array of pixels is produced. As used herein, such a linear array of pixels is referred to as a line image, examples of which are illustrated in FIGS. 2B-2F at line images 230, 232, 234, 236 and 238. Hereinafter, where not otherwise apparent, a line image will be generically referred to as one or more line images 230. Each of the line images 230 comprise pixels, representatively illustrated at pixels 231, 233 and 235, each of which are assigned values corresponding to the output of one or more imaging detectors in the image area 242. Additionally, one or more detectors may be situated in the signaling area 246, referred to herein as sentinel detectors, such as is illustrated in FIG. 2A by sentinel detector 653, the electrical output of which is used to, for example, perform signaling or control functions. For purposes of the following description, the electrical output of the sentinel detectors is representatively illustrated in FIGS. 2B-2F as pixels 240, 242 and will be referred to herein as signaling pixels 240, 242, although it is to be understood that the electrical output of the sentinel detectors may not be used to assign a value to a pixel of an image, per se.

Operation of the exemplary OTS 500 will now be described for the time interval represented in FIGS. 2B-2F. Throughout the following description, the pixels in line images 230, as well as the pixels 240 and 242 will be described as having values assigned thereto of a magnitude proportional to the thermal radiation impinging the corresponding detector. The magnitude of the value assigned to a pixel is representatively illustrated in FIG. 2 by the shading thereof; a denser shading in the illustrated pixel is intended to represent a greater magnitude in the value assigned thereto. For example, pixel 231 is illustrated as being assigned a low value, such as to correspond with a level of background radiation, pixel 235 is illustrated as being assigned a value greater than pixel 231, and pixel 233 is illustrated as being assigned a very high value, such as to represent the presence of a highly emissive source on a target.

FIG. 2B illustrates a target 210, exemplified by a moving human subject carrying a lit cigarette 211 (to exemplify a highly emissive source on the target 210), entering the field of view of OTS 500 such that the thermal radiation emitted thereby impinges the image plane 224 via the signaling aperture 228. The radiation is detected by a sentinel detector 653, as illustrated by the dark shading in pixel 240 of FIG. 2A. In certain embodiments of the present invention, upon the electrical signal produced by the sentinel detector 653 exceeding a threshold value, a predetermined action is taken, such as, for example, exiting a standby mode or wait state. It is to be understood that the radiation from a highly emissive source on a target, such as that emitted by the exemplary cigarette 211, will typically exceed by a great margin the amount necessary to trigger the predetermined action.

In FIG. 2C, as the target 210 moves across the field of view of the OTS 500, the radiation emitted thereby is admitted into the OTS 500 via the imaging aperture 226. Accordingly, the pixels of line image 232 are assigned values corresponding to the thermal radiation emitted by different portions of the target 210. For example, pixel 233 indicates by its high value a relative "hot spot" corresponding to the lit cigarette 211. The pixels of line image 232 may be stored in a data storage device and the OTS 500 is made ready for data acquisition in the subsequent sample period. The process is repeated, as illustrated in FIGS. 2D-2F, as long as the OTS 500 can discern the target 210 in its field of view. Once the thermal radiation from the target 211 can no longer be discerned by the OTS 500, the OTS 500 may transition into a standby mode, such as a reduced power consumption wait state.

It is to be understood that although the foregoing description is that of a target that is more emissive, or warmer than the background radiation, embodiments of the present invention may operate in a complementary manner; a cooler target passing between a warmer background and the OTS 500 may be discerned equally as well. In certain embodiments of the present invention, the pixels of each line image are subtracted from the corresponding pixels of the line image captured in the previous sample period. The residue resulting from such subtraction is indicative of the temporally non-stationary emissions within the field of view of the OTS 500. Accordingly, temporally stationary background values may be removed regardless of the whether the target is warmer or cooler relatively thereto.

Additionally, tracking of the levels of background radiation over time may continually provide a radiation level about which the distribution of thermal radiation over the imaging plane 224 may be compared. For example, periodic measurements of background radiation, such as at every few hours and/or after every image acquisition cycle may be made and a representative numerical value for the background radiation may be stored in memory. A predetermined action, such as described above, may be subsequently triggered by the levels of thermal radiation in the signaling area 246 falling below the background level by a predetermined amount.

Figure 3B:
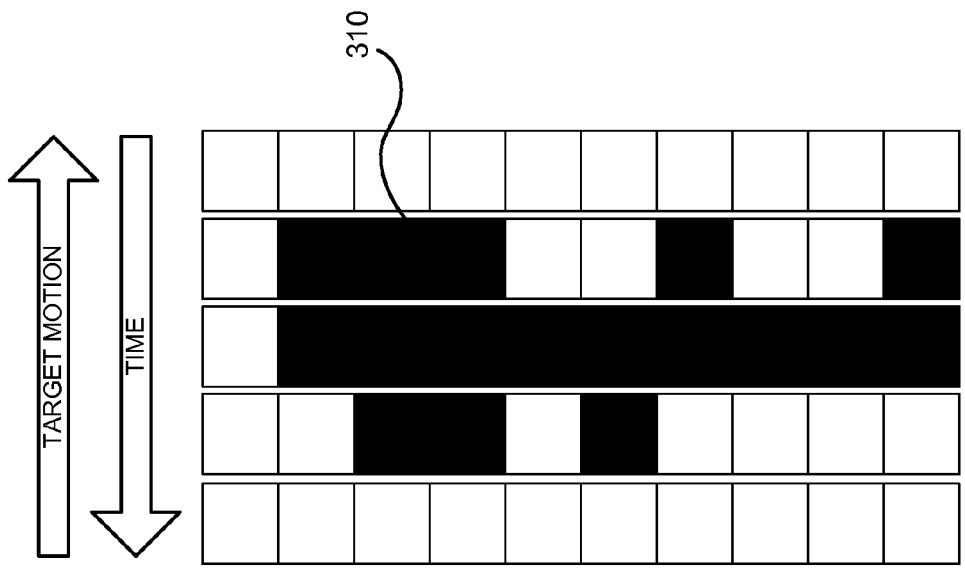
FIGS. 3A-3B are illustrations of exemplary images captured by an unattended spatial sensor constructed in accordance with the present general inventive concept.
Figure 3A:
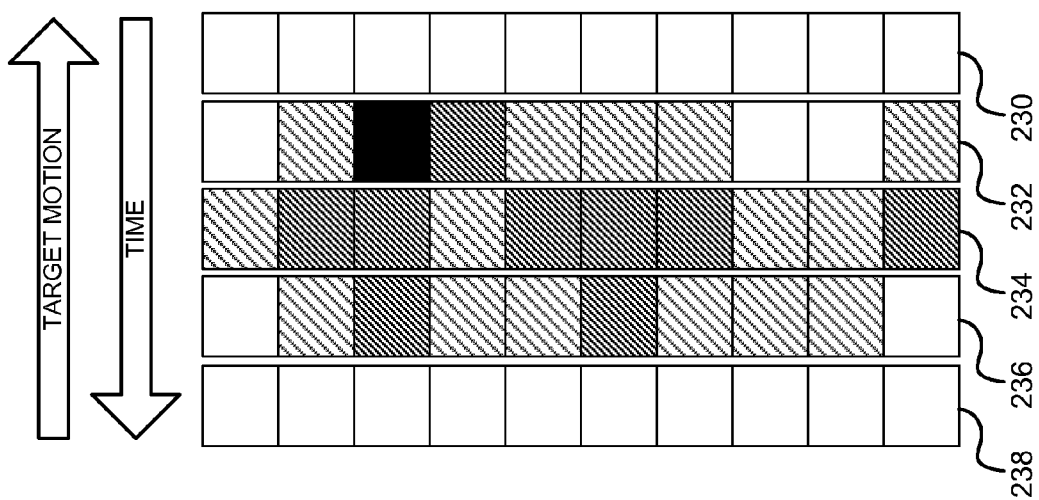

Referring now to FIGS. 3A-3B, there is illustrated a temporal integration of the radiation emitted by the target 210 over the time interval illustrated in FIG. 2. The illustrated time integration encompasses the line images 230-238 collected from the imaging detectors during the subject time interval. As is illustrated in the figure, a two-dimensional profile of the target 210 is formed from the pixel data contained in the line images 230-238. The pixel data in line images 230-238 may be further quantized to construct a binary, silhouette profile 310 of the target 210. The silhouette profile 310 may be used in conjunction with certain pattern recognition techniques to classify and identify the target 210 or may be used to reduce bandwidth requirements for transmission. Depending upon the application in which the present invention is embodied, the identification of the presence of a member of one class of target, such as a human target 210, in the region of interest may require that an alert be issued to those having an interest in such, referred to herein generically as an alert recipient. On the other hand, if the silhouette profile 310 indicates the presence of a member of another class of targets, such as an animal target, embodiments of the present invention may be configured to ignore such a presence to the extent that no alert is issued. Exemplary embodiments of the present invention in which the alarm and identification features are implemented are described further below.

Figure 4:
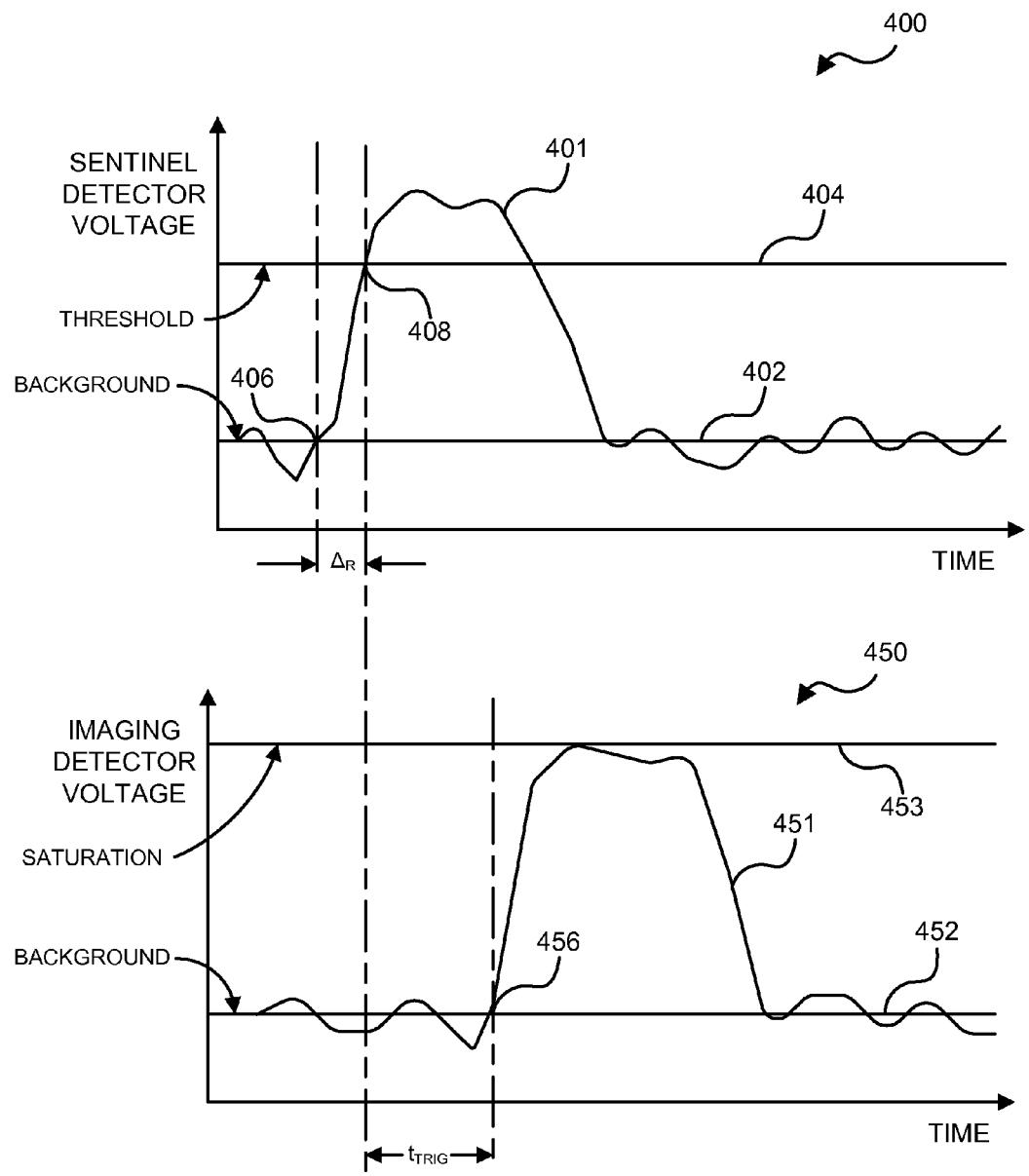
FIG. 4 is a graph illustrating exemplary detector timing in accordance with the present general inventive concept.

FIG. 4 illustrates an exemplary relationship between the sentinel detector voltage, representatively illustrated in graph 400, to the imaging detector voltage, representatively illustrated in graph 450. In the absence of an emissive target, as illustrated in FIG. 4, the sentinel detector voltage 401 is distributed substantially about a voltage corresponding to background radiation, where such voltage will be referred to herein as background voltage 402. As an emissive target enters the signaling aperture 228, the sentinel detector voltage begins to rise, as representatively illustrated at voltage 406, until the voltage reaches a threshold voltage 404. The duration over which this voltage increase occurs, $\Delta_R$, is defined by various factors such as, for example, the speed at which the target is moving into the signaling aperture 228 and the response time of the sentinel detector. Without loss of generality, the voltage 406 crossing the threshold voltage 404 will be referred to herein as a trigger condition.

As the target moves into the imaging aperture 226, the imaging detector voltage 451 of one or more of the imaging detectors begins to rise from the background voltage 452, as representatively illustrated at voltage 456. The time interval $t_{TRIG}$ from the time the sentinel detector voltage 401 crosses the threshold voltage 404, i.e., the trigger condition, to the time at which the target 210 enters the imaging aperture 226 is a design parameter of embodiments of the present invention. For example, if the trigger condition is intended to compel a certain action, such as to transition a state machine on the OTS 500 from a wait state, the time interval $t_{TRIG}$ should be made long enough to allow the action to complete to the extent that it must, but made short enough so that the OTS 500 is prepared, to the extent that it must, to capture data when the target 210 enters the imaging aperture 226. Additionally, when the distance between the imaging detectors and the sentinel detectors is known, as illustrated in FIG. 2A, $t_{TRIG}$ may be used to identify the velocity of the target, as is described in more detail below. System designers can make certain design trade-offs to meet such requirements on an application-dependent basis without deviating from the spirit and intended scope of the present invention. Additionally, the OTS 500 may be calibrated to assign a value corresponding to the imaging detector voltage 451 to a pixel in line image 330 such that a minimum pixel value refers to the background voltage 452 and a maximum pixel value refers to the saturation voltage 453.

Figure 5A:
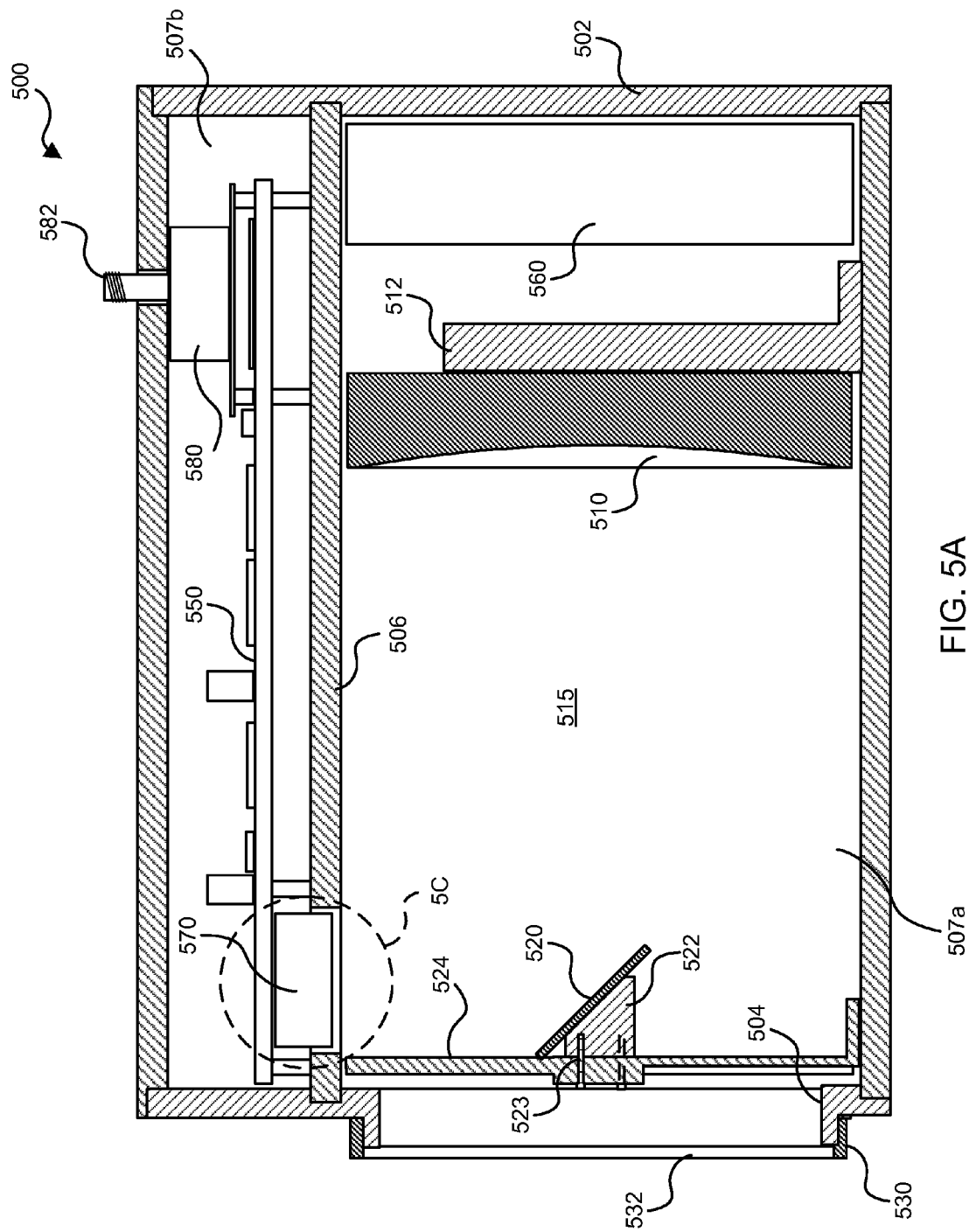
FIGS. 5A-5E are illustrations of exemplary components of an unattended spatial sensor constructed, and the coordinated functions thereof, in accordance with the present general inventive concept.
Figure 5B:
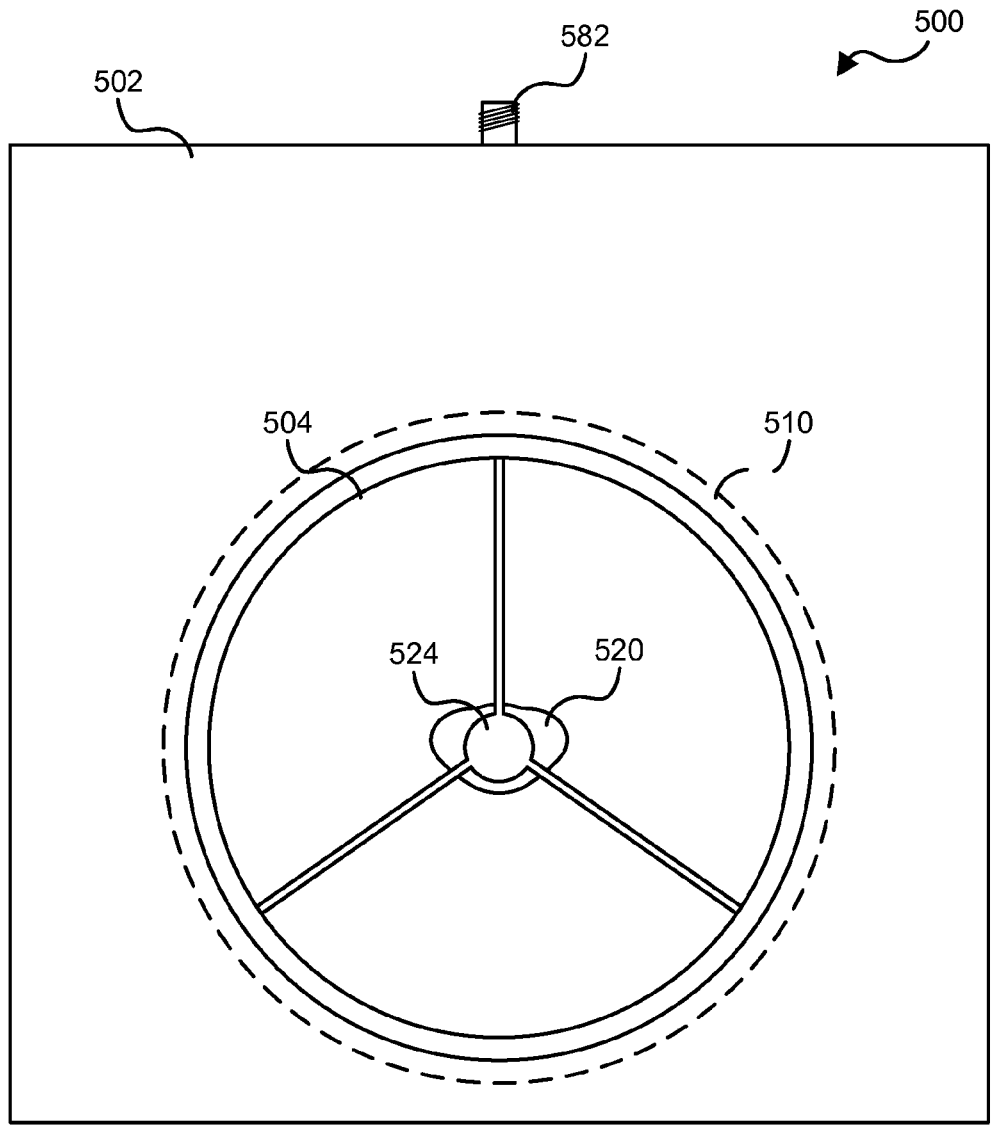

Referring now to FIGS. 5A-5B, there is illustrated an exemplary embodiment of an OTS 500 constructed in accordance with the present general inventive concept. It is to be understood that the system configuration illustrated in FIGS. 5A-5B is but one of many that may be used to achieve the benefits of the present invention. Further, the illustrations of FIGS. 5A-5B portray certain features of the exemplary embodiment without regard to actual sizes of those features; the illustrations are not drawn to scale and none should be inferred therefrom.

As is illustrated in the figures, exemplary OTS 500 includes an outer housing 502 to house the components thereof. The outer housing 502 may be constructed from a material suitable for its use in the intended environment. For example, if the OTS 500 is to be used in a remote, outdoor location, the outer housing 502 may be constructed from a metal such as aluminum or stainless steel. Additionally, the outer housing 502 may be assembled from multiple pieces fastened together and suitably sealed against environmental elements, such as light, humidity and dust.

The outer housing 502 may be partitioned into multiple chambers 507a-507b by one or more partitioning elements, representatively illustrated by partition 506. It is to be understood that chambers 507a-507c created by the partitions 506 need not be isolated one from another; adjacent chambers may be in communication with one another through openings in the partitions 506. Additionally, the partitions 506 may serve as mounting structures for components of the OTS 500 as well as for electromagnetic shielding between chambers 507a-507b.

In chamber 507a, an optical subsystem 515 is mounted to receive thermal radiation through housing opening 504 and to focus the radiation onto the image plane 224 of the OTS 500 located, for example, in detector subsystem 570. Optical subsystem 515 is a key component in establishing the signaling and imaging apertures. Moreover, the dimensions and physical properties of the materials used to construct the optical subsystem 515 are dependent upon the electromagnetic radiation being focused thereby. As such, numerous configurations of optical subsystem 515 may be used with the present invention without departing from the spirit and intended scope thereof. The exemplary embodiment of the invention illustrated in FIGS. 5A-5B may be used in thermal radiation applications; however, the ordinarily skilled artisan will recognize numerous other applications, and optical subsystems therefor, upon review of this disclosure.

Optical subsystem 515 may include a primary mirror 510 aligned in the housing opening 504. It is to be understood that the primary mirror 510 need not be centrally aligned in the housing opening 504, but need only be optically aligned in the housing opening 504 so as to collect and reflectively redirect the thermal radiation towards designated optical elements in the optical subsystem 515. The exemplary primary mirror 510 illustrated in FIGS. 5A-5B is an axially-symmetrical spherically-concave surface-reflecting mirror and is mounted in the chamber 507a by a primary mirror mount 512 so as to be in coaxial alignment with the opening 504.

The exemplary optical subsystem 515 illustrated in FIGS. 5A-5B includes a secondary mirror 520 mutually aligned with the primary mirror 510 and the detector subsystem 570. The secondary mirror 520 may be mounted on a secondary mirror mount 522, which may be supported to be coaxially aligned in the opening 504 by a strut system 524. Additionally, the secondary mirror mount 522 may be coupled to the strut system 524 through one of more adjustment screws 523 that can be manipulated to establish the direction in which the electromagnetic radiation impinging the secondary mirror 520 is reflected. Once alignment of the secondary mirror 520 has been established, the adjustment screws 523 may be secured in position by, for example, nylon inserts or thread-locking fluid so that the secondary mirror 520 remains aligned during deployment of the OTS 500. It is to be understood that while the secondary mirror 520 is illustrated as lying in a plane tilted 45° relative to the optical axis of the primary mirror 510, other secondary mirror configurations may be used with the present invention without departing from the spirit and intended scope thereof.

Primary mirror 510 and secondary mirror 520 may be coated with a reflective coating selected in accordance with the electromagnetic radiation being reflected. For example, in thermal radiation applications, primary mirror 510 and secondary mirror 520 may be coated with an infrared reflective coating, such as gold. In certain embodiments of the present invention, secondary mirror 520 is assigned geometric properties to combine with those of detectors in detector subsystem 570 to establish the signaling aperture 228 and imaging aperture 226, such as described below with reference to FIG. 8.

Opening 504 in housing 502 may be sealed by a cap 530 to protect the optical subsystem 515 from degradation or damage caused from airborne debris at the deployment location of OTS 500. The cap 530 may include an optical filter 532 to select a band of frequencies of the electromagnetic radiation entering the opening 504. For example, in thermal radiation applications, the filter 532 may be formed from a dielectric material that is optically opaque to visible light, but optically transparent to infrared radiation, such as, but not limited to filter glass, polycarbonate and vinyl. Additionally, the material used in optical filter 532 may be chosen to be robust against conditions of the particular environment in which the OTS 500 is deployed.

It is to be noted that the optical subsystem 515 of OTS 500 avoids the costs and other disadvantages of infrared diffractive optical elements typically used in thermography. Optical filter 532 may be embodied in molded plastic in unitary construction with cap 530 so as to be easily and inexpensively replaced as necessary.

Exemplary circuit subsystem 550 implements circuits to perform, among other things, various control, data collection and communication tasks, and may be disposed in, for example, chamber 507b. Chamber 507b may be constructed to shield circuit subsystem 550 from electromagnetic radiation that may prohibit its proper operation. The exemplary circuit subsystem 550 is in electrical communication with detector subsystem 570 as well as with communication subsystem 580 and contains all of the circuitry needed to, among other things, control the interoperation subsystems of OTS 500, to collect and format data collected from detector subsystem 570, to transmit the formatted data to a remote receiver, and to receive and execute commands and maintenance tasks transmitted thereto. Communication subsystem 580 may include a connector 582 extending through the housing 502 by which a suitable antenna (not illustrated) may be connected. An exemplary embodiment of circuit subsystem 550 is described below with reference to FIG. 12.

OTS 500 may include a power source, such as a battery 560, so that it may operate autonomously and continuously at its deployment location. Accordingly, battery 560 should be capable of providing operating power to OTS 500 over the entire duration in which the OTS 500 is deployed. This may be achieved through any suitable extended-life or rechargeable battery. A rechargeable battery may be recharged by an external source such as a solar cell array (not illustrated). In certain embodiments of the invention, such a solar cell array may be the primary power source of the OTS 500, and battery 560 may be used to provide backup power or primary power during periods of darkness. Alternatively, OTS 500 may include a power converter (not illustrated) by which an alternating current source may be used in addition to, or in the place of the battery 560. The power converter may be configured as a battery charger. The ordinarily skilled artisan will recognize many variations and alternative power sources that may be used with the present invention without deviating from the spirit and intended scope thereof.

Figure 5C:
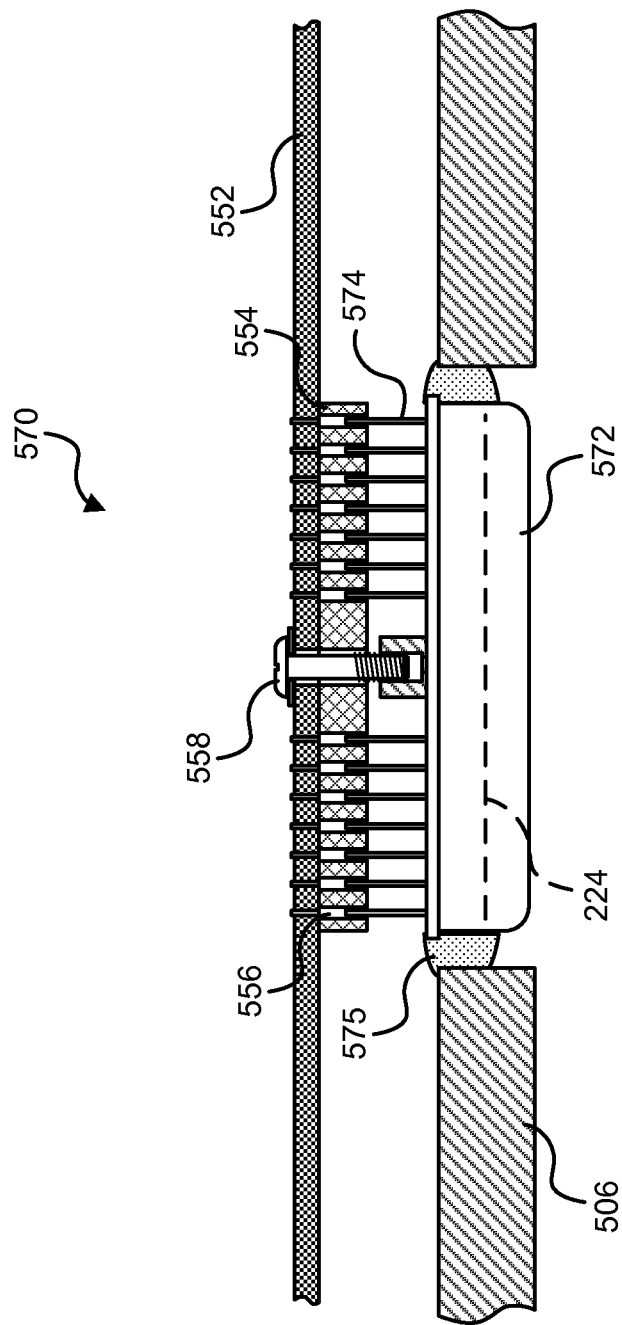

In certain embodiments of the present invention, optical subsystem 515 may include a mechanism to optimally position the image plane 224 in detector subsystem 570. FIG. 5C is a close up view of region 5C in FIG. 5A illustrating an exemplary configuration to selectively position detector subsystem 570. As illustrated in the figure, image plane 224 is located in detector package 572 of the exemplary detector subsystem 570. In the exemplary embodiment illustrated, the detector package 572 houses a focal plane detector array (described below with reference to FIGS. 6A-6E) that is to be positioned at the image plane 224 as defined by the optical subsystem 515. Exemplary detector package 572 implements a plurality of electrically conductive pins 574 that are electrically coupled to the focal plane array. A package socket 554 is mechanically coupled to circuit board 552 and implements a plurality of electrically conductive pin sockets 556 that are electrically coupled to circuit subsystem 550. Pins 574 are received in pin sockets 556 of package socket 554 so as to provide an electrically continuous circuit path between the focal plane array and circuit subsystem 550. The pins 574 have suitable length and the sockets 556 have a correspondingly suitable depth to accommodate relative motion therebetween over a suitable focusing range while maintaining electrical continuity. By placing an emissive standard in the field of view of the OTS 500, the signal strength of the sentinel detectors and the imaging detectors may be monitored while the image plane 224 is translated along the optical path, such as by rotating focusing screw 558. The imaging aperture 226 and the signaling aperture 228 are dependent upon the focus of thermal radiation onto the active area of the imaging detectors and the sentinel detectors, respectively. Accordingly, exemplary detector positioning mechanism illustrated in FIG. 5B provides additional means by which the apertures of OTS 500 may be established. Once the image plane 224 has been positioned, the detector package 572 may be retained by a sealant or gasket 575. The gasket 575 may also be provided to prevent electromagnetic radiation from entering the optical subsystem 515 and consequently contaminating the signals produced by the detectors.

Figure 5D:
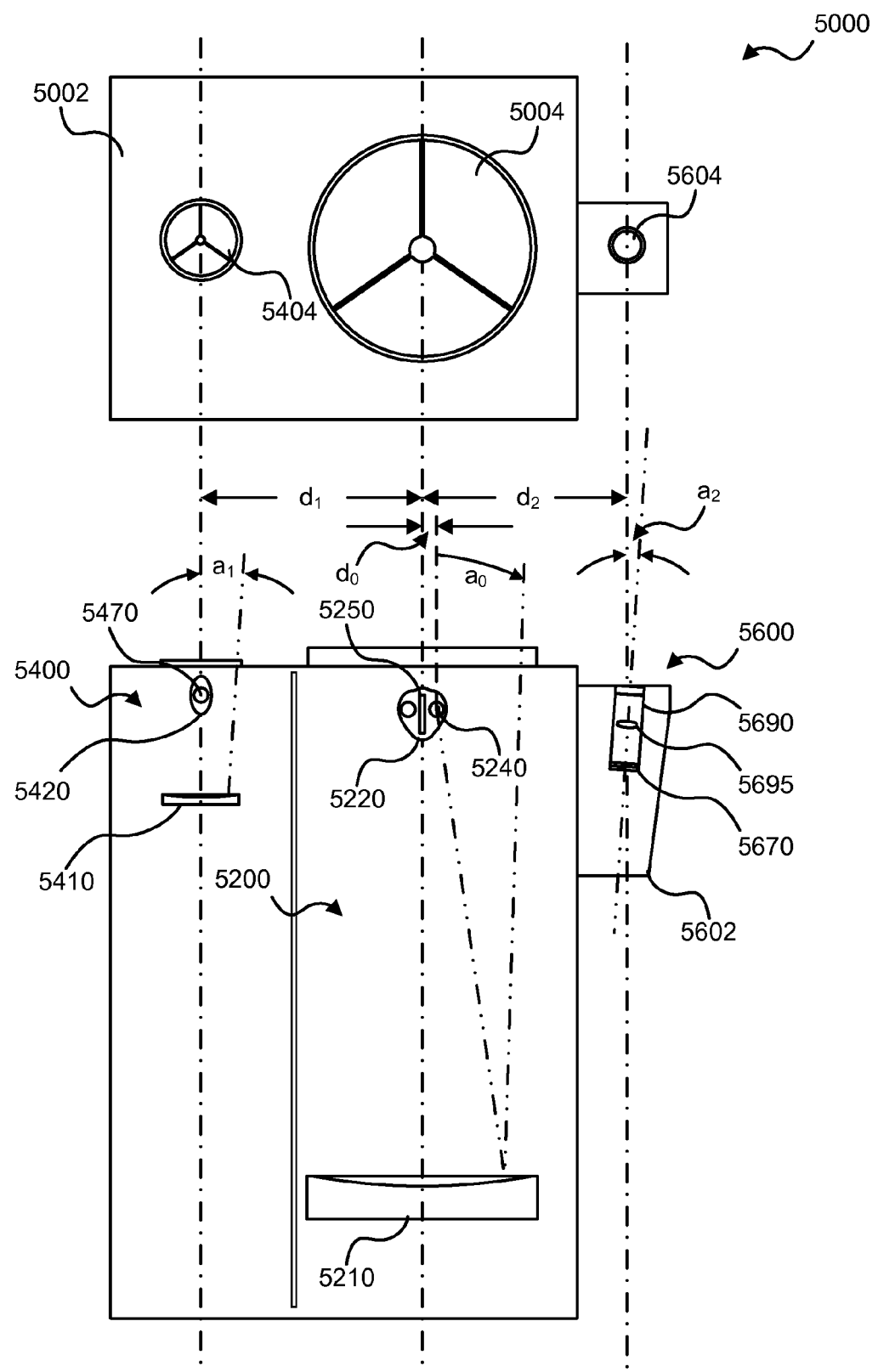

Referring now to FIG. 5D, there is illustrated another embodiment of an OTS 5000 constructed in accordance with the present invention. As illustrated in the figure, OTS 5000 includes a housing 5002 through which an opening 5004 is formed. An optical subsystem 5200 may be in optical communication with the opening 5004 and may be configured in similar fashion to the optical subsystem 515 in FIG. 5A. For example, optical subsystem 5200 may include a primary mirror 5210 and a secondary mirror 5220 to focus electromagnetic radiation onto an imaging array 5250, and one or more sentinel detectors 5240 separated from the imaging array 5250 by a distance $d_0$. The optical subsystem 5200 may define a signaling aperture that accepts thermal radiation through a cone angle $a_0$.

In addition to the optical subsystem 5200, certain embodiments of the present invention may include one or more auxiliary optical systems, such as is illustrated at optical subsystem 5400 and optical subsystem 5600. The auxiliary optical subsystems 5400 and 5600 may focus electromagnetic radiation onto an external sentinel detector, representatively illustrated at detector 5470 and 5670, respectively. The present invention is not limited to a particular optical configuration to focus electromagnetic radiation onto an external sentinel detector. For example, exemplary optical subsystem 5400 is a reflective telescope configuration optically coupled to a physical aperture 5404. Exemplary optical subsystem 5400 thus includes a concave spherical primary mirror 5410 optically aligned on a secondary mirror 5420. The optical subsystem 5400 may define an external signaling aperture that accepts thermal radiation through a cone angle $a_1$ and may be physically separated from the optical subsystem 5200 by a distance $d_1$.

Alternatively, the auxiliary optical subsystem may be a refractive system 5600 comprising one or more refractive elements, representatively illustrated at 5695 in an optical tube 5690. The optical tube 5690 may be mechanically attached to the housing 5002 by an external housing 5602 so as to be physically separated from optical subsystem 5200 by a distance $d_2$. It is to be understood that the auxiliary optical subsystem 5400, 5600 may be detached from the housing 5002 without departing from the spirit and intended scope of the present invention. Optical subsystem 5600 may be aligned along an optical axis that is nonparallel to the optical axis of optical subsystem 5200, such as by a relative angle $a_2$.

Figure 5E:
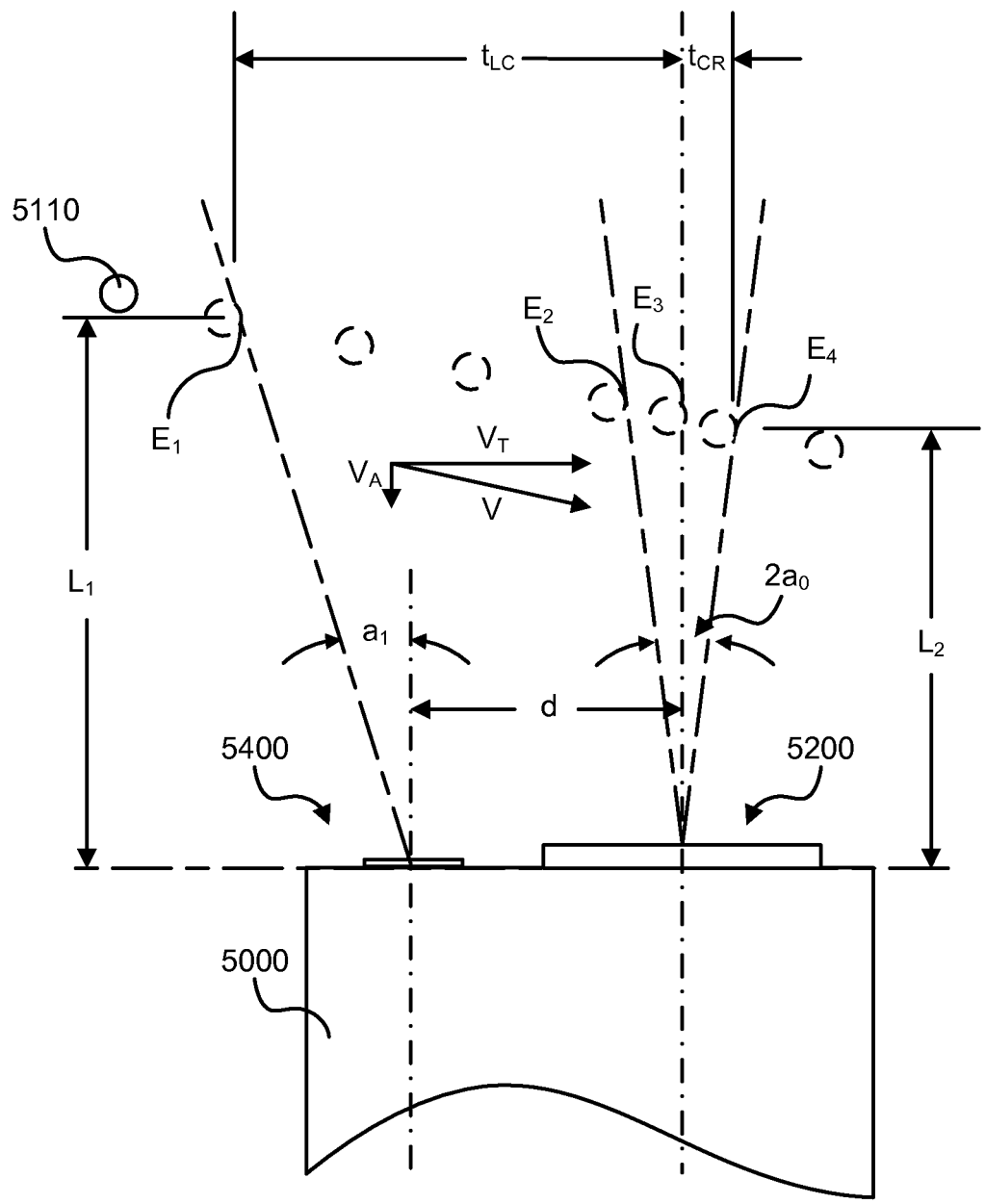

The offset distances $d_0$-$d_3$, the cone angles $a_0$-$a_1$ and the axis angle $a_2$ are design parameters that may be varied according to application requirements and are thus assumed to be fixed and known. When so embodied, additional information regarding a target can be ascertained by the present invention, as illustrated in FIG. 5E. The exemplary OTS 5000 illustrated in FIG. 5E includes the optical subsystem 5200 having a signaling aperture defining the cone angle $a_0$ and the auxiliary optical subsystem 5400 having a signaling aperture defining the cone angle $a_1$. The axes of optical systems 5200 and 5400 are separated by a known distance d.

It is to be assumed that an emissive target 5110 traverses a region of interest on which the OTS 5000 is aligned. It is to be further assumed that target 5110 proceeds along an unknown trajectory V having a transverse velocity component $V_T$ and an axial velocity component $V_A$. Likewise, it is to be assumed that upon entering the field of view of OTS 5000, the target 5110 is at a distance $L_1$ therefrom and upon exiting the field of view of OTS 5000, the target is at a distance $L_2$ therefrom. The average distance from OTS 5000 will be referred to herein simply as L.

As the target 5110 traverses the region of interest, OTS 5000 may record the time, or at least the relative time, at which certain events, such as events $E_1$-$E_4$, occur. In the exemplary embodiment illustrated in FIG. 5E, event $E_1$ occurs when target 5110 enters the signaling aperture of auxiliary optical subsystem 5400, event $E_2$ occurs when target 5110 enters the signaling aperture of optical subsystem 5200, at which time acquisition of target images begins, event $E_3$ occurs when target passes through the optical axis of optical subsystem 5200, and event $E_4$ occurs when target 5110 exits the signaling aperture of optical subsystem 5200 and subsequently exits the field of view of OTS 5000. The occurrence time of events $E_1$-$E_4$, or the respective time intervals between the events, may be tracked by a suitable event timer and the respective interval lengths may be stored in temporary memory. The time interval between events $E_1$ and $E_3$ will be referred to as $t_{LC}$ and the time interval between events $E_3$ and $E_4$ will be referred to as $t_{CR}$. Once the time intervals are known, the distance to the target L and the transverse velocity component $V_T$ may be obtained through the relationships:

$$t_{LC}=(L\times\tan(a_1)+d)/V_T, \text{ and} \tag{1}$$

$$t_{CR}=(L\times\tan(a_0))/V_T. \tag{2}$$

Equations (1) and (2) may be solved through suitably programmed linear algebra routines as part of the operational code of OTS 5000. In certain embodiments of the present invention, the physical size of the target may be estimated from knowledge of the distance L, the apparent size of the target in the acquired image, and the characteristics of optical subsystem 5200. Moreover, knowledge of the transverse velocity $V_T$ may be used to establish the number of line images required to adequately represent the target, such as to maintain the aspect ratio of the target in the resulting image.

Various embodiments of detector subsystem 570 will now be described with reference to FIGS. 6A-7D. In accordance with the present invention, the detector subsystem 570 includes one or more detector arrays distributed over the image plane 224 to image one or more selected classes of target and, in certain embodiments, to exclude one or more selected classes of target from being imaged. Given certain knowledge of these classes of target, such as the respective dimensions and emission profiles thereof, the detector array may be suitably configured to inhibit functionality of certain detectors therein unless the distribution of the electromagnetic radiation over the image plane is that of the one or more classes of target selected for imaging.

Figure 6B:
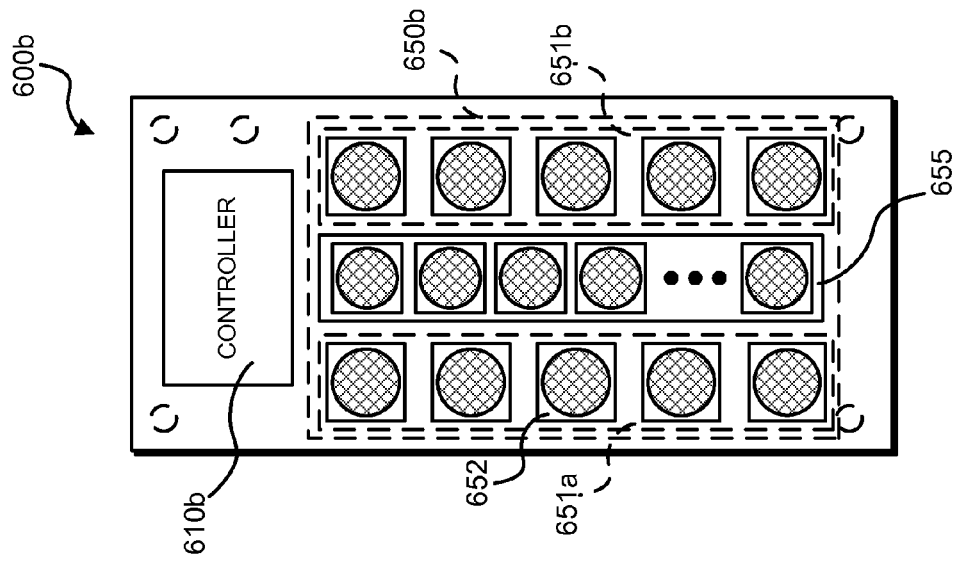
FIGS. 6A-6E are illustrations of exemplary detector configurations of an unattended spatial sensor constructed in accordance with the present general inventive concept.
Figure 6A:
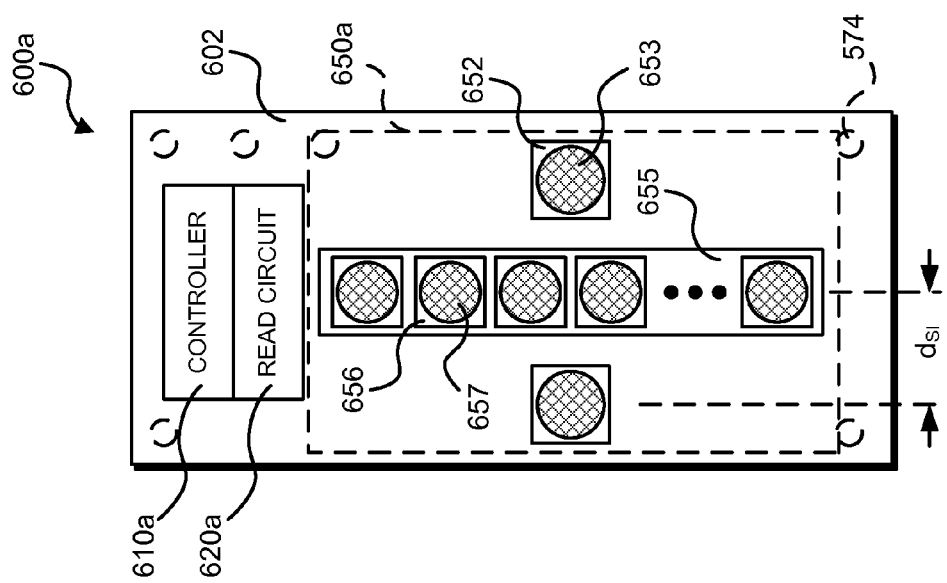

In FIG. 6A, there is illustrated an exemplary detector subsystem 600a consistent with the present invention and usable in certain embodiments thereof. As illustrated in the figure, components of the detector subsystem 600a may be mounted on a suitable substrate 602 on which circuit interconnections (not illustrated) between the components thereon and pins 574 may be disposed. The substrate 602 may have disposed thereon a focal plane array 650a of detectors that are responsive to the electromagnetic radiation at wavelengths thereof suitable to the application or environment for which the present invention is embodied. For example, when used to capture thermal radiation at, for example, 0.9-14 μm wavelengths, the detectors in focal plane array 650a may be, for example, un-cooled pyroelectric infrared detectors or microbolometers, or may be cooled infrared detectors constructed from narrow-gap semiconductor materials. In certain embodiments of the invention that rely on minimal power usage, such as to extend the autonomous deployment lifetime thereof, un-cooled detectors may be used to avoid power consumption required for detector cooling.

Focal plane array 650a may include one or more sentinel detectors 652, each having an active area 653, and a linear array 655 of imaging detectors 656, each having an active area 657. In certain embodiments of the present invention, the active areas 657 are less than 1.0 mm$^2$ and spaced at 0.5 mm intervals. In the exemplary embodiment illustrated in FIG. 6A, a sentinel detector 652 is disposed on each side of linear array 655 so as to detect a target traversing the field of view of OTS 500 in different directions prior to imaging of the target by the imaging detectors 656. The sentinel detector 652 may be positioned on the substrate 602 to invoke a trigger condition only for certain selected target classes. Such can be achieved by locating one or more sentinel detectors 652 on the image plane in a spatial distribution that is complementary to the distribution of electromagnetic radiation that is to be excluded from invoking a trigger condition. For example, in the embodiment of FIG. 6A, the sentinel detectors 652 may be positioned to ignore small animals, but to invoke a trigger condition when a larger target, such as a large animal or human traverses the field of view of OTS 500. That is, the electromagnetic radiation emitted by a small animal would produce a spatial distribution thereof over the image plane that would fail to intersect with the location of the sentinel detector 652. Accordingly, the location of the sentinel detectors 652 on the image plane, i.e., in the focal plane array 650a, can be varied to exclude one or more classes of target from invoking a trigger condition.

As is illustrated in FIG. 6A, the sentinel detector 652 may be separated from the linear array 655 by a predetermined distance $d_{SI}$. The distance $d_{SI}$ is a system design parameter that may be set per application requirements, as described above. The active area 653 of the sentinel detector 652 is a key attribute in establishing the signaling aperture 228 and the active area 657 of the imaging detectors 656 is a key attribute in establishing the imaging aperture 226, and the distance $d_{SI}$ can be set to establish the amount of overlap between the signaling aperture 228 and the imaging aperture 226, which, in turn, establishes the time delay between a trigger condition and the onset of target imaging. Moreover, the distance $d_{SI}$ may be established in accordance with an expected velocity and distance of the target in the field of view of OTS 500. For example, referring to FIG. 2A, it is to be assumed that there is a 0.5 second delay between a trigger condition and system wakeup. It is to be further assumed that the distance L to the region of interest is 100 m and a maximum target speed of 60 mph (approximately 27 m/s), or 14 meters in 0.5 seconds. Thus, the signaling aperture must diverge from the optical axis arctan($D_1/L$), or 8° to ensure that such a target will not be missed due to system wakeup delay. To determine from this the proper spacing $d_{SI}$, (or $d_1$ in FIG. 2A), it is to be assumed that the distance from the focal plane array to the focusing optics is approximately the focal length FL. Assuming for purposes of explanation and not limitation, for a focal length FL of 15 cm, the distance $d_{SI}$ can be estimated by FL*$D_1$/L=2.1 cm. By the same reasoning, when human targets are expected having a maximum walking speed of 6 mph, the distance $d_{SI}$ may be set at a mere 2 mm.

The detectors of the focal plane array 650 may be read and converted to a digital signal by a read circuit 620, an exemplary embodiment of which is described with reference to FIG. 12. Additionally, the detector subsystem 600a may include a controller 610 that controls the manner in which the detectors are read and/or may control a detector cooler, should the embodiment of the present invention require such. An exemplary embodiment of a controller 610 is described with reference to FIG. 12.

Another exemplary embodiment of the detector subsystem is illustrated as detector subsystem 600b in FIG. 6B. Detector subsystem 600b differs from detector subsystem 600a by its configuration of sentinel detectors 652. As is illustrated in the figure, focal plane array 650b includes not only a linear array of imaging detectors 655, but also a linear array 651a of sentinel detectors 652 and/or a linear array 651b of sentinel detectors 652. One or more of the sentinel detectors in either or both arrays 651a and 651b can be selected, such as by controller 610b, to establish a sentinel detector configuration corresponding to the distribution of electromagnetic radiation over the imaging plane that is to invoke a trigger condition. Advantageously, the selection of sentinel detectors 652 may be made dynamically subsequent to the deployment of OTS 500, which is described in detail with reference to FIG. 10B.

Figure 6D:
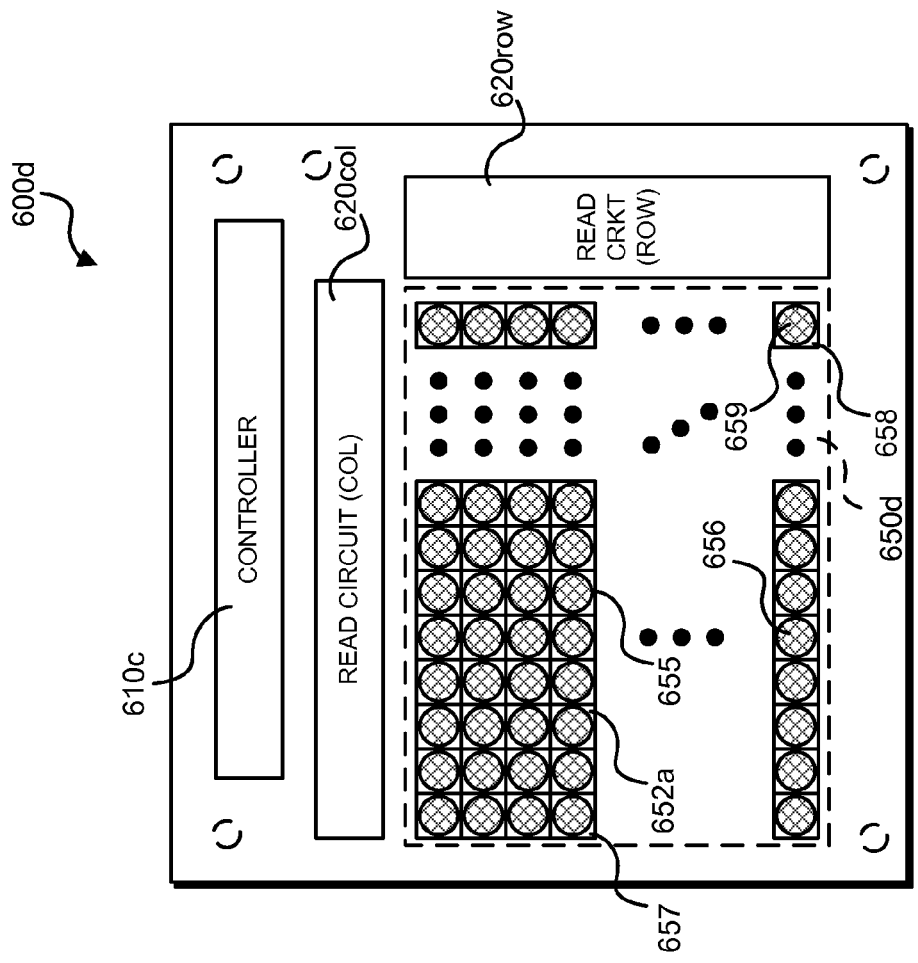
Figure 6C:
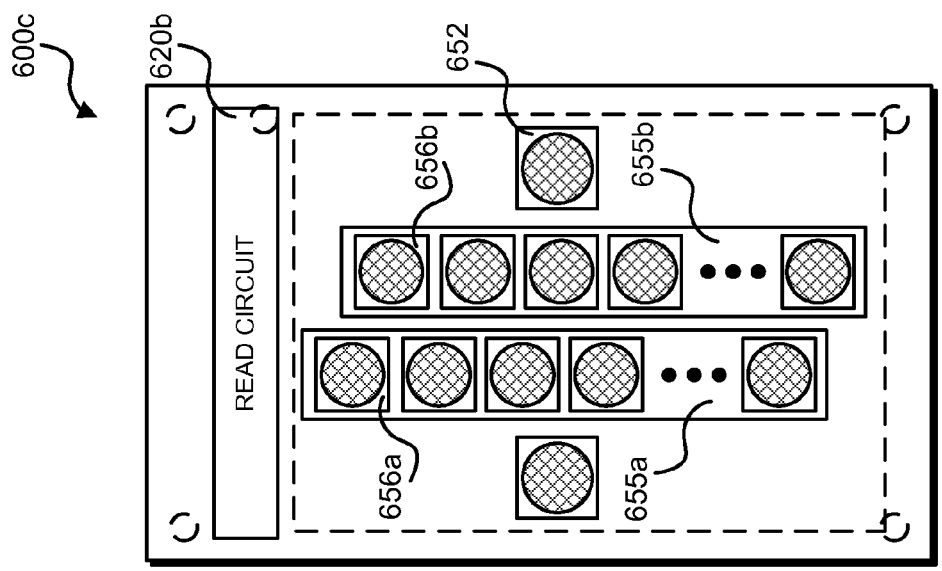

In FIG. 6C, there is illustrated another embodiment of the detector subsystem, illustrated as detector subsystem 600c. As illustrated in the figure, focal plane array 650c includes two linear arrays, linear array 655a and linear array 655b. Linear arrays 655a and 655b are placed such that the detectors of linear array 655a, representatively illustrated at detector 656a, are offset from the detectors of linear array 655b, representatively illustrated at detector 656b. Linear arrays 655a and 655b may be read under the control of read circuit 620 as a single linear array so as to increase the resolution of the line image 230 produced thereby. That is, a first pixel value for a line image 230 may be assigned in accordance with the electrical signal from first imaging detector 656a read from linear array 655a, a second pixel value for the line image 230 may be assigned in accordance with the electrical signal from the first imaging detector 656b of linear array 655b, a third pixel value would be assigned to the line image 230 in accordance with the electrical signal from a second imaging detector from linear array 655a, and so on. Suitable adjustments may be made to the optical system 515 so as to ensure simultaneous illumination of both linear arrays 655a and 655b.

Certain embodiments of the present invention allow dynamic assignment to both the location of the imaging detectors and the location of the sentinel detectors, such as is illustrated by detector subsystem 600d in FIG. 6D. As is illustrated in the figure, exemplary focal plane array 650d is a two-dimensional array 657 of like detectors 658, each having an active area 659. Each detector 658 may be read individually by selecting the corresponding column through read circuit 620c and the corresponding row through read circuit 620r. Controller 610 may include a register or similar memory device, such as pixel control register 1030 described with reference to FIG. 10, having stored therein data that establishes which detectors 658 are to serve as imaging detectors 656 and which detectors 658 are to serve as sentinel detectors 652a and 652b. The data in controller 610 may be set by a user such as, for example, during an alignment procedure so as to optimize the signal to noise ratio in the line image data as well as in establishing a threshold condition. For example, the controller 610 may store suitable data establishing row 655 as the linear array and detectors 652a and 652b, or the corresponding rows, as sentinel detectors. It is to be observed that the sentinel detectors 652a and 652b are on separate rows of the focal plane array 650d so as to illustrate the range of possibilities of such embodiments of the present invention. In certain embodiments of the present invention, the controller 610 controls the read circuits 620c and 620r to read upon command the appropriate detectors 656, 652a and 652b at the appropriate time to determine whether the trigger condition has been met and to form a line image.

Figure 6E:
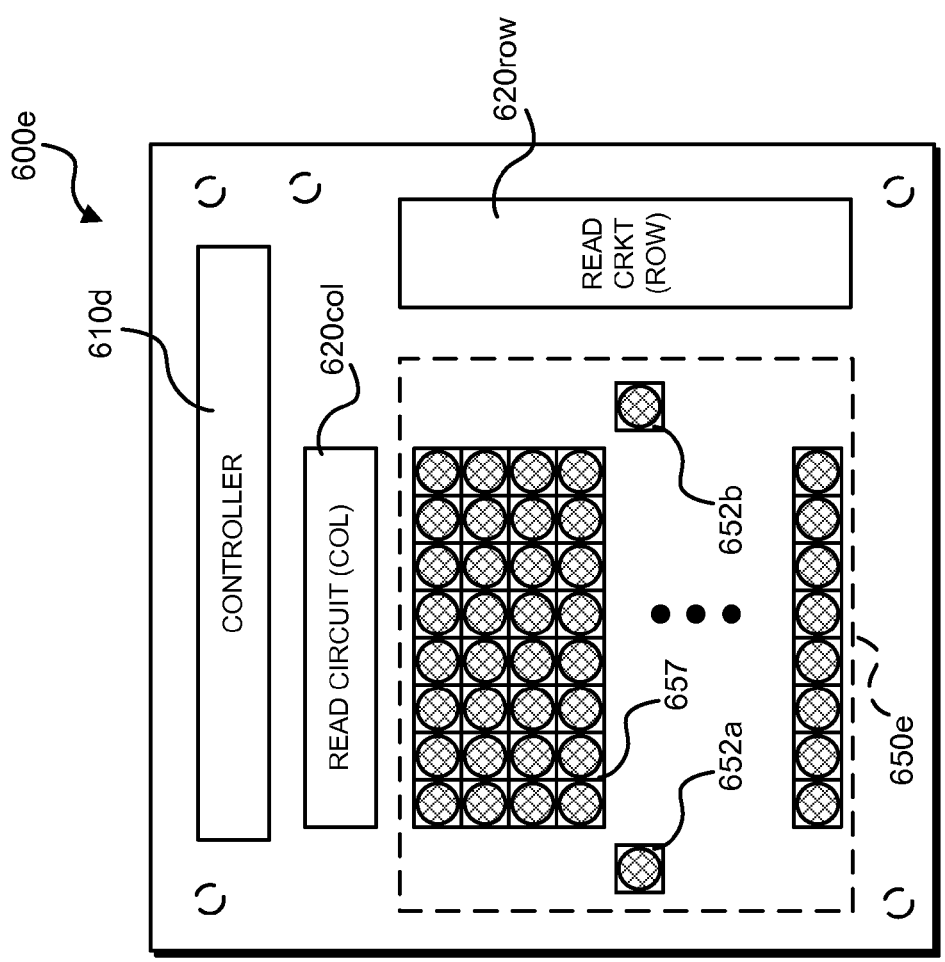

Another embodiment of the detector subsystem is illustrated as detector subsystem 600e in FIG. 6E. Detector subsystem 600e differs from detector subsystem 600d in that the sentinel detectors 652a and 652b are not read by read circuits 620c and 620r, but rather are read separately and have separate circuit paths to circuit subsystem 550. Accordingly, the controller 610 need not continuously poll the sentinel detectors 652a and 652b through the column read circuit 620c and row read circuit 620r, which may be required in the exemplary embodiment illustrated in FIG. 6D. Avoiding such polling may improve not only system response time but may also reduce the power consumption required by the system.

FIGS. 7A-7D illustrate exemplary component packaging of detector subsystem 555. As previously described, the combined effect of all aperture stops in the optical path of the OTS 500 defines both the imaging aperture 226 and the signaling aperture 228. Thus, the optical windows on the package 572 may be intentionally configured as additional aperture stops, but, at a minimum, must be accounted for to ensure proper operation. Exemplary window 702 in FIG. 7A allows illumination of a broad area in detector subsystem 555 and exemplary window 704 defines a narrower illumination area restricted, for example, to the imaging area and signaling area. In FIG. 7C, separate windows 706 are provided for the sentinel detectors and window 708 is provided for the linear array of imaging detectors. Additionally, a detector subsystem 555 in certain embodiments of the present invention may comprise multiple packages. As illustrated in FIG. 7D, detector subsystem 555 includes a linear array of imaging detectors in package 714 and illuminated through window 716, sentinel detectors in packages 710, each illuminated through window 712 and, optionally, additional circuitry in package 720. Each of the components illustrated in FIG. 7D are mounted and interconnected on substrate 602 in a suitable manner.

It is to be understood that while several embodiments of detector subsystem 555 have been illustrated and described herein, the ordinarily skilled artisan will recognize numerous other configurations that may be implemented without deviating from spirit and intended scope of the present invention.

Figure 8:
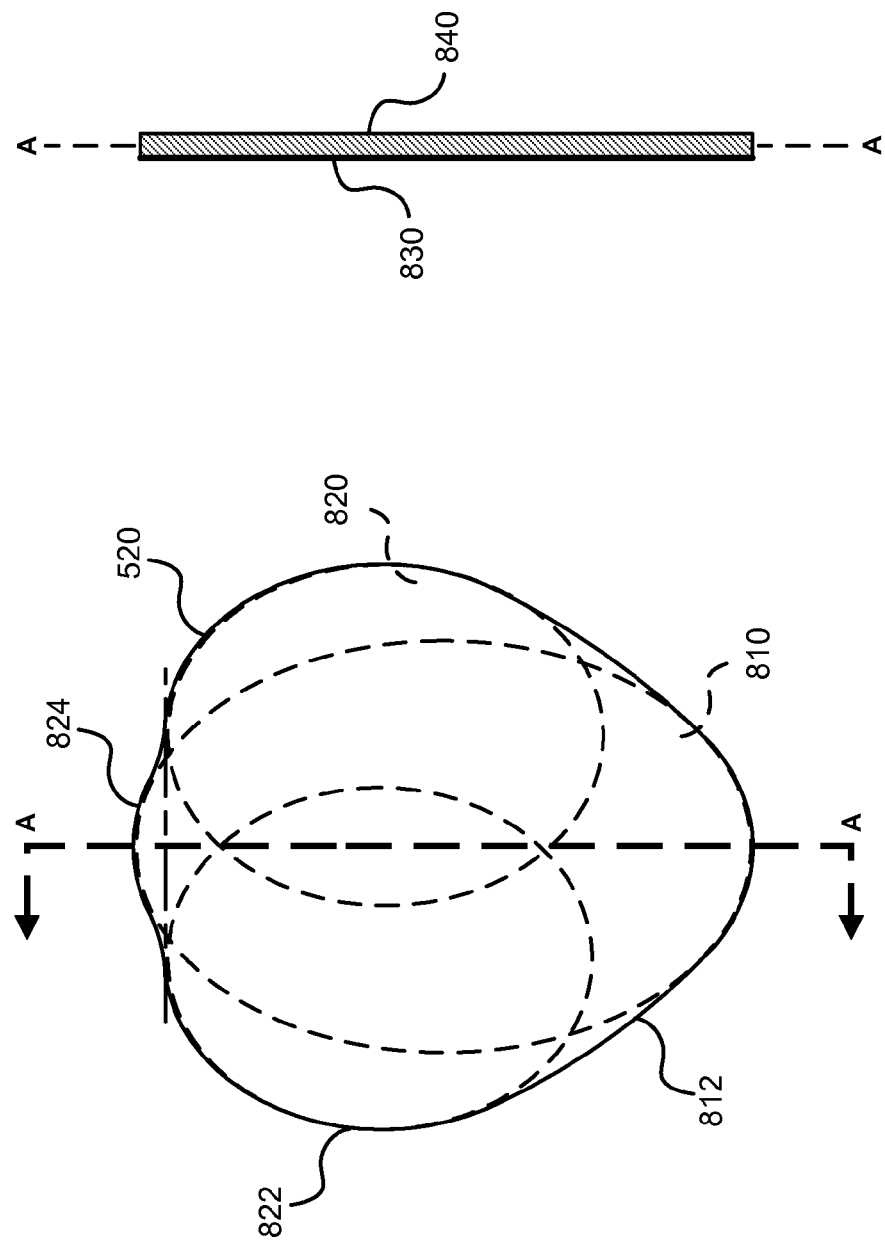
FIG. 8 is illustration of an exemplary secondary mirror configuration of an unattended spatial sensor constructed in accordance with the present general inventive concept.

The ordinarily skilled artisan will readily recognize the significance of the secondary mirror 520 in establishing the optical path to detector subsystem 555 in a manner that optimizes the illumination of the imaging area 242 and the signaling area 246. In certain embodiments of the present invention, the secondary mirror 520 may have a complex boundary contour that maximizes the illumination area on the detector subsystem 555 while at the same time minimizes the blockage of thermal radiation onto the primary mirror 510 due to the placement in the optical path of the secondary mirror 520. An exemplary embodiment of such a secondary mirror 520 is illustrated in FIG. 8. As is illustrated in the figure, the secondary mirror 520 may be manufactured from a dielectric material such as glass, and may have a coated side 830 over which a reflective coating is distributed and a ground side 840. The secondary mirror 520 may be of a shape that when situated in the optical path at a predetermined angle such as the 45° angle illustrated in FIG. 5A, occupies an area in the optical path sufficient to accommodate illumination area 810 corresponding to imaging area 242 in the image plane 224 and illumination areas 820 corresponding to signaling areas 246 in the image plane 224. The exemplary secondary mirror 520 is shaped to have one or more lateral lobes 822 to accommodate the illumination area 820 extending from a central portion 812. The length of the exemplary secondary mirror 520 accommodates illumination area 810. When placed at a 45° angle with respect to the optical axis of the OTS 500, the exemplary secondary mirror 520 in FIG. 8 reflects thermal radiation from the primary mirror 510 towards the detector subsystem 555 while minimizing its impact on the amount of electromagnetic radiation illuminating the primary mirror 510.

Figure 9A:
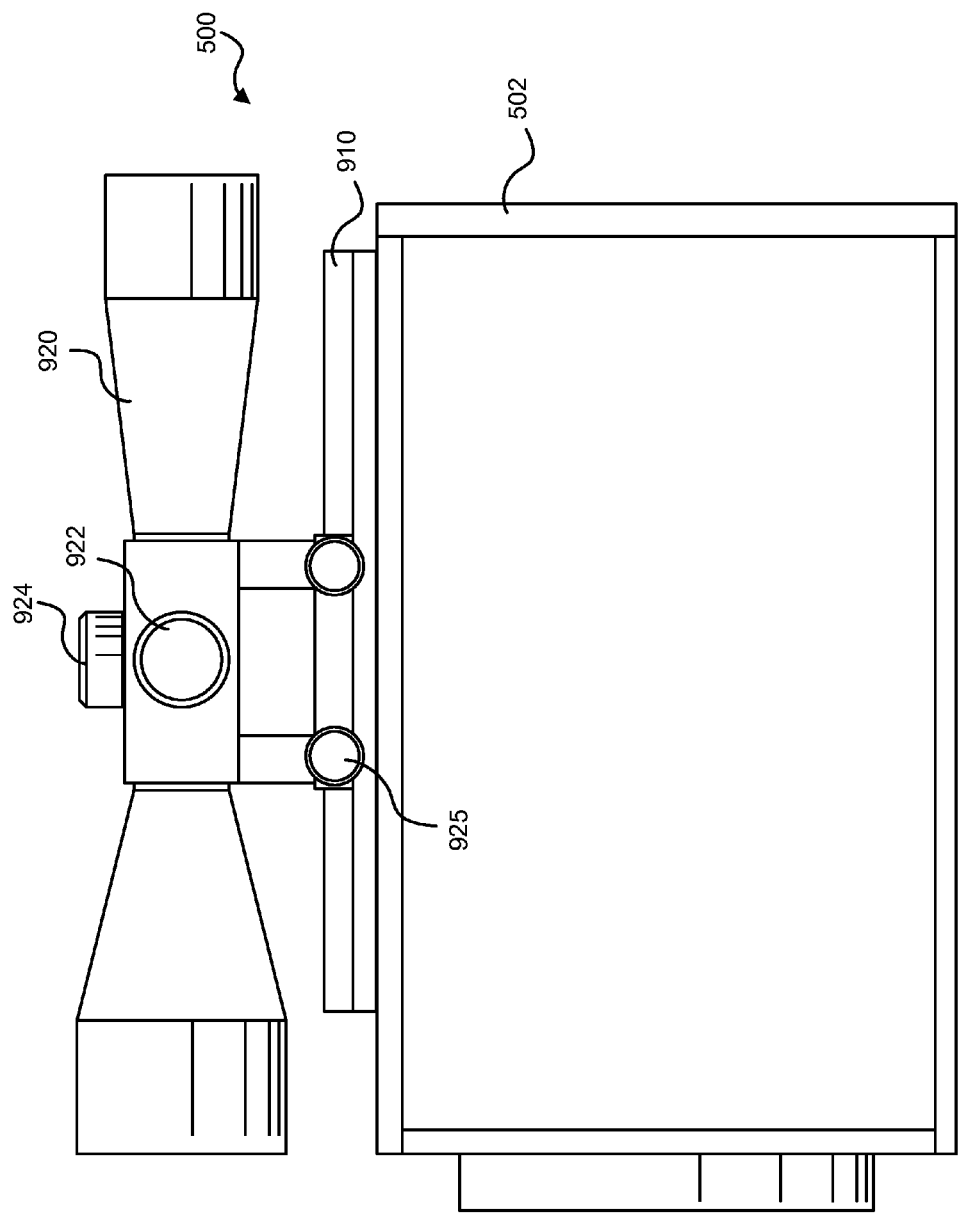
FIGS. 9A-9B are illustrations of an exemplary sighting mechanism mounted on an unattended spatial sensor constructed in accordance with the present general inventive concept.
Figure 9B:
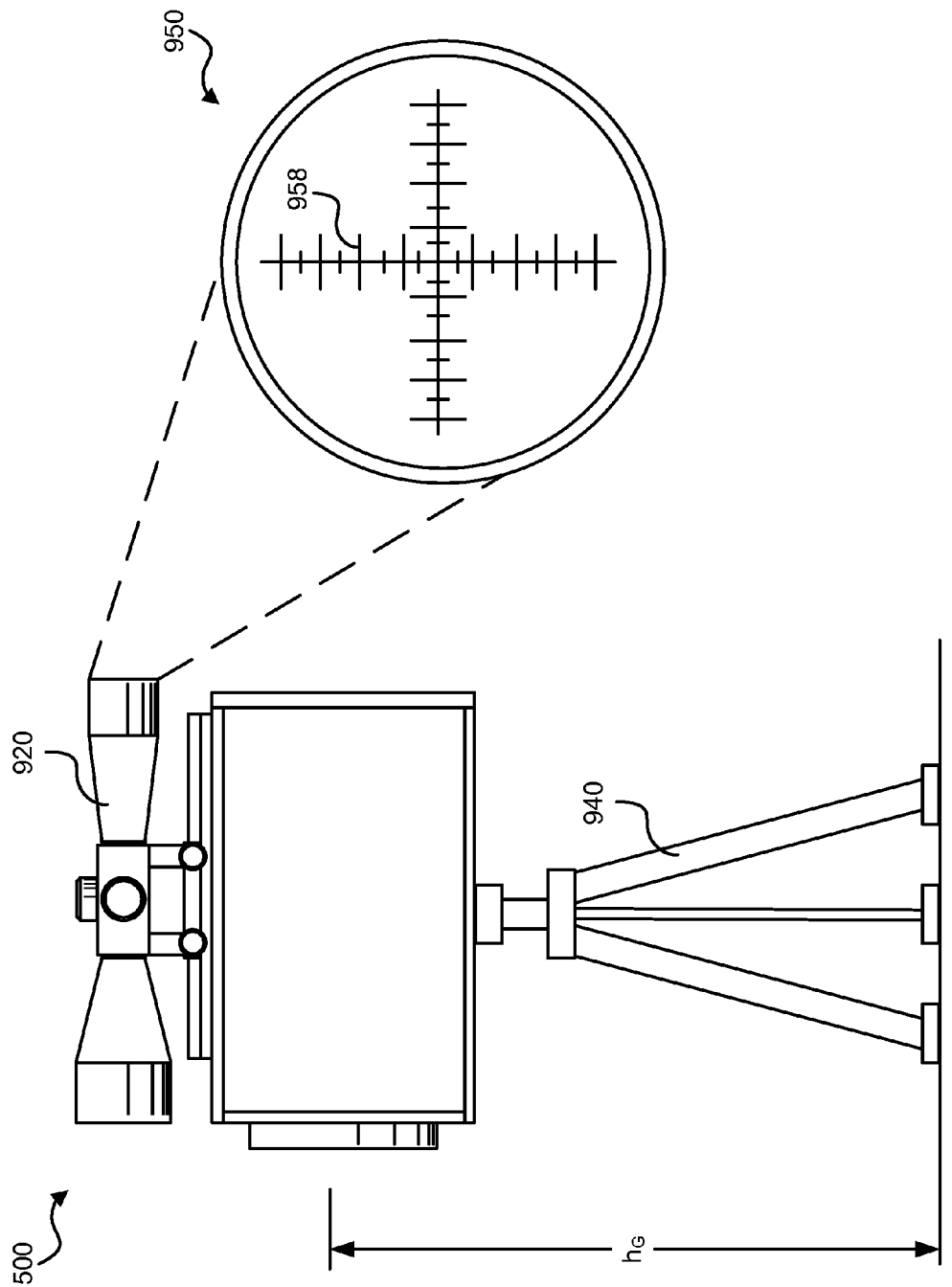

In addition to aligning the detector subsystem 555 onto the optical path via the optical subsystem 515, the optical axis of OTS 500 should also be aligned to the region of interest at its point of deployment. To do so, certain embodiments of the present invention include a sighting mechanism 920 as illustrated in FIGS. 9A-9B. The exemplary embodiment illustrated in FIGS. 9A-9B includes a rail 910, which may be a Picatinny rail commonly used to mount rifle scopes, permanently attached to the outer housing 502 of OTS 500. The rail 910 is attached to the outer housing 502 so as to be substantially aligned along the optical axis 221 of OTS 500. The sighting mechanism 920 may be attached to the rail 910 and secured thereon by a locking device 925. The rail 910 may be accurately aligned to the optical axis 221 of OTS 500 by placing a thermally emissive standard in the field of view of OTS 500, monitoring the output of the detector subsystem 555 while rotating the OTS 500 to align the optical axis of the OTS 500 with the thermal standard. The rail 910 may also be adjusted to align a reticle 950 of the sighting mechanism 920 onto the electromagnetic radiator so that a known relationship between a position on the reticle 950 and a pixel in the resulting line image 230.

Once the rail 910 has been properly aligned, the OTS 500 may be deployed and aligned to the region of interest, as described with reference to FIG. 9B. At the deployment site, OTS 500 may be mounted on a platform, such as tripod 940, to position the device at a desired height $h_G$. It is to be understood that OTS 500 need not be mounted on a tripod; OTS 500 can be mounted on any suitable platform including, for example, tree branches, dirt mounds, vehicles, and even behind walls. When necessary, the sighting mechanism 920 may be attached to OTS 500 for accurately aligning the field of view thereof to the region of interest. In certain embodiments of the present invention, the sighting mechanism 920 is calibrated in a standard way so that similar results may be achieved by similar sighting mechanisms. For example, in tactical situations, a soldier may attach is or her rifle scope to OTS 500 and, having some knowledge as to an approximate range to target, the soldier can align the appropriate crosshair 958 of reticle 950 on, for example, the point in the region of interest on which the lowest imaging pixels has been calibrated. The sighting mechanism 920 may then be removed from OTS 500 and taken with the soldier.

In certain embodiments of the present invention, the sighting mechanism 920 may have range finding capabilities that can be used to calibrate the data obtained by OTS 500. For example, a known standard may be placed at various distances from the OTS 500 and a line image 230 obtained from the standard at each distance. The varying data in the line image 230, such as the number of pixels illuminated by the standard, and then be assigned the corresponding range to the standard in a data table. Accordingly, when a line image is subsequently attained from a target 210, its range from the OTS 500 may be estimated from the data in the data table.

Dynamic detector subsystems, such as detector subsystems 600b, 600d and 600e described above with reference to FIGS. 6B, 6D-6E, will now be described in more detail with reference to FIGS. 10A-10B. As illustrated in the FIG. 10A, a dynamic detector subsystem 1000 includes a two dimensional detector array 1010, the detectors of which are independently accessible through column read circuit 620c and row read circuit 620r. The controller 610 may retrieve a signal from a specific detector in array 1010 by providing an appropriate address of a row to row read circuit 620r and an appropriate address of a column to column read circuit 620c. In accordance with certain embodiments of the invention, the controller 610 may read pixel data from only those detectors in detector array 1010 specified in the pixel control register 1030. The contents of the pixel control register 1030 may be set by a user by, for example, sending a control word thereto in a suitably formatted command transmitted through maintenance port 1260. Access to maintenance port 1260 is described more fully with reference to FIG. 12.

Figure 10A:
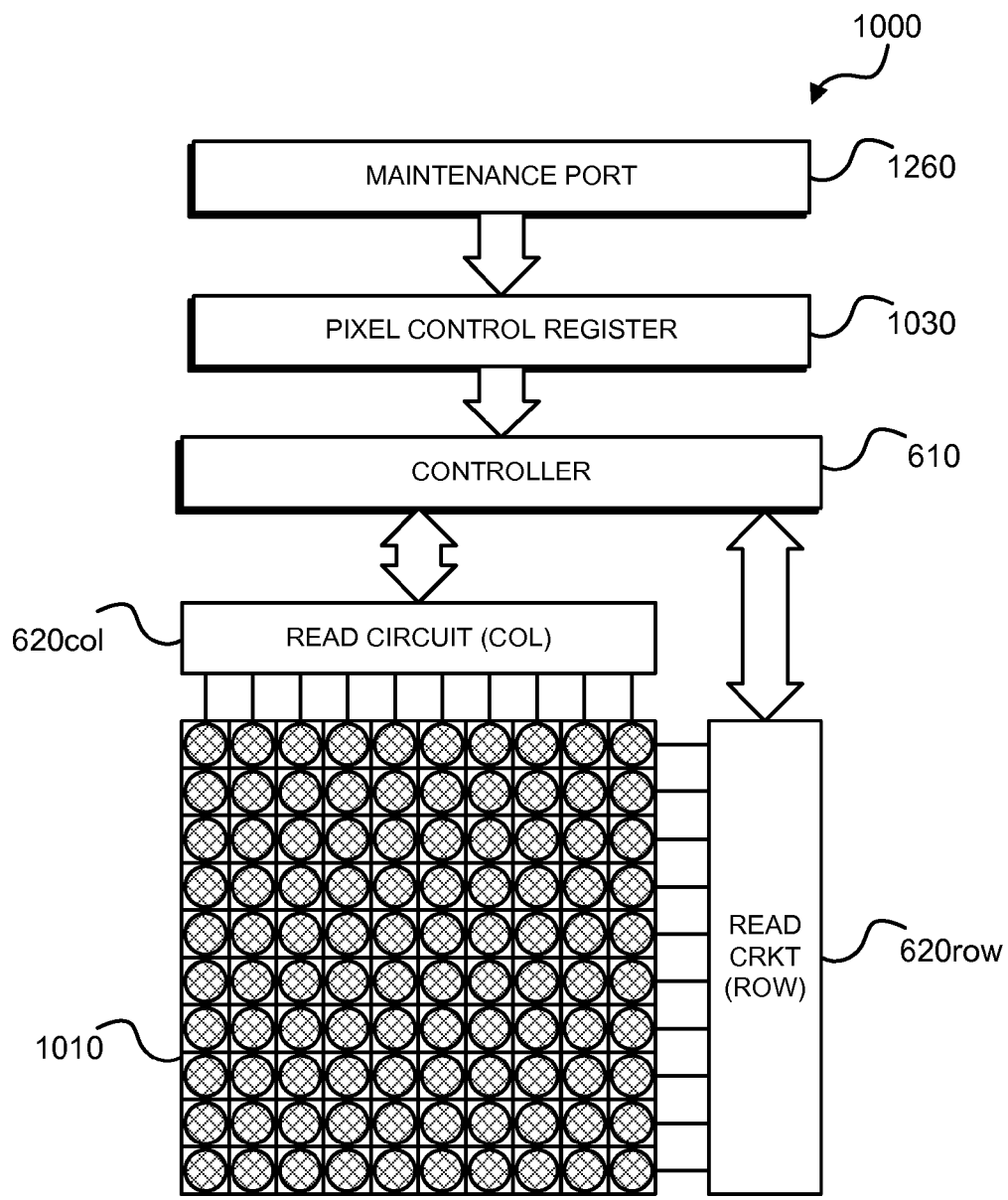
FIGS. 10A-10B are functional block diagrams of exemplary detector arrays usable in an unattended spatial sensor constructed in accordance with the present general inventive concept.
Figure 10B:
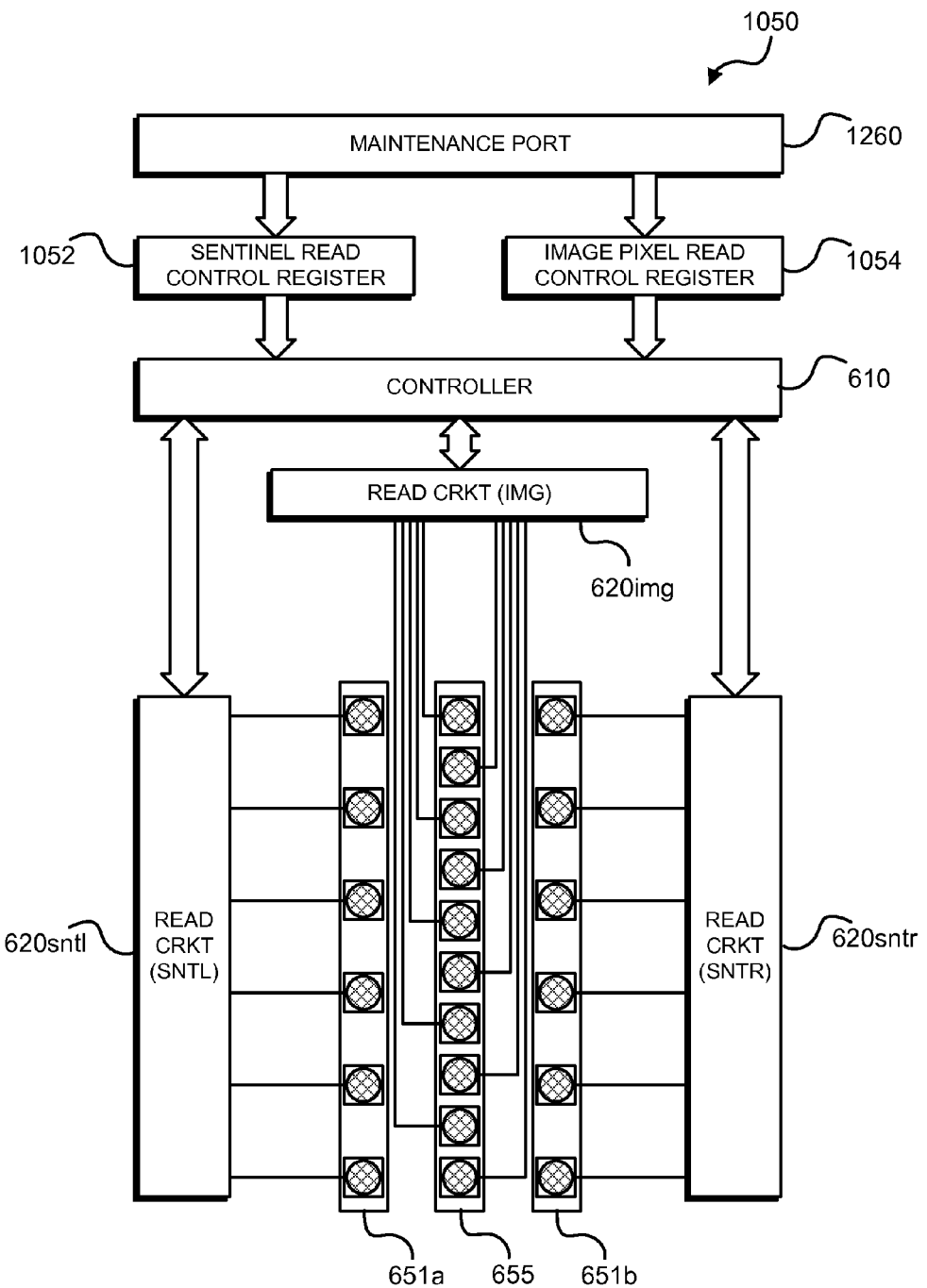

In FIG. 10B, there is illustrated an exemplary configurable detector of circuit 1050 by which the desired distribution of thermal radiation to invoke a trigger condition may be dynamically set, as described with reference to FIG. 6B. The exemplary detector subsystem 1050 includes a linear imaging detector array 655 and one or more linear sentinel detector arrays 651a and 651b. The imaging detector array 655 may be accessed through a read circuit 620img and each sentinel detector array 651a and 651b may be accessed by a corresponding read circuit 620sntl and 620sntr, respectively. Controller 610 may read the imaging detector array 655 through read circuit 620img in accordance with a data word in image pixel read control register 1054. Similarly, read circuits 620sntl and 620sntr may be read by controller 610 in accordance with one or more data words in sentinel read control register 1052. The data words in sentinel read control register 1052 and image pixel read control register 1054 may be provided from a remote location through maintenance port 1260, as described further below with reference to FIG. 12.

It is to be understood that while the detector arrays 655, 651a and 6501b are illustrated and described as linear arrays, the present invention is not so limited. One or more of imaging detector array 655 and sentinel detector arrays 651a and 651b may be two-dimensional detector array without departing from the spirit and intended scope of the present invention. Read circuits 620img, 620sntl and 620sntr may be suitably adapted to read from a row and a column from such a two-dimensional detector array, such as described with reference to FIG. 10A. Additionally, it is to be understood that read circuit 620img and read circuits 620sntl and 620sntr need not be like constructed. For example, read circuit 620img may include amplifiers and a digitizer, such as an analog-to-digital converter, whereas read circuits 620sntl and 620sntr may comprise only amplifiers.

The dynamic detector subsystem 1050 may be used to exclude certain classes of targets from invoking a trigger condition and/or to include the classes of targets for which a trigger condition is desired subsequent to deployment of OTS 500 to its monitoring site. That is, detection of the distribution of thermal radiation on the image plane 224 for which a trigger condition is to be invoked may be configured and reconfigured as desired from a remote location, such as OCC 140. For example, during one period of time, dynamic detector subsystem 1050 may be configured to exclude small animals from invoking a trigger condition and subsequent imaging, and during another period of time, dynamic detector subsystem 1050 may be configured to include low-profile targets so as to detect, for example, crawling enemy soldiers. The skilled artisan will readily recognize a wide variety of activity that may be detected for imaging and for exclusion from imaging when the present invention is embodied per the exemplary embodiment of FIG. 1013.

Figure 11B:
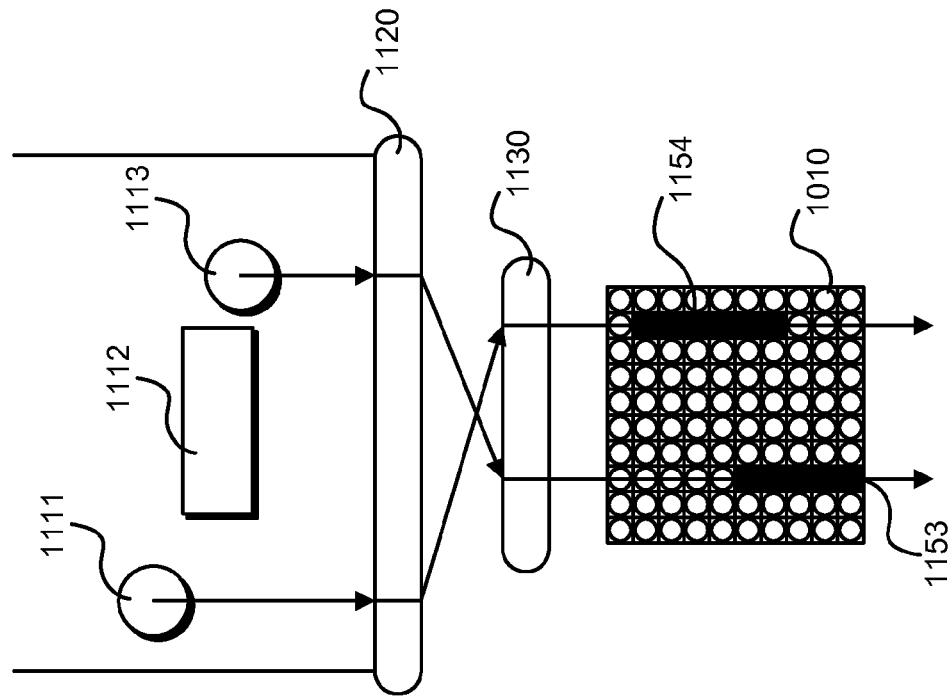
FIGS. 11A-11B are conceptual block diagrams illustrating applications of a two-dimensional detector array in an unattended spatial sensor constructed in accordance with the present general inventive concept.
Figure 11A:
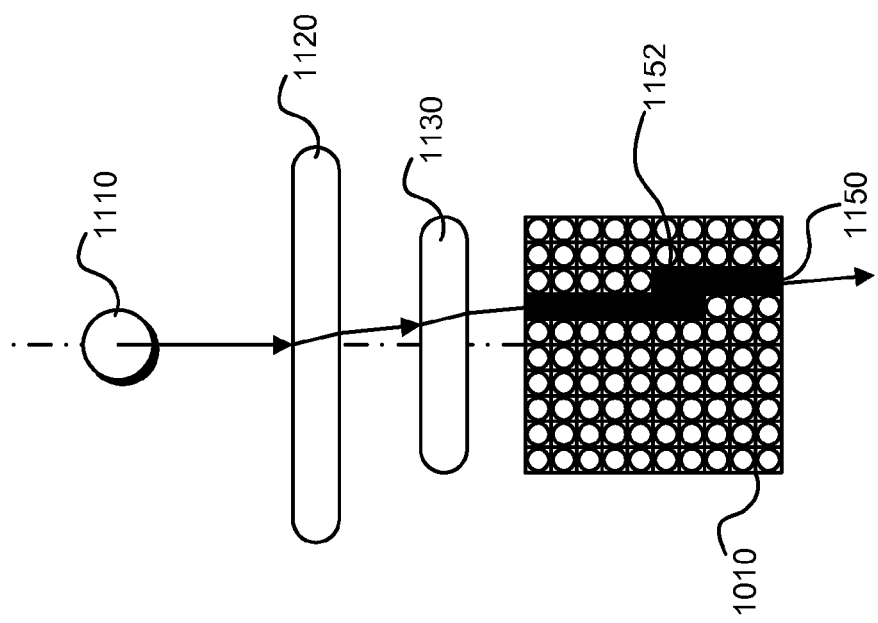

Certain other advantages are achieved when the present invention is embodied with a dynamic detector subsystem such as those illustrated in FIGS. 10A-1013. For example, as illustrated in FIG. 11A, dynamic detector subsystem 1000 may be used to correct alignment errors in the OTS 500. As is illustrated in the figure, thermal radiation from an emitting target 1110 may be deflected off of an ideal optical path through errors in the optical system, representatively illustrated by optical elements 1120 and 1130. It is to be understood that the deflected optical path illustrated in FIG. 11A is intended to depict a cumulative error in the imaging onto the detector array 1010 by the optical elements 1120 and 1130 and may not be the same error across all embodiments of the invention. For example, embodiments of the present invention that utilize reflective elements, such as those depicted in FIG. 5A, diffraction through elements 1120 and 1130 indicated in FIG. 11A will be negligible.

In FIG. 11A, the detectors of array 1010 illuminated by the deflected thermal radiation are those shaded in region 1150. A two-dimensional image of this shaded region 1150 may be obtained by reading the data from all the pixels in the array 1010 and, from this, identification the illuminated detectors may be obtained. The actual position of the target 1110 relative to the optical axis of the OTS 500 may be obtained by the sighting mechanism 920. The identification of the detectors in the shaded region 1150 may be provided to pixel control register 1030 such that in subsequent data acquisition cycles, only those detectors are read into a line image 230. When adjacent detectors in array 1010 are illuminated, such as in region 1152, the data from the adjacent detectors may be interpolated and the result thereof assigned to the corresponding pixel in a line image 230.

In certain applications in which embodiments of the present invention may be deployed, it may be desired to monitor multiple locations simultaneously. For example, in FIG. 11B, a fixed object 1112 may be located on the optical axis of OTS 500 as the region of interest. In the exemplary application, the area around object 1112 is to be monitored for the presence of intruders 1111 and 1113. The corresponding locations in the detector array 1010, representatively illustrated by regions 1153 and 1154, may be determined by alignment procedures using a thermally emissive standard similar to those described above. The identity of the detectors in regions 1153 and 1154 may be provided to pixel control register 1030 through maintenance port 1260 such that in subsequent data acquisition cycles, only those detectors are read into respective line images 230.

Certain embodiments of the present invention may implement rule-based programming processes for establishing from which detectors in a detector array, such as detector array 1010, data are read. For example, in the scenario depicted in FIG. 11B, a rule controlling the read circuitry of detector array 1010 may exclude the region in which object 1112 would be imaged from being read and only activity outside region 1010 is recorded and processed. Additionally, a selected plurality of detectors in array 1010, such as those highlighted in regions 1153 and 1154, may serve as sentinel detectors. Such rule-based processing allows detection of widely distributed thermal radiation over the image plane 224 by which to invoke a trigger condition.

An exemplary circuit subsystem 1200 for use in embodiments of the present invention is illustrated in FIGS. 12A-12B, collectively referred to herein as FIG. 12. It is to be understood that the components illustrated in FIG. 12 are separated solely for the purpose of explaining the operation of the exemplary circuit as it may be used in embodiments of the present invention. Components that are illustrated as separate and distinct may in other embodiments of the invention be combined. Similarly, components having multiple functions that are illustrated as single components may be separated into separate components. The circuit subsystem 1200 may be embodied through a combination of hardware and software components to implement the functionality described herein.

The exemplary circuit subsystem 1200 may be considered functionally as interoperating subsystems, e.g., a detector subsystem 1202, a communications subsystem 1203 and a processor subsystem 1204. The exemplary detector subsystem 1202 includes suitable circuitry for generating electrical signals proportional to the distribution of thermal radiation over the image plane 224. Communication subsystem 1203 includes suitable circuitry for transmitting and receiving data and control signals to and from a remote location, such as OCC 140. The exemplary processor subsystem 1204 includes suitable circuitry for data processing and control of OTS 500.

Components of circuit subsystem 1200 may communicate with one another through various signal lines collectively referred to herein as bus 1235. Components illustrated in FIG. 12 as communicating directly with one another may in fact communicate over a bus, such as bus 1235. The single-ended and double-ended arrows in the figure are solely to illustrate communication between components and are intended for purposes of explanation, and not limitation. Additionally, it is to be understood that bus 1235 may include both analog and digital signal lines and that these signal lines may be appropriately separated and suitably shielded, as needed.

Exemplary detector controller 1230 of detector subsystem 1202 operates one or more read circuits 1220 and may monitor operational parameters, such as temperature, of detector array 1210. Additionally, the detector controller 1230 may include one or more sentinel detector read control registers 1234 and image detector read control registers 1238, such as the pixel control register 1030 or image pixel read control register 1054 and sentinel detector read control register 1052 described above. The detector controller 1230 may receive commands and data, such as pixel control words and read control words, from processor subsystem 1204 over bus 1235. Upon receipt of such control words, the detector controller 1230 may inhibit operation of individual read circuit amplifiers 1221, 1222 and 1223 over signal lines 1227. Accordingly, only the signals from those sentinel detectors 1214 and 1216, and those imaging detectors of imaging detector array 1212 that are not inhibited by a signal on lines 1227 will be detected by the corresponding circuitry.

Exemplary detector subsystem 1202 includes a detector array 1210, such as any of the focal plane detector arrays described above. For purposes of explanation, and not limitation, the exemplary detector array 1210 includes a signal line for each detector therein. For example, signal line 1213 may convey a detector voltage from sentinel detector 1214, signal line 1211 may convey a detector voltage from one of the detectors in imaging array 1212 and signal line 1215 may convey a detector voltage from sentinel detector 1216. Each signal line 1211, 1213 and 1215 may be provided to a corresponding amplifier 1221, 1222 and 1223, the outputs of which may be provided to A/D converter 1224. In certain embodiments of the present invention, each amplifier 1222 may be powered up separately or in groups according to a power control procedure of processor subsystem 1204. Thus, to conserve power, amplifiers 1221 and 1223 coupled to sentinel detector signal lines 1211 and 1215, respectively, may have continuous power provided thereto and the amplifiers 1222 coupled to imaging detector signal lines 1211 may have power applied thereto only upon a trigger condition. A voltage supply line (not illustrated) may be provided to each amplifier 1222 from a power module (not illustrated) under control of processor subsystem 1204 in response to a signal from wake-up processor 1255. According to certain embodiments of the invention, during a low-power consumption state, the output of amplifiers 1221 and 1223 are a sentinel detector voltage 401, which may be provided to wake-up processor 1255. Wake-up processor 1255 may comprise suitable comparator circuits that compare the sentinel detector voltages 401 provided thereto over signal lines 1256 and 1258 with a predetermined threshold voltage 404. Upon the sentinel detector voltage 401 rising above the threshold voltage 404, wake-up processor 1255 may provide a wake-up signal to a state machine operating under control of the processor subsystem 1204, which may then transition out of a wait state. A command signal may be provided to the power module to supply power to, among other components, the amplifiers 1222 on the image detector signal lines 1211. Alternatively, the processor subsystem 1204 may monitor digital values for A/D 1224 corresponding to the sentinel detector voltage. In such embodiments, the digital detector voltage values are compared with values corresponding to background radiation levels and, upon a positive determination that the sentinel detector voltage exceeds the background level voltage, the processor subsystem 1204 may initiate some action, such as image data acquisition.

Analog-to-digital (A/D) converter 1224 may produce a digital sample for each detector in detector array 1210 in response to each sampling pulse provided thereto by sample clock 1232. Sample clock 1232 may be, for example, a programmable clock generating a periodic sample signal derived from a system clock or may generate a sample signal having a fixed period. The A/D converter 1224 may generate digital numbers proportional to the voltages sampled thereby and of sufficient length for subsequent image and classification processing. Numerous data digitizing schemes may be implemented with the present invention without departing from the spirit and intended scope thereof.

Detector controller 1230 may include an amplifier control register 1236 to store therein one or more amplifier control words. Each amplifier control word may include an amplifier gain value and amplifier offset value for a corresponding one of the amplifiers 1221, 1222 and 1223. Thus, each amplifier 1221, 1222 and 1223 may be individually controlled as needed, such as to calibrate detector signals relative one to another. The detector controller 1230 may read the amplifier control word in the amplifier control register 1236 and provide a gain control signal and/or an offset control signal to the corresponding amplifier, for example on signal line 1229. The detector controller 1230 may receive the amplifier control word for each amplifier 1222 from the processor subsystem 1204 via bus 1235.

Exemplary communication subsystem 1203 includes communication ports system 1245 comprising one or more transceivers by which OTS 500 communicates with external systems, such as OCC 140 and maintenance personnel. Each transceiver is implemented with associated hardware and/or executable processor instructions to format and, where required, encrypt captured data in a manner compatible with the corresponding data link 125, to assemble the formatted data into packets compatible with the corresponding transmission and control protocols, to encode the payloads on a carrier wave for transmission, to amplify the encoded carrier wave as necessary, and to transmit data on the carrier wave via a communication channel in a suitable transmission medium. Each transceiver may have an associated antenna, representatively illustrated by antennas 1240 to transmit the carrier wave over a wireless communication medium. As used herein, each transceiver, the hardware and/or executable processor instructions associated therewith and associated antenna or cable jack is referred to herein as a communication port. The number and types of communication ports implemented in communication port system 1245 is application-dependent and numerous variations and combinations can be used with the present invention without departing from the spirit and intended scope thereof. In certain embodiments where the OTS 500 is deployed in a remote location, the communication port system 1245 may include a long-range communication port, such as a communications satellite modem and antenna, and a short-range communication transceiver, such as a Bluetooth radio transceiver and antenna, an IEEE 802.11 radio transceiver and antenna, and/or a universal serial bus (USB) transceiver and USB jack. However, other communication ports, such as Ethernet and optical transmission components and associated protocols, are suitable for use with the present invention without departing from the spirit and intended scope thereof.

In certain embodiments of the present invention, power to one or more communication ports is removed under control of processor subsystem 1204 during a low-power wait state. One or more transceivers, or at least a receiving portion thereof, may remain active, i.e., continuously receiving operating power, so that OTS 500 may be accessed during the low-power wait state. Such access may allow a remote operator to selectively restore power to any and all of the components of OTS 500 from a remote location.

Exemplary processor subsystem 1204 includes a control processor 1252 to perform the various monitoring and control functions described throughout this disclosure and to mediate communications and interoperations between components and to and from communication channels 1243 via communication ports 1245. In certain embodiments of the present invention, control processor executes suitably formatted processor instructions stored in the code memory 1267. However, it is to be understood that control processor 1252 may be implemented by suitably configured hardware and/or software without departing from the spirit and intended scope of the present invention.

Certain embodiments of the present invention may include a maintenance port 1262 providing special access to OTS 500 for purposes of maintenance. For example, executable processor instruction code stored in code memory 1267 may be updated, instruction code and/or control registers of detector controller 1230 may be modified, database 1272 may be accessed and modified, and registers of control processor 1252 may be directly accessed, such as for troubleshooting via maintenance port 1260. The ordinarily skilled artisan will recognize that additional maintenance functionality may be added to maintenance port 1260 without deviating from the spirit and intended scope of the present invention. The exemplary maintenance port 1260 is accessed through one or more communication ports 1245. In certain embodiments of the present invention, maintenance port 1260 may be implemented by a suitable processor executing programmed processor instructions to perform the functionality of maintenance port 1260 and may be operated independently of operations executed by control processor 1252.

Processor subsystem 1204 may include an event timer 1275 to mark the occurrence of various events, such as those described with reference to FIG. 5E. Event timer 1275 may receive electrical signals from, for example, various detectors in detector array 1210 and/or A/D converter 1224, and may store timing words corresponding to the respective electrical signals in data memory 1265. The timing words may be subsequently retrieved from data memory 1265 and analyzed to determine the absolute or relative timing of the corresponding events. Event timer 1275 may be implemented through numerous and varied timer circuits without departing from the spirit and intended scope of the present invention.

As pixel data are received from A/D converter 1224, they are buffered in line image data buffer 1266 and selectively stored in data memory 1265, such as described with reference to FIG. 14. Line image data buffer 1266 may be implemented as a first-in, first out (FIFO) memory device and may include occupancy status lines (not illustrated) to indicate when the buffer is, for example, empty, half-full, three-quarters full and full. Alternatively, the line image data buffer 1266 may be dynamically allocated from data memory 1265, where the buffer occupancy may be observed through, for example, tracking memory location indexes. The ordinarily skilled artisan will recognize numerous data buffer techniques suitable for use with the present invention without deviating from the spirit and intended scope thereof.

Exemplary image data processor 1254 performs the necessary operations to create a line image 230 from the stored pixel data, which is subsequently processed with other line images, stored and/or readied for transmission to a remote location. For example, raw pixel data from A/D converter 1224 may be temporarily stored in line image data buffer 1266 and image processor 1254 may perform one or more data validation operations to determine whether temporally non-stationary thermal radiation is being received from the region of interest. Additionally, image data processor 1254 may interpolate two or more pixel values received from A/D converter 1224 and assign the result to a single pixel value in the line image 230. Image processor 1254 may assemble a two-dimensional image from a selected plurality of line images, a background offset value may be subtracted from each pixel value in the two-dimensional image, and the background-subtracted pixel values may be stored in data memory 1265. The stored two-dimensional image may undergo additional processing, such as quantization, segmentation and classification, and subsequently transmitted to a remote location through communication subsystem 1203.

In certain embodiments of the present invention, processor subsystem 1204 may perform data acquisition and analysis through data words of a first word length and then quantize the processed data words to a shorter data word length. For example, A/D converter 1224 may be configured to generate 64-bit words from the electrical signals provided thereto by detector array 1210. At such data resolution, fine details of one or more targets in the field of view of OTS 500 may be discerned. Image processing techniques may be performed to enhance the details of the target's image and, upon completion thereof, the enhanced image may be quantized to reduce the data transmission bandwidth requirements. For example, background compensation and scaling of the pixel values in the originally acquired image may increase the dynamic range of the pixel data at 64 bits such that the salient features of the image will be maintained at, for example, 8 bits. The 8-bit data may then be provided to communication subsystem 1203 for formatting and transmission over communication channels 1243.

Exemplary processor subsystem 1204 includes a target classification processor 1270 to analyze the image data stored in data memory 1265 by image data processor 1254 and to determine therefrom a target class into which the imaged target falls. It is to be understood that a target classification processor 1270 need not be implemented in circuit subsystem 1200; such target classification may be performed at a remote data reception point, such as OCC 140. However, target classification at OTS 500 may allow reductions in data transmission bandwidth, as classification may be performed using longer data words than are ultimately transmitted. For example, target classification processor may analyze the 64-bit data described above for purposes of target classification. Once the classification has been determined, the data may be quantized, such as described above, for transmission. In certain embodiments of the present invention, classification data may accompany the quantized image data in the transmission, thereby providing the data recipient with not only the image, but with characteristics of the target in the image. Exemplary embodiments of target classification processor 1270 are described below with reference to FIGS. 17A-17B.

Processor subsystem may include a database 1272 to store data structures used by processor subsystem 1204 for various data processing operations. For example, database 1272 may contain constraint data defining the rules by which pixel data are acquired from detector array 1210, such as described above with reference to FIG. 11B. Additionally or alternatively, database 1272 may contain a knowledge base by which a suitable expert system may implement a target classification process. Multiple data sets for multiple data processing operations performed in accordance with the present invention may be stored in and accessed from database 1272 without limitation.

Figure 13:
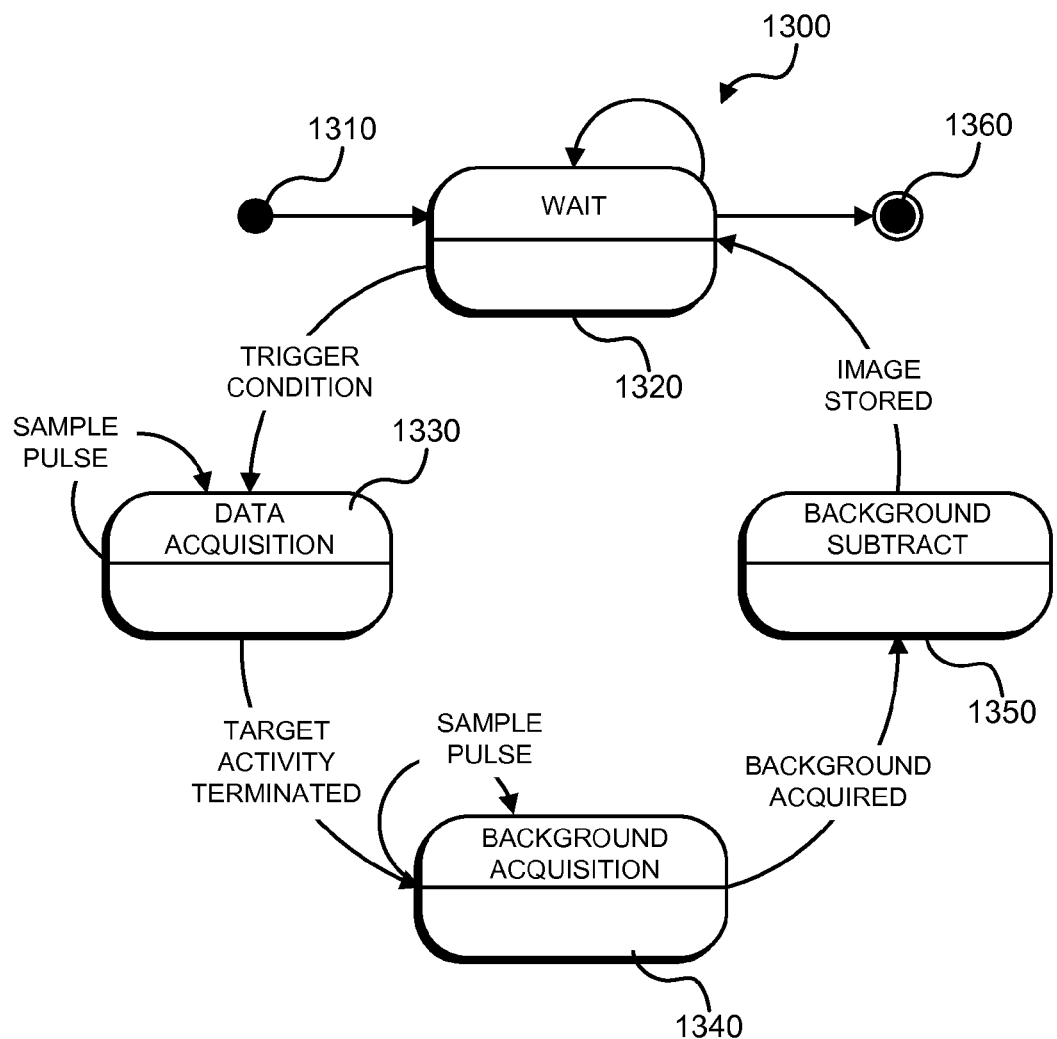
FIG. 13 is a state diagram of an exemplary finite state machine for data acquisition by an unattended spatial sensor constructed in accordance with the present general inventive concept.

In certain embodiments of the present invention, components of circuit subsystem 1200 implement a data acquisition finite state machine (DAFM), such as the DAFM 1300 illustrated in FIG. 13. The DAFM 1300 transitions from an initial state 1310 into a wait state 1320 upon initial power being applied to OTS 500, a power-on self-test being successfully completed, system variables being initialized and completion of any additional system initialization procedure per the requirements of the application in which the present invention is embodied. Wait state 1320 may be a data acquisition wait state that may temporally coincide with a low-power consumption wait state of the OTS 500. However, it is to be understood that DAFM 1300 may be in wait state 1320 regardless of the state of any other system state machine implemented in embodiments of the present invention.

Exemplary DAFM 1300 remains in wait state 1320 until the occurrence of a trigger condition, when it transitions into data acquisition state 1330. While DAFM 1300 is in the data acquisition state 1330, line image pixel data are acquired and stored at each pulse of the sample clock 1232. Additionally, during data acquisition state 1230, pixel values of temporally stored line images may be validated and processed to determine whether one or more targets are active in the field of view of OTS 500. In certain embodiments of the invention, the line image pixel data acquired during a previous data acquisition state 1330 are subtracted from the currently acquired line image pixel data during the background subtraction state 1340. In thermal radiation applications, the residue of such subtraction is the heat signature of a moving target in the presence of a stationary target, especially when emission level of the stationary target remains substantially constant in successive sampling periods. Upon a positive determination that target activity has terminated, DAFM 1300 transitions into background acquisition state 1340, during which time line image pixel data corresponding to background thermal radiation levels of the environment in the field of view of OTS 500 are obtained. DAFM 1300 may remain in background acquisition state 1350 over a number of sample periods sufficient to compute a statistically representative background radiation measurement. From the background radiation measurement, a threshold value may be computed, which may be used to determine the trigger condition subsequent thereto. For example, comparators in wake-up processor may be configured to compare sentinel detector voltages on signal lines 1256 and 1258 with the computed threshold value to determine whether a trigger condition exists.

Upon completion of the background data acquisition, DAFM transitions into a background subtraction state 1350 where background data are subtracted from the acquired line image pixel data. The background data may be subtracted in a single operation from a plurality of line images that are assembled by image data processor 1254 into a two-dimensional image. Upon completion of the subtraction of the background radiation level data, the background compensated image data are stored and exemplary DAFM 1300 returns to the wait state 1320. The DAFM 1300 may transition into a final state 1360 to accommodate, for example, off-line activity such as system maintenance or upon removing power from OTS 500.

It is to be understood that background radiation levels may be acquired periodically independently of image data acquisition cycles. In so doing, the measured background radiation level stored in memory is kept current, which may be particularly beneficial during long periods of target inactivity in the field of view of OTS 500.

Embodiments of the present invention adhering to the underlying concepts thereof beneficially require a fraction of the data transmission bandwidth and, correspondingly, a fraction of the transmitter power over traditional unattended ground sensor systems. A line image 230 obtained through the general inventive concept described herein will have a number of pixels equal to or less than the number of detectors in the detector array. Further, line image data are acquired only during the time interval starting with a trigger condition and ending at the moment it is determined that the target activity has terminated. The line images 230 collected during this period may be assembled into a two-dimensional array of pixels having a variable width corresponding to the data acquisition time period. By contrast, a traditional imaging device implementing a two-dimensional array of detectors may produce a correspondingly fixed two-dimensional image consisting of a number of pixels equivalent to the number of detectors in the array. Moreover, as discussed above, image data, once processed on board OTS 500, may be quantized to lower order data words prior to transmission without significant loss of pertinent information.

For purposes of comparison, it will be assumed that the pixel in a thermal radiation application expresses a temperature of an emissive target in eight (8) bits. A linear array of, for example, ten (10) detectors may produce a ten (10) pixel line image of temperature data in eighty (80) bits. Assuming a data acquisition time interval in accordance with the present invention of four (4) sample periods, a two-dimensional thermal profile of the target may be assembled from the corresponding line images 230 requiring only 320 bits. A traditional imaging device implementing even a small 10×10 two-dimensional array of similar detectors would require 800 bits to express an image of the same target. The ordinarily skilled artisan will readily recognize the data transmission bandwidth savings through embodiments of the present invention.

Figure 14:
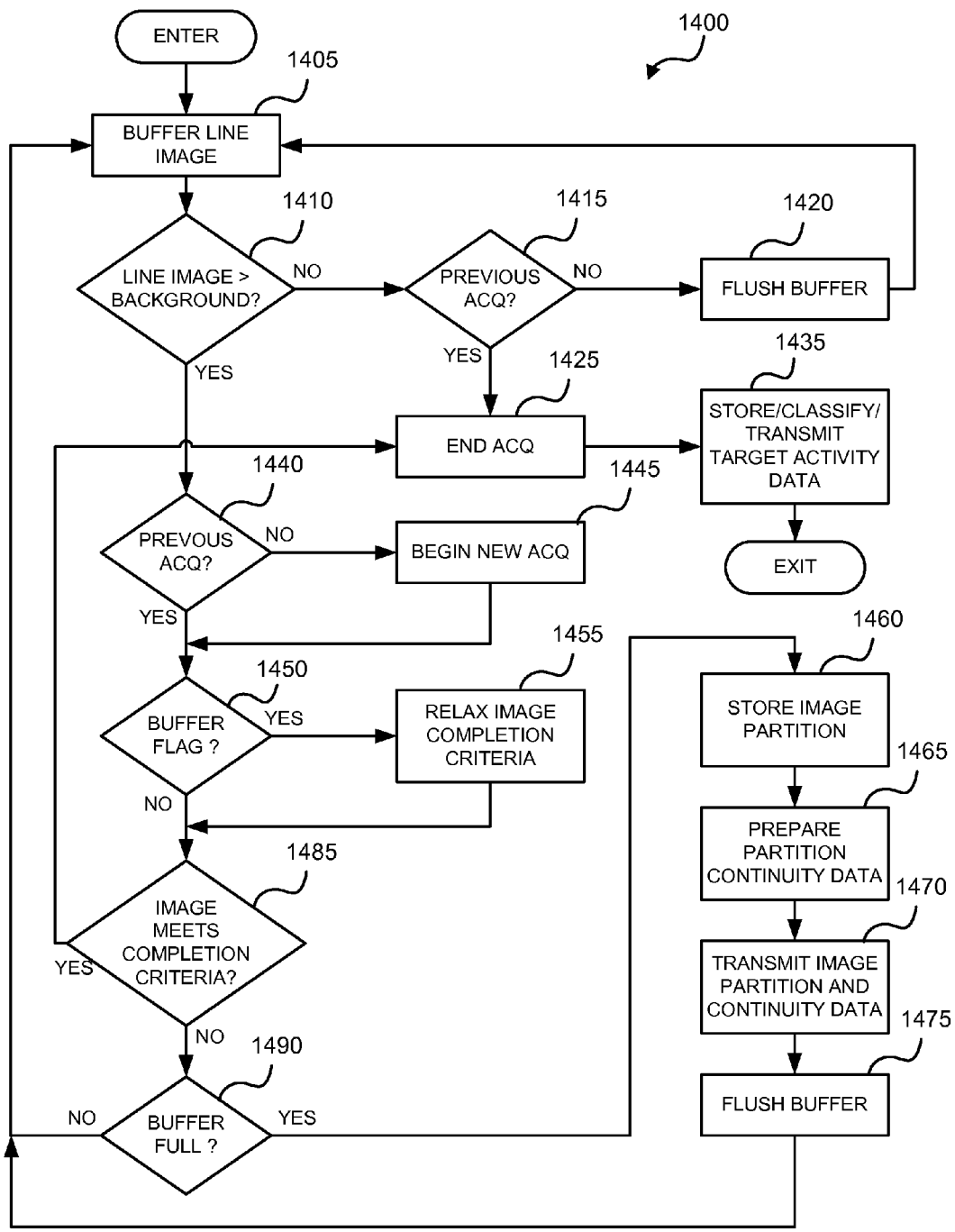
FIG. 14 is a flow chart of an exemplary image forming and transmission process in accordance with the present general inventive concept.

Referring to FIG. 14, a flow diagram of an exemplary data acquisition process 1400 is illustrated, whereby data transmission may be carried out in the presence of communication bandwidth limitations. Exemplary process 1400 may be performed while DAFM 1300 is in the data acquisition state, such as, for example, after a trigger condition and power-up of necessary data acquisition hardware and/or software. It is to be understood that while the operations of process 1400 are illustrated and described as sequentially performed, the present invention is not so limited. For example, certain operations may be performed in parallel with other operations, and the operations may be performed in an alternative order befitting the implementation. The present invention is intended to embrace all such alternatives.

In operation 1405, a line image is buffered in a data buffer, such as line image data buffer 1266. In operation 1410, the buffered line image is compared to data corresponding to the most recent background measurement. If it is determined in operation 1410 that the line image data are other than data corresponding to background emissions, which may include comparison of several successive line image samples with the background level, it is determined in operation 1415 whether a data acquisition cycle is in progress. If so, the current acquisition cycle is terminated in operation 1425 and the buffered data are stored and/or classified and/or transmitted in a suitably formatted target activity report to one or more alert recipients. If it is determined in operation 1415 that a data acquisition cycle has not been initiated, the buffer is flushed in operation 1420, and the process is repeated at operation 1405. In this manner, the line image data buffer 1266 remains empty until data corresponding to target activity are acquired.

If, in operation 1410, it is determined that the line image data in the line image data buffer 1266 are not that of background radiation, it is determined in operation 1440 whether a data acquisition cycle has been previously initiated. If not, a new acquisition cycle is begun in operation 1445. Subsequent thereto, or upon a determination in operation 1440 that a data acquisition cycle is in progress, the buffer occupancy is evaluated, such as by buffer occupancy signal lines or flags, to determine whether the buffer is nearing a buffer full state. If not, it is determined in operation 1485 whether a complete two-dimensional image of the target activity in the field of view of OTS 500 can be formed from the buffered line images. For example, in certain embodiments of the present invention, a target image, such as those illustrated and described with reference to 16A-16B, may be considered complete upon a positive determination that successive line images following the target activity correspond to only background radiation. If so, the acquisition cycle is terminated in operation 1425 and the complete image is stored, classified, and/or transmitted in operation 1435.

If, in operation 1450, it is determined that the buffer is near full, e.g., an occupancy of a predetermined level such as three-quarters full, and the acquisition cycle has not terminated, the image completion criteria may be relaxed in operation 1455. For example, if a target image is considered complete when the line image data are at the background level, operation 1455 by increase the level by a predetermined amount. That is, rather than considering the image complete only when line images corresponding to the background level have been acquired, the image may be considered complete when the line image is near the background level to within a predetermined degree. Alternatively, the image may be considered complete when a predetermined number of successive line images are indicative of static emissions from the field of view of OTS 550, and the degree to which the emissions are static to meet the image completion criteria may be relaxed as the buffer approaches maximum occupancy. Such relaxation of the image completion criteria may be repeated until either the image meets the current completion criteria, as determined in operation 1485, or until the buffer is full, as determined in operation 1490.

If it is determined in operation 1490 that the buffer has filled without the image completion criteria being met, the contents of the buffer are stored in memory as an image partition. In operation 1465, partition continuity data are prepared so that one or more image partitions may be assembled into a final image at the receiving location. For example, each of the line images may be indexed in accordance with a predetermined indexing scheme, whereby the line images may be ordered at the receiving location. The skilled artisan will recognize alternative data continuity techniques that may be used with the present invention without departing from the spirit and intended scope thereof.

The image partition and corresponding continuity data are transmitted to the receiving location in operation 1470 and the buffer is flushed in operation 1475. Process 1400 is repeated at operation 1405, whereby the line image data buffer 1266 begins to refill. In certain embodiments of the invention, the size of the buffer is adjusted to compensate for the continuity data, as well as other transmission overhead, so that the available bandwidth of the communication channel is not exceeded thereby.

In accordance with the present invention, as demonstrated by the process 1400 described above, data may be acquired and sized by way of a suitable number of line images so as to meet communication channel bandwidth limitations. Numerous image partitions consisting of no more than a maximum number of line images, such as the maximum number of line images that can be stored in line image data buffer 1266 may be acquired and transmitted in real time. Moreover, in certain embodiments of the present invention, the size of the line image data buffer 1266 may be dynamically set in accordance with changing communication channel bandwidth. Accordingly, the communication subsystem 1245 may implement feedback mechanisms by which a current capacity of the corresponding communication channel 1243 can be determined.

Figure 15:
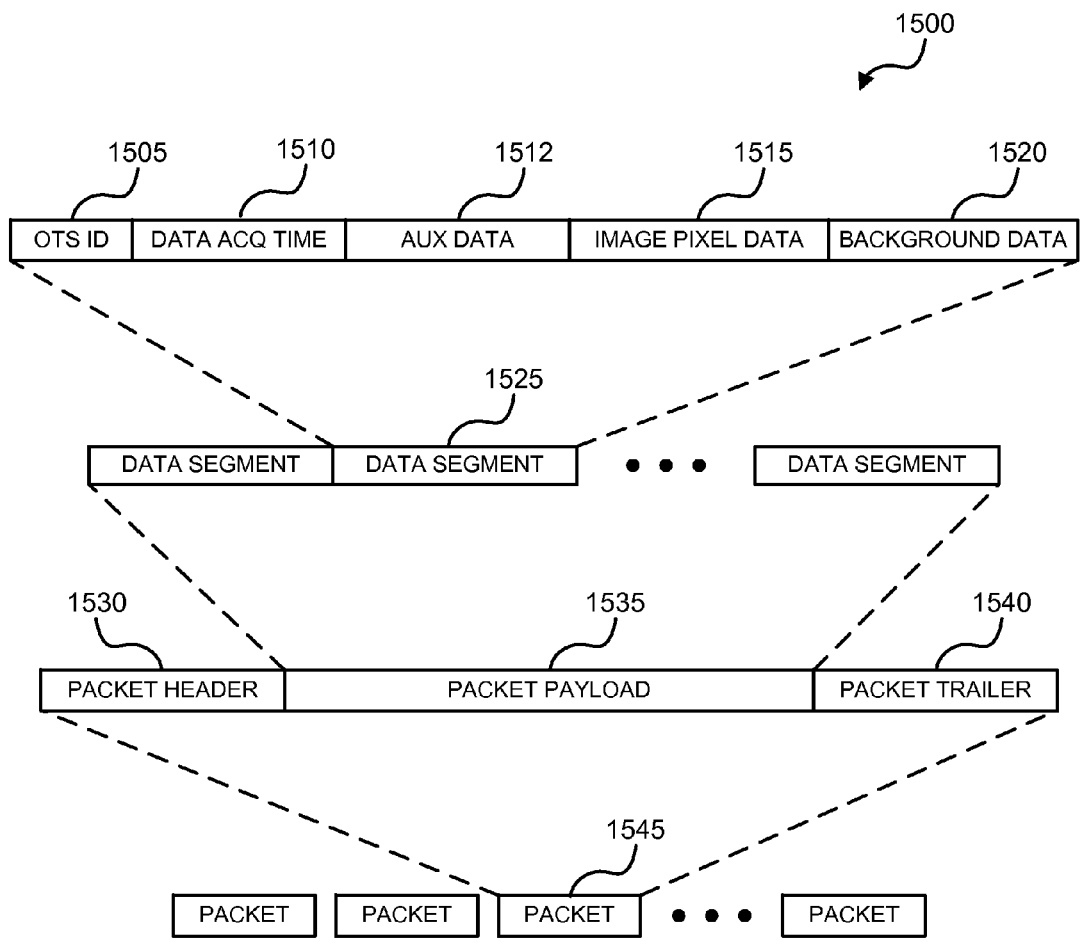
FIG. 15 as a block diagram illustrating an exemplary data transmission package in accordance with the present general inventive concept.

In FIG. 15, there is illustrated an exemplary data transmission package 1500 suitable for use in embodiments of the present invention. As is illustrated in the figure, exemplary data transmission package 1500 includes an OTS identification field 1505 by which the transmitting OTS may be identified. Data acquisition time field 1510 has encoded therein, for example, an indication of the time of the trigger condition, i.e., the time at which data acquisition began. Auxiliary data field 1512 may include application—or used defined auxiliary data, such as target classification data and/or image continuity data. Image pixel data field 1515 may include pixel data of a variable number of line images 230 depending upon the application in which the present invention is embodied. Image pixel data field 1515 may include pixel data of a single line image 230 or a two-dimensional target profile assembled from a plurality of line images 230. Exemplary background radiation data field 1520 contains information regarding background radiation levels in the region of interest encompassed by the field of view of OTS 500. Background radiation data field 1520 may include a single measure background radiation value or may contain background radiation statistics, such as a mean background radiation value and standard deviation of the background radiation values over the time interval in which the background data was acquired.

As is illustrated in FIG. 15, the data transmission package 1500 may be encoded and/or formatted into data segments 1525 for transmission. One or more data segments 1525 may be incorporated into a transmission packet 1545 as the packet payload 1535 thereof. The packet payload 1535 may be assembled between a packet header 1530 and a packet trailer 1540 in packet 1545. The packet header 1530 in packet trailer 1540 may contain suitable data to address the packet 1545 to its destination in accordance with the transmission and control protocol of the communication channel in which it is transmitted.

Figure 16A:
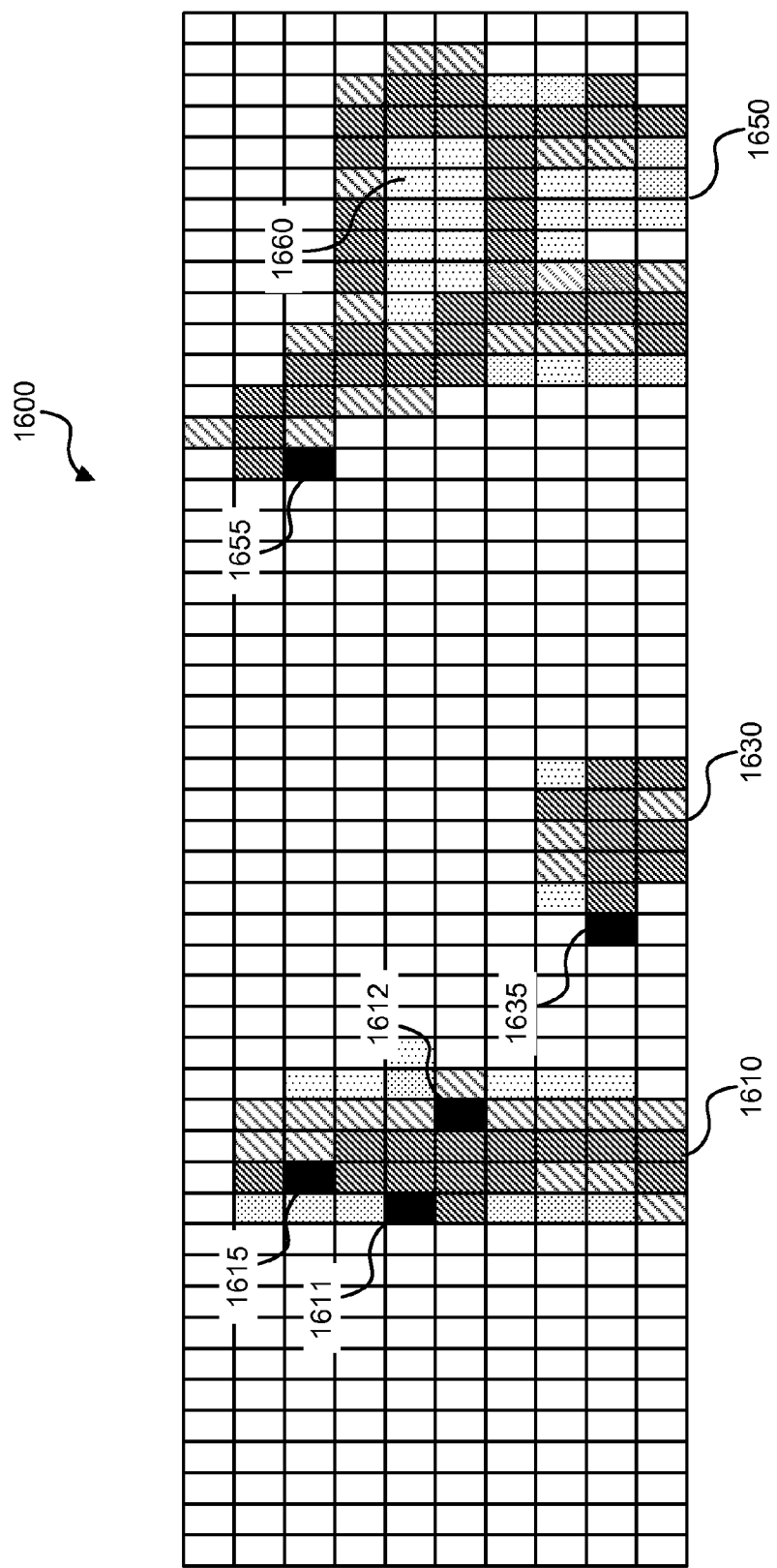

In certain embodiments of the present invention, the targets represented in image data transmitted by OTS 500 are classified and identified to determine whether an action, such as notifying an alert recipient, should be initiated. By way of example, FIGS. 16A-16B illustrate line image data acquired by OTS 500. In the following description of FIGS. 16A-16B, a thermal radiation application will be assumed in the pixel data and the line images represent a temperature of the corresponding location on the target. Further, it is to be assumed that a pixel represented in FIGS. 16A-16B having denser shading corresponds to a temperature that is greater than a temperature represented by a pixel having less dense shading. Additionally, it is to be understood that while the classification and identification features are described below through visible characteristics of the data represented in FIGS. 16A-16B, embodiments of the present invention may perform similar classification and identification through machine implemented processes without rendering the image to a visible state.

As is illustrated in FIGS. 16A-16B, the exemplary temperature profile 1610 is of width w between four and five pixels and is of height h of 10 pixels. Within the temperature profile 1610, there is a central warm mass with three highly emissive spots represented by pixels 1615, 1611 and 1612. A data classifier operating in accordance with the present invention may extract features of temperature profile 1610 as illustrated in FIG. 16B. For example, a feature extraction process may determine the relative positions of the highly emissive locations, as indicated by lines $r_1$-$r_3$ in FIG. 16B, to identify a human target with head at approximately a location corresponding to pixel 1615 and hands approximately at the location corresponding to pixels 1611 and 1612. Accordingly, certain embodiments of the present invention may alert applicable personnel to the presence of a human subject in the region of interest.

The target corresponding to temperature profile 1630, on the other hand, is much shorter than that of temperature profile 1610 and only a few pixels wider. Temperature profile 1630 has one highly emissive spot 1635 forward of a central warm mass. Accordingly, the target corresponding to temperature profile 1630 may be classified as an animal and identified as a dog. In certain cases, the identification of such a target as a dog may be further established by its proximity and relative motion with a human subject, such as that indicated at temperature profile 1610. However, if the target corresponding to temperature profile 1630 is a lone, freely moving animal, certain embodiments of the present invention would identify the corresponding target as being an animal innocently wandering about the region of interest and that notifying an alert recipient would not be necessitated.

The target corresponding to exemplary temperature profile 1650 has a much larger cross-section than the targets of temperature profiles 1610 and 1630, but has a thermal cross-sectional signature similar to the animal 1630. As is illustrated in FIG. 16B, the temperature profile 1650 is eccentric as indicated by line e, has a major mass section $m_h$ pixels high and $m_w$ pixels wide, and has a protuberance along the eccentricity line e of $p_h$ pixels high and $p_w$ pixels wide. Additionally, the temperature profile 1650 includes a highly emissive spot a distance s from the ground pixels and has an apparent leg spacing of f. The corresponding target may be classified as animal and, due to its size and other features extracted per the description of FIG. 16B, may be identified as a horse. It is to be noted, however, that a well-defined cooler region 1660 is located in the warm mass 1662 of the temperature profile 1650, which may be identified as an object being carried by the identified horse. Accordingly, whereas an animal in the region of interest may be ignored, even, in certain cases, one the size of a horse, the presence of an article being carried by the animal may necessitate alerting the applicable personnel.

Figure 17A:
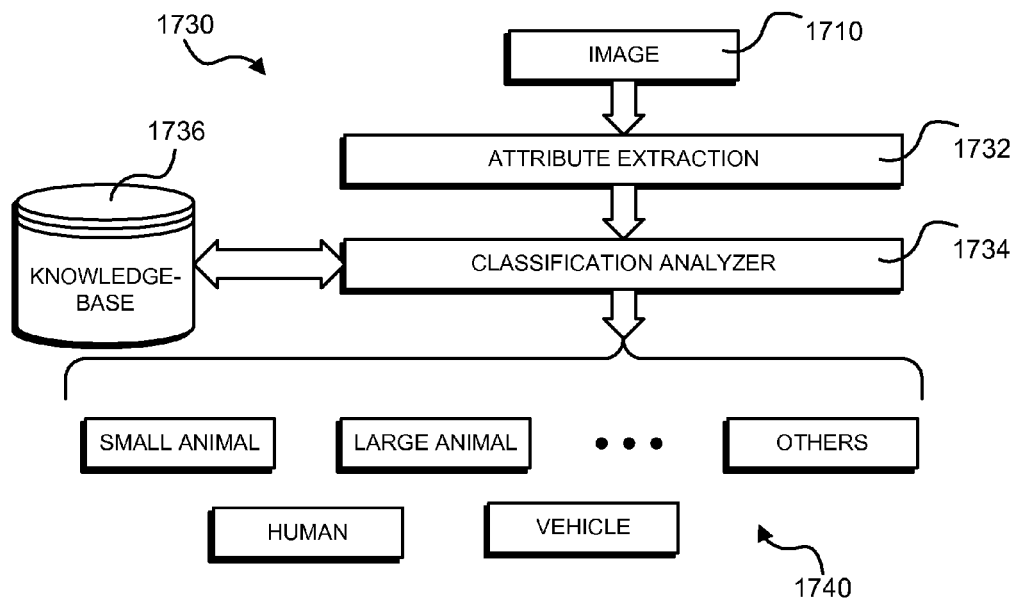
FIGS. 17A-17B are block diagrams of exemplary target classifiers implementable in accordance with the present general inventive concept.

Referring now to FIG. 17A, there is illustrated an exemplary target classification processor 1730. The exemplary target classification processor 1730 may be implemented through, for example, an expert system comprising a classification analyzer 1734 and a knowledgebase 1736. Image 1710 containing pixilated thermal profile data of a target of interest is provided to an attribute extraction processor 1632, by which various attributes of the target of interest are extracted. For example, the features illustrated and described with reference to FIG. 16B may be extracted through suitable pattern analysis processes and data indicative of such features may be provided to the classification analyzer 1734. Classification analyzer 1734 may consult knowledgebase 1736, such as by traversing a binary tree configured therein, to determine by which of a known plurality of classes 1740 the target of interest is best classified.

Figure 17B:
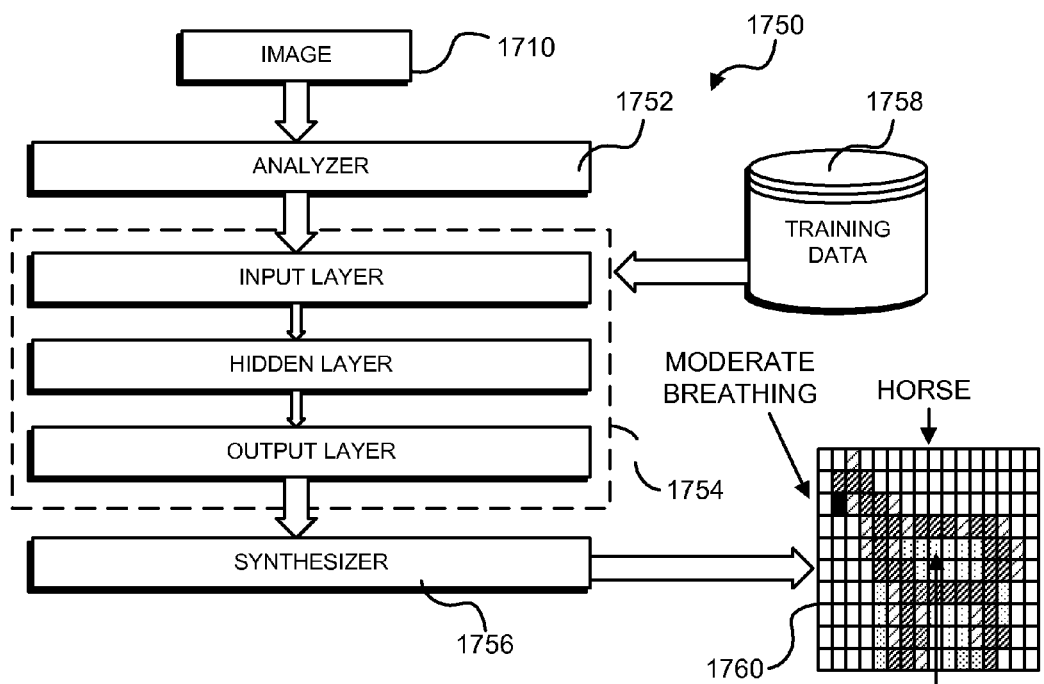

An alternative embodiment of a target classification processor 1750 is illustrated in FIG. 17B. The exemplary target classification processor 1750 may implement an artificial neural network (ANN) 1754 suitably trained via training data 1758 to classify a plurality of expected targets. As is illustrated in the figure, image 1710 is provided to an analyzer 1752 to, for example, decompose the image 1710 into predetermined components, such as spatial frequencies, wavelets, principal components, etc. The constituent components of image 1710 are provided to ANN 1754, whereby probabilities of classification features are generated. The output of ANN 1754 may be provided to synthesizer 1756 to reconstitute an image 1760 of the classified target. In certain embodiments of the present invention, ANN 1754 is continually trained as identified targets are verified. Accordingly, the reconstituted image 1760 may be displayed in a color scheme that identifies recognized features in the original image 1710. For example, the target in image 1760 may be identified through one color as an animal and labeled with text as a horse, may have a pack being carried by the horse identified by a color indicative of a carried load, and may have emissive spot 1655 displayed in a color indicative of the level of exertion exhibited by the horse to carry its load.

It is to be understood that present invention is not limited to a particular target classification process. That is, numerous target classifiers may be used with the present invention without departing from the spirit and intended scope thereof.

Figure 17C:
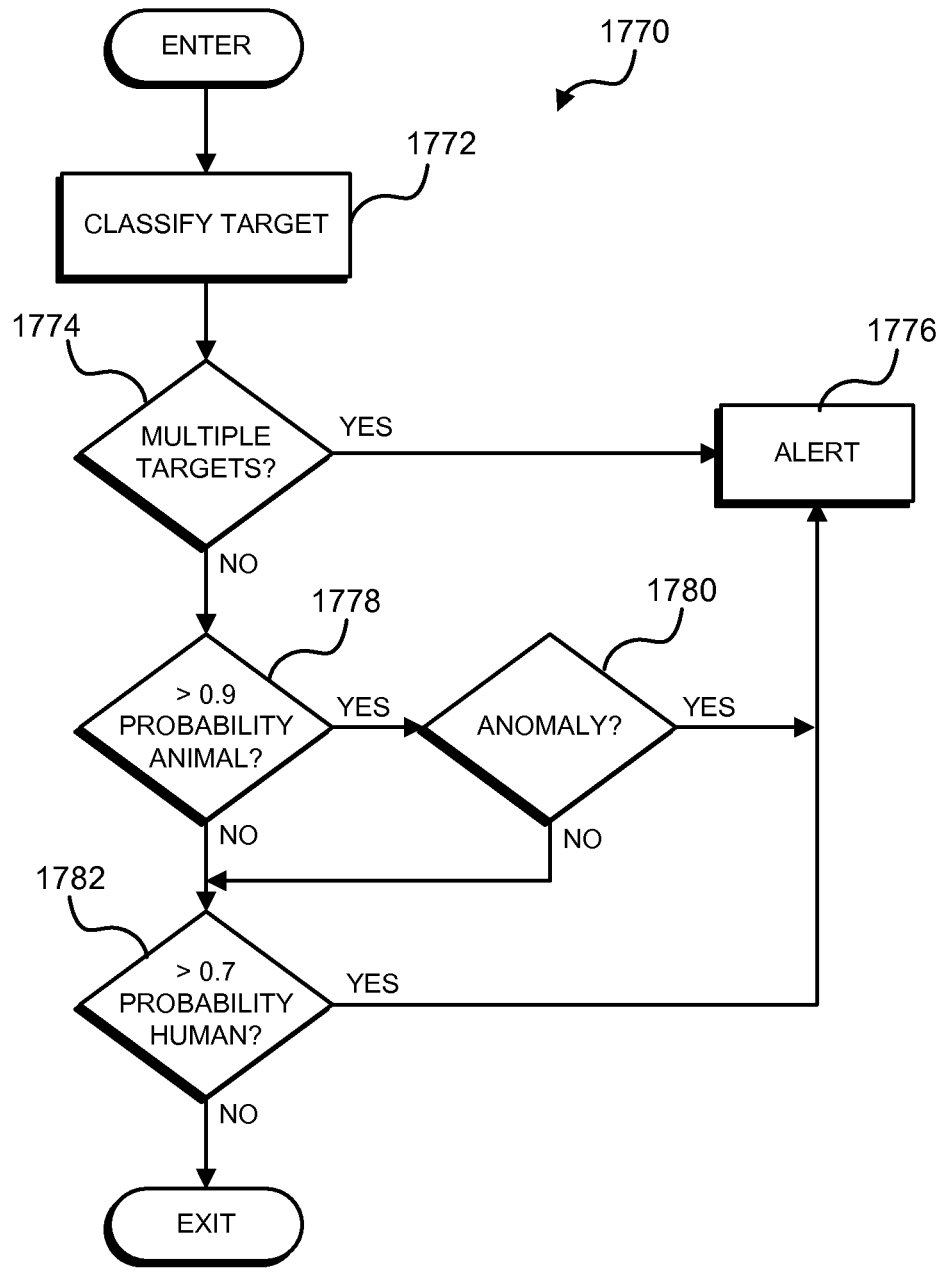
FIG. 17C is a flow diagram of an exemplary process for issuing an alert in accordance with the present general inventive concept.

In certain embodiments of the present invention, alerts may be issued according to the exemplary process 1770 illustrated in FIG. 17C. Upon entry, the process transitions to operation 1752, whereby the target is classified, such as by target classification processors 1730 and/or 1750. In operation 1774, it is determined whether multiple targets are found in the target profile. If so, an alert is issued to an alert recipient in operation 1776. If there is but one target, it is determined in operation 1778 whether there is a significant likelihood, for example, with greater the 0.9 probability, that the target is an animal. If so, it is determined in operation 1780 whether temperature profile of the animal contains an anomaly, such as a cooler region indicative of a load. If an anomaly exists, the process 1770 transitions to operation 1776 where a suitable alert is issued. If no anomaly exists in the animal's temperature profile, or if there is less than a significant likelihood that the target is an animal, process 1770 transitions to operation 1782 by which it is determined whether there is a significant likelihood, for example, greater than 0.7 probability, that the target is human. If so, an alert is issued in operation 1776. If it cannot be determined with significant probability that the target is human, the identity of the target is ambiguous and the process is terminated.

Figure 18:
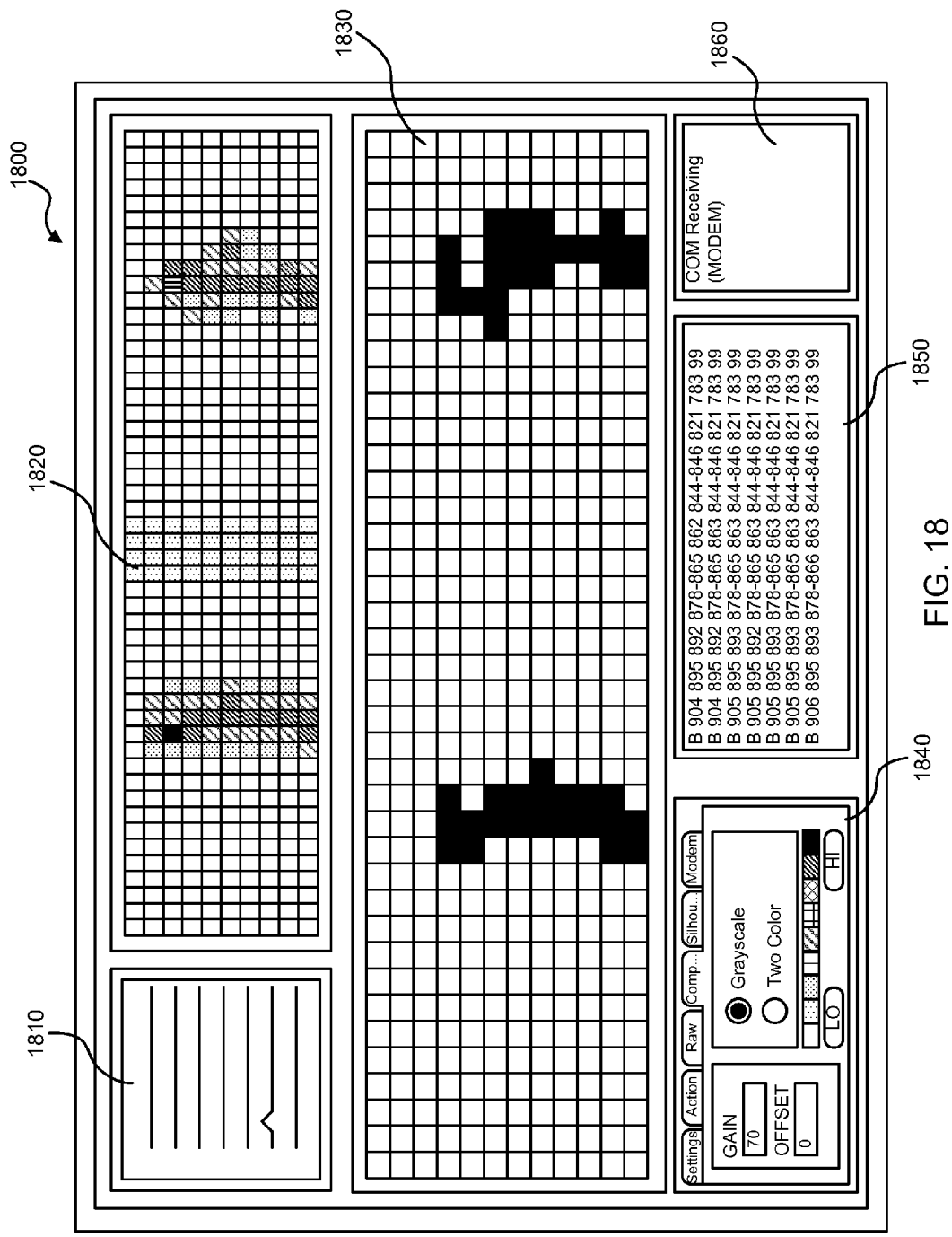
FIG. 18 is an illustration of an exemplary user interface of a data analysis and control system constructed in accordance with the present general inventive concept.

In certain embodiments of the present invention, process 1770 may be carried out through automated machine operations, such as through a data processor. In other embodiments, process 1770 is carried out by suitably trained monitoring personnel operating a data processor through a user interface. Further, in automated processes, a user interface may be used to classify and identify targets when the identity of the target remains ambiguous at the termination of the automated process 1770. FIG. 18 illustrates an exemplary user interface 1800 for use in embodiments of the present invention. The user interface 1800 may be used to, among other things, monitor the system status of one or more OTS 500 deployed in various remote locations, monitor data quality of incoming image data, and classify and identify targets from receive data.

As illustrated in FIG. 18, user interface 1800 includes a data pane 1810, which may be used to monitor the status of certain data components, a data pane 1820 through which to view of incoming pixel data having electromagnetic emission values assigned thereto, a data pane 1830 through which to view image data, a user control pane by which various aspects of the user interface may be modified and/or controlled, a raw data pane 1850, and a communications status data pane 1860. It is to be understood that the user interface 1800 may include a wide range of controls and display panes without departing from the spirit and intended scope of the present invention.

Figure 19A:
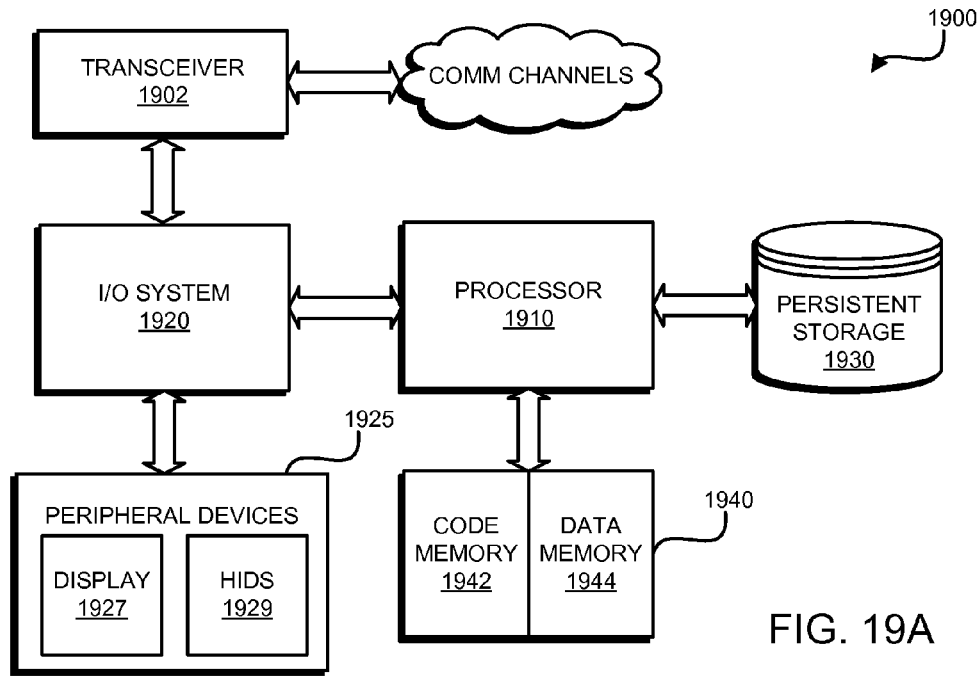
FIGS. 19A-19B are schematic block diagrams of exemplary system and functional components of a data analysis and control system constructed in accordance with the present general inventive concept.

FIG. 19A illustrates an exemplary system configuration suitable to embody control and processing features at a remote location, such as at OCC 140, according to the present invention. An exemplary data processing apparatus 1900 of FIG. 19A includes an input/output (I/O) system 1920, through which the data processing apparatus 1900 may communicate with remote OTSs 500 through transceiver 1902, with peripheral devices, collectively represented at block 1925, and with external network devices (not illustrated). Among the peripheral devices 1925 may be a display device 1927, on which data are rendered as image data, and one or more Human Interface Devices (HIDs) 1929, such as a keyboard, a mouse, a track ball, a stylus, a touch screen, a touchpad, and/or other devices suitable to provide input to the data processing apparatus 1900. It is to be understood that the data processing apparatus 1900 may be implemented as fixed equipment at a facility remote from OTS 500, including, for example in a mobile OCC 140a, or may be implemented as mobile equipment to bring into proximity of OTS 500, such as for in-field maintenance purposes.

The exemplary data processing apparatus 1900 of the embodiment illustrated in FIG. 19A includes a processor 1910 to, among other things, execute processing instructions that implement various functional modules, such as those described below with reference to FIG. 19B. It is to be understood that the present invention is not limited to a particular hardware configuration or instruction set architecture of the processor 1910, which may be configured by numerous structures that perform equivalently to those illustrated and described herein. Moreover, it is to be understood that while the processor 1910 is illustrated as a single component, certain embodiments of the invention may include distributed processing implementations through multiple processing elements. The present invention is intended to embrace all such alternative implementations, and others that will be apparent to the skilled artisan upon review of this disclosure.

A storage unit 1940 may be utilized to store data and processing instructions on behalf of the exemplary data processing apparatus 1910 of FIG. 19A. The storage unit 1940 may include multiple segments, such as a code memory 1942 to maintain processor instructions to be executed by the processor 1910, and data memory 1944 to store data, such as data structures on which the processor 1910 performs data manipulation operations. The storage unit 1940 may include memory that is distributed across components, to include, among others, a cache memory and a pipeline memory.

The data processing apparatus 1900 may include a persistent storage system 1930 to store data and processing instructions across processing sessions. The persistent storage system 1930 may be implemented in a single persistent memory device, such as a hard disk drive, or may be implemented in multiple persistent memory devices, which may be interconnected by a communication network.

Figure 19B:
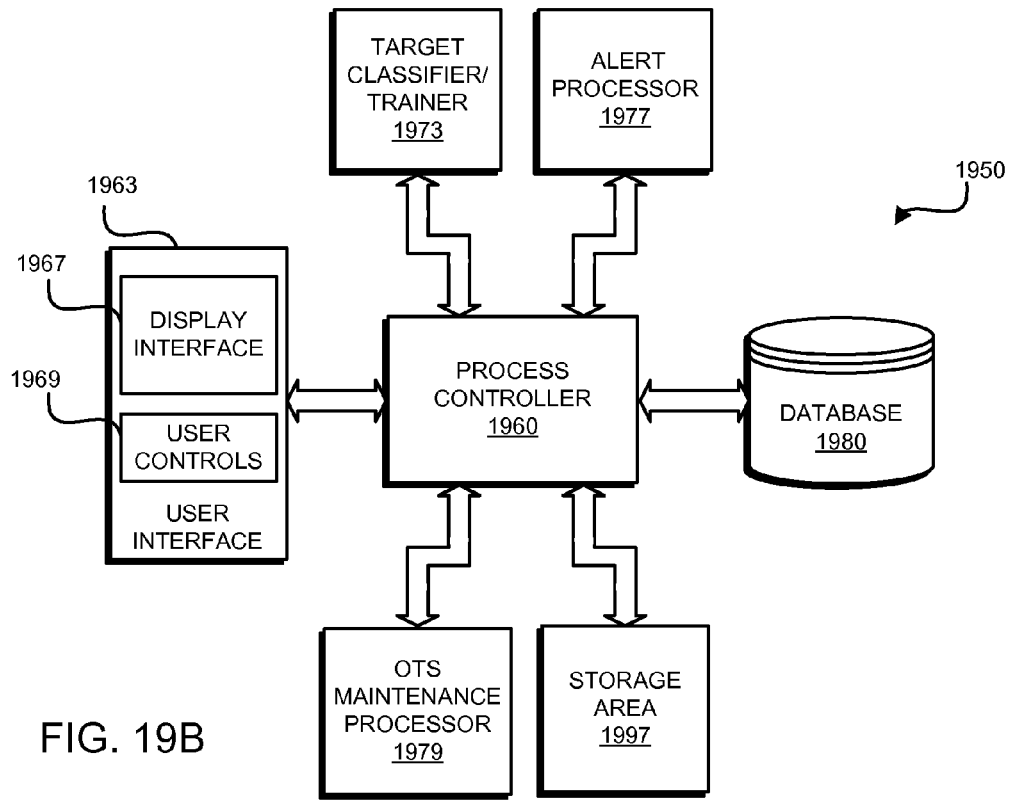

FIG. 19B illustrates an exemplary configuration of functional components suitable to practice certain embodiments of the present invention. The exemplary system illustrated in FIG. 19B may be implemented through processing instructions executed on the processor 1910, and in cooperation with other components as illustrated in FIG. 19A, form an exemplary data analysis and control system (DACS) 1950 on the exemplary data processing apparatus 1900. The exemplary DACS 1950 may be operated by suitably trained personnel to, among other things, monitor system operation, to identify targets and issue alerts, and perform various OTS maintenance tasks.

The DACS 1950 may include a process controller 1960 to coordinate and control the interoperations of the functional components of the DACS 1950 so as to achieve a fully operational data processing system. For example, the process controller 1960 may receive data corresponding to user manipulations of the user interface 1800, may format data into a command and/or data location in memory, and may convey such information to the applicable functional module of the DACS 1950. The process controller 1960 may subsequently receive processed data from the applicable functional module and forward the data to another functional module, as well as to indicate such processing on the user interface 1965. The process controller 1960 will perform other coordination and control operations according to the implementation of the DACS 1950, and such other operations, as well as the implementation of such, can be embodied by a wide range of well-known process control methods and apparatuses. The present invention is intended to encompass all such alternatives of the process controller 1960, including multi-threaded and distributed process control methodologies.

As indicated above, the DACS 1950 may include a user interface 1800 through which the DACS 1950 interacts with a user. The user interface 1800 may be implemented by a combination of hardware devices and suitably programmed processing instructions executed by the processor 1910. The user interface 1800 may be used to present data to the user in a meaningful form on a display interface 1967, such as illustrated in FIG. 18. The user interface 1800 may interpret user manipulations of any HIDs thereof into messages and instructions that can be recognized by the process controller 1960. The user interface 1800 may include a plurality of user controls 1969, including, for example, those illustrated in FIG. 18 at user control pane 1840, to afford the user interactivity with and control over the DACS 1950. The user controls 1969 may include the HIDs described above, and may also include software implemented controls on the display interface 1967, such as toolbars and/or buttons, menus of commands, text command entry blocks, and other suitable software controls. The foregoing description of the user interface 1965 may be met by a suitably configured graphical user interface (GUI), such as that illustrated in FIG. 18, the implementation details of such will be omitted in the interest of conciseness.

Storage area 1997 may store image data received from OTS 500 for processing by DACS 1950. A target classifier/trainer 1973 may be embodied in the DACS 1950 to perform automated machine implemented target classification and identification, and ANN training, such as described with reference to FIGS. 16A-16B and FIGS. 17A-17B.

Additionally, DACS 1850 may include an alert processor 1977 to, upon notification to issue an alert, format an alert message suitable to presentation on an alert terminal, such as terminal device 150, at the location of an alert recipient. The alert message may contain information regarding the classification and identification of the target, the location of the region of interest in which the target was detected, the time at which the target was detected and other information pertinent to the application in which the present invention is embodied. The alert message may be transmitted in one or more different formats including, but not limited to, an image, a message interpretable by an application running at the receiving terminal, and as simple text, and may be transmitted to the remote terminal in a variety of communication channels, such as those described with reference to FIGS. 1A-1B. Additionally, the alert processor may detect an acknowledgment signal received from the terminal to which the alert was transmitted and may notify the user of DACS 1950 of such through user interface 1800.

Exemplary DACS 1950 includes an OTS maintenance processor 1979 through which to perform OTS maintenance tasks. The OTS maintenance processor 1979 may cooperate with the maintenance port 1260 to access OTS 500 for purposes of alignment, upgrading system software, and other maintenance tasks for the application in which the present invention is embodied. The OTS maintenance processor 1979 may present a user interface similar to user interface 1800, but configured to assist an operator thereof with the performance of the applicable maintenance tasks.

DACS 1950 may include a database 1980 in which certain data are stored per the application in which the present invention is embodied. For example, database 1980 may store data templates corresponding to known targets for purposes of target classification and identification and ANN training. Additionally, database 1980 may store archived system logs, alert logs, and the like, in a manner to be retrieved at a later date. The ordinarily skilled artisan will recognize numerous varieties of data that may be stored in database 1980 without departing from the spirit and intended scope of the present invention.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A spatial sensing apparatus comprising:
    optics defining an optical path so as to distribute electromagnetic radiation intercepted thereby over an image plane;
    a detector array to produce electrical signals proportional to the distribution of the electromagnetic radiation over the image plane;
    a processor electrically coupled to the detector array to produce an image from the electrical signals upon a positive determination that the distribution of the electromagnetic radiation over the image plane is other than a predetermined excluded spatial distribution thereof; and
    a data storage unit to store the image such that the image is retrievable therefrom.

2. The apparatus as recited in claim 1, wherein detectors in the detector array are disposed on the image plane in a spatial distribution complementary to the excluded spatial distribution of electromagnetic radiation.

3. The apparatus as recited in claim 2, wherein the spatial distribution of detectors in the detector array excludes impingement by the distribution of the electromagnetic radiation of a predetermined class of electromagnetic radiators upon the detector array being positioned in space in accordance with a predetermined alignment criterion.

4. The apparatus as recited in claim 3 further comprising:
    a housing to enclose the optics and the detector array, the housing having formed therein an opening through which the electromagnetic radiation is communicated to the optics, the detector array being aligned in the opening through the optics in a predetermined alignment; and
    a sighting mechanism selectively coupled to the housing in accordance with the predetermined alignment of the detector array in the opening to position the detector array in accordance with the predetermined alignment criterion.

5. The apparatus as recited in claim 4, wherein the sighting mechanism is calibrated to align a predetermined detector of the detector array to a position in space sighted therethrough as the alignment criterion.

6. The apparatus as recited in claim 1, wherein the detector array produces an image set of the electrical signals proportional to the electromagnetic radiation impinging an imaging area of the image plane and a signaling set of the electrical signals proportional to the electromagnetic radiation impinging a signaling area of the image plane.

7. The apparatus as recited in claim 6, wherein the processor determines from the signaling set of electrical signals whether other than the excluded distribution of electromagnetic radiation impinges the image plane.

8. The apparatus as recited in claim 7 further comprising:
    a linear array of detectors in the detector array disposed in the imaging area to generate the imaging set of the electrical signals; and
    at least one sentinel detector in the detector array disposed in the signaling area to generate the signaling set of the electrical signals.

9. The apparatus as recited in claim 8, further comprising:
    a read circuit to generate respective numerical values proportional to the imaging set of the electrical signals for each period of a sampling signal, the processor assigning values corresponding to the numerical values to respective pixels of a line image for each period of the sampling signal.

10. The apparatus as recited in claim 9 further comprising:
    an image processor to assemble a two-dimensional image from a selected plurality of the line images.

11. The apparatus as recited in claim 9 further comprising:
    a buffer to store line images over successive periods of the sampling signal, the buffer being selectively sized to store a number of the line images not to exceed available bandwidth of a predetermined communication channel over which the line images are conveyed.

12. The apparatus as recited in claim 11, wherein the buffer is variably sized in accordance with the available bandwidth at the time the line images are conveyed.

13. The apparatus as recited in claim 8, wherein an active area of the detectors in the linear array of detectors is less than 1 mm$^2$.

14. The apparatus as recited in claim 8 further comprising:
an external sentinel detector to receive the electromagnetic radiation through an optical system separated from the optical path defined by the optics; and
an event timer to determine a relative time between a change in the distribution of electromagnetic radiation in the external sentinel detector and a change in the distribution of electromagnetic radiation in the detector array, wherein the processor determines at least one spatial characteristic of a target emitting the electromagnetic radiation with respect to the optical path.

15. The apparatus as recited in claim 14, wherein the processor determines a distance to the target and a velocity of the target.

16. The apparatus as recited in claim 1 further comprising:
a controller to select a set of sentinel detectors from the detector array, electrical signals from which determine whether the electromagnetic radiation distributed over the image plane is other than the excluded distribution.

17. The apparatus as recited in claim 16 further comprising: a communication device to receive an instruction from a remote device indicating the set of the sentinel detectors, the controller receiving the instruction and selecting the set of detectors in accordance therewith.

18. The apparatus as recited in claim 16, wherein the sentinel detectors are selected from a linear array thereof separated from an imaging array in the detector array by a predetermined distance.

19. The apparatus as recited in claim 16, wherein the sentinel detectors are selected from a two dimensional array of like detectors.

20. The apparatus as recited in claim 19, wherein the sentinel detectors are selected in accordance with predetermined rules associated with a region of interest from which the electromagnetic radiation is emitted.

21. The apparatus as recited in claim 1 further comprising:
a communication device by which the image, once retrieved by the processor, is transmitted to a remote location.

22. The apparatus as recited in claim 21, wherein the processor includes a quantizer to reduce a size of the stored image prior to transmitting to the remote location.

23. The apparatus as recited in claim 22, wherein the stored image comprises a plurality of pixel values of a predetermined word length and the quantizer reduces the word length of the pixel values prior to transmission to the remote location.

24. The apparatus as recited in claim 23, wherein the processor performs at least one data processing operation on the pixel values prior to the quantizer reducing the word length of the pixel values.

25. The apparatus as recited in claim 24, wherein the at least one data processing operation includes classifying a target from the image.

26. The apparatus as recited in claim 1, wherein the processor determines whether the distribution of electromagnetic energy over the image plane is other than the exclude distribution prior to producing the image.

27. The apparatus as recited in claim 1, wherein the excluded distribution is established to correspond to an excluded class of target.

28. The apparatus as recited in claim 1, wherein the optics comprises:
a concave primary mirror aligned on an axis of the optical path; and
a secondary mirror in opposing spatial relationship with the primary mirror to reflect the electromagnetic radiation focused thereby onto the detector array.

29. The apparatus as recited in claim 28, wherein the secondary mirror is an elongated planar mirror having an oblong central portion and at least one planar lobe extending transversely therefrom.

30. The apparatus as recited in claim 29, wherein the oblong central portion of the secondary mirror is aligned on the optical path to an imaging area of the detector array and the planar lobe of the secondary mirror is aligned on the optical path to a signaling area of the detector array.

31. The apparatus as recited in claim 29, wherein the secondary mirror is symmetrical about the longitudinal axis thereof and nonsymmetrical about the transverse axis thereof.

32. A spatial sensing system comprising:
a sensor to produce an image indicative of a distribution of electromagnetic energy emitted from a target in the field of view thereof, the image being produced upon a positive determination that a spatiotemporal distribution of the electromagnetic radiation over an image plane of the sensor is other than a predetermined excluded spatial distribution thereof;
a communication system to transmit an alert upon a positive determination that the target in the field of view of the sensor is a member of a predetermined class of targets; and
a receiving device to receive the transmitted alert.

33. The system as recited in claim 32, wherein the transmitted alert includes the image produced by the sensor.

34. The system as recited in claim 33 further comprising:
a processor electrically coupled to the sensor to produce the image from electrical signals generated by a detector array in the sensor, the produced image comprising a plurality of pixels assigned numeric values of a predetermined word length.

35. The system as recited in claim 33, wherein the processor quantizes the image to reduce the word length of the numeric pixel values prior to the transmission of the image with the alert.

36. The system as recited in claim 35, wherein the processor performs at least one data processing operation on the image prior to quantizing the pixel values thereof.

37. The system as recited in claim 36 further comprising:
a classifier to determine whether the target in the field of view of the sensor is the member of the class of targets.

38. The system as recited in claim 37, wherein the classifier is deployed in the sensor and the determination thereby of whether the target is a member of the class of targets is the data processing operation performed prior to quantizing the pixel values.

39. The system as recited in claim 38, wherein the alert includes a data field indicative of a classification of the target.

40. The system as recited in claim 32, wherein the sensor produces the image from a plurality of temporally displaced line images.

41. The system as recited in claim 40 further comprising:
a buffer to store the temporarily spaced line images, the buffer being selectively sized to store a number of the line images not to exceed available bandwidth of a communication channel over which the line images are conveyed.

42. The apparatus as recited in claim 41, wherein the buffer is variably sized in accordance with the available bandwidth at the time the line images are conveyed.

43. The system as recited in claim 32 further comprising:
a maintenance port electrically coupled to the sensor to receive configuration data thereat via the communication system.

44. The system as recited in claim 43, wherein the configuration data includes a designation of at least one detector in the sensor by which the determination that the spatiotemporal distribution of the electromagnetic radiation over the image plane thereof is other than the excluded spatial distribution thereof.

45. A method of monitoring a region of interest in a field of view of an optical sensor for target activity, the method comprising:
establishing at least one class of targets for which an alert is to be issued upon a positive determination that a member of the class is within the field of view of the optical sensor;
providing the optical sensor with a detector array to produce an image indicative of a distribution of the electromagnetic radiation over an image plane thereof upon a positive determination that the distribution of the electromagnetic radiation is not that corresponding to an excluded class of targets;
positioning the optical sensor in space to intercept the electromagnetic radiation such that the production of the image indicative of distribution of the electromagnetic radiation corresponding to the excluded class of targets is inhibited;
determining whether the image produced by the positioned optical sensor corresponds to the member of the class of targets; and
transmitting the alert to a terminal device upon the positive determination that the image corresponds to the member of the class of targets.

46. The method as recited in claim 45 further comprising:
forming a linear array of pixels at each of a plurality of sample periods upon a positive determination that the distribution of electromagnetic radiation is not that corresponding to the excluded class of targets;
assembling a two-dimensional image from the linear array of pixels collected over a set of the sample periods; and
determining whether a distribution of pixel values in the two-dimensional image corresponds to the member of the class of targets.

47. The method as recited in claim 46 further comprising:
quantizing the pixel values in the two-dimensional image to reduce a data word length thereof; and
transmitting the quantized two-dimensional image with the alert.

48. The method as recited in claim 47 further comprising:
performing at least one data processing operation on the pixels of the two-dimensional image prior to the quantizing of the pixel values.

49. A method of monitoring a region of interest in a field of view of an optical sensor for target activity, the method comprising:
establishing at least one class of targets for which an image is to be transmitted upon a positive determination that a member of the class is within the field of view of the optical sensor;
providing the optical sensor with a detector array to produce the image from a plurality of line images corresponding to a spatiotemporal distribution of the electromagnetic radiation over an image plane thereof upon a positive determination that the distribution of the electromagnetic radiation is not that corresponding to an excluded class of targets;
assembling a set of the line images of the image in accordance with available bandwidth of a communication channel over which the image is to be conveyed; and
transmitting the set of line images to a terminal device such that the available bandwidth is not exceeded thereby.

50. The method as recited in claim 49, further comprising:
storing the set of line images corresponding to the available bandwidth in a buffer; and
flushing the buffer independently of whether the set of the line images transmitted to the terminal device is equal in number to the plurality of line images in the image.

51. The method as recited in claim 50 further comprising:
determining whether the set of line images in the buffer is equal in number to a predetermined occupancy level thereof upon a positive determination that the distribution of electromagnetic radiation over the image plane corresponds to other than an image acquisition termination criterion; and
establishing that the set of the line images is fewer in number than the plurality of line images in the image upon a positive determination that the buffer is below the predetermined occupancy level and the distribution of electromagnetic radiation over the image plane meets the image acquisition termination criterion.

52. The method as recited in claim 51 further comprising:
establishing a first requirement by which the image acquisition termination criterion is met;
determining whether the first requirement is met prior to the set of line images in the buffer becoming equal in number to the predetermined occupancy level; and
relaxing the image acquisition termination criterion to another requirement upon a positive determination that the set of line images in the buffer is approaching in number the predetermined occupancy without the first requirement being met.

53. The method as recited in claim 52, wherein the first requirement is such that successive line images in the buffer correspond to a distribution of electromagnetic radiation being substantially equivalent to background radiation in the field of view of the optical sensor and the other requirement is such that a most recently acquired line image in the buffer corresponds to the distribution of electromagnetic radiation being substantially equivalent to a level of electromagnetic radiation that exceeds the background radiation by a predetermined margin.

54. The method as recited in claim 52, wherein the first requirement is such that a predetermined number of successive line images in the buffer corresponding to the spatiotemporal distribution of electromagnetic radiation vary by less than a first amount and the other requirement is such that the predetermined number of successive line images in the buffer vary by less than a second amount, where the second amount is greater than the first amount.

55. The method as recited in claim 52 further comprising:
preparing image continuity data for the set of line images upon a positive determination that the set of line images in the buffer is equal in number to the predetermined occupancy level prior to the image termination criterion being met;

transmitting the continuity data with the set of line images to the terminal device;

storing another set of line images of the image in the buffer in accordance with the available bandwidth; and assembling the set of line images and the other set of line images at the terminal device in accordance with the continuity data.

56. The method as recited in claim 50 further comprising:

determining the available bandwidth for a time interval during which the number of line images are to be transmitted; and allocating memory for the buffer such that a maximum number of line images corresponding to the determined available bandwidth may be stored therein.

* * * * *

UNITED STATES PATENT AND TRADEMARK OFFICE
CERTIFICATE OF CORRECTION

PATENT NO. : 8,830,316 B2  
APPLICATION NO. : 12/896767  
DATED : September 9, 2014  
INVENTOR(S) : Feng Jin et al.

Page 1 of 1

It is certified that error appears in the above-identified patent and that said Letters Patent is hereby corrected as shown below:

In the Specification,

Column 20, line 1, after "FIGS." change "10A-1013" to --10A-10B--.

Signed and Sealed this  
Ninth Day of December, 2014

Michelle K. Lee  
*Deputy Director of the United States Patent and Trademark Office*